US007593869B2

(12) United States Patent
Nahan et al.

(10) Patent No.: US 7,593,869 B2
(45) Date of Patent: Sep. 22, 2009

(54) METHOD AND SYSTEM FOR ELECTRONICALLY EXECUTING SALE TRANSACTIONS ACROSS A PLURALITY OF NETWORKED TERMINALS

(75) Inventors: Kenneth Nahan, Stamford, CT (US); Sherri Nahan, Stamford, CT (US); John D. Graham, New York, NY (US); Ahmet K. Corapcioglu, Louisville, CO (US); Robert H. Miller, Blairstown, NJ (US); Alexander Lipman, New York, NY (US); Andrei Osipou, Moscow (RU)

(73) Assignee: Elliot Capital LLC, Los Altos, CA (US)

( * ) Notice: Subject to any disclaimer, the term of this patent is extended or adjusted under 35 U.S.C. 154(b) by 529 days.

(21) Appl. No.: 10/853,510

(22) Filed: May 26, 2004

(65) Prior Publication Data
US 2005/0021423 A1 Jan. 27, 2005

Related U.S. Application Data

(60) Continuation of application No. 09/718,966, filed on Nov. 22, 2000, now abandoned, which is a continuation of application No. 09/385,594, filed on Aug. 30, 1999, now Pat. No. 6,343,273, which is a division of application No. 08/903,327, filed on Jul. 17, 1997, now Pat. No. 5,999,915, which is a continuation of application No. 08/197,863, filed on Feb. 16, 1994, now Pat. No. 5,664,111.

(51) Int. Cl.
G06Q 30/00 (2006.01)

(52) U.S. Cl. .................. 705/26; 705/27; 705/1

(58) Field of Classification Search .......... 705/26, 705/27, 1
See application file for complete search history.

(56) References Cited

U.S. PATENT DOCUMENTS 4,876,648 A * 10/1989 Lloyd ...................... 705/38
4,887,208 A * 12/1989 Schneider et al. .......... 705/28

(Continued)

FOREIGN PATENT DOCUMENTS

WO    WO 95/24687    9/1995
WO    WO 00/25218    5/2000

OTHER PUBLICATIONS

Kerwin, Ann Marie, "On-Line Computer Real Estate Services," Editor & Publisher. New York: Nov. 28, 1992. vol. 125, Iss. 48; p. 20. Retrieved via ProQuest on Mar. 12, 2009.*

(Continued)

Primary Examiner—Jeffrey A. Smith
Assistant Examiner—Michael A. Misiaszek
(74) Attorney, Agent, or Firm—Sterne, Kessler, Goldstein & Fox P.L.L.C.

(57) ABSTRACT

The present invention includes a system and method of electronically executing transactions with a preprogrammed main computer having data and image storage and retrieval equipment. A plurality of electronic images of works of art which are for sale are created by at least one listing dealer and stored on the storage equipment associated with the main computer. Data is input about each stored image and input data is associated with each corresponding stored image. A plurality of preprogrammed intelligent terminals each having data storage and retrieval equipment, at least one display screen and at least one input device, located at least one listing dealer location and at least one buying dealer location communicate with the main computer. Search criteria are input through the intelligent terminals for selecting at least one of the stored electronic images for review. Selected images and corresponding data are communicated to the intelligent terminals and at least a portion of the selected electronic images are displayed. A reservation on at least one of the displayed electronic images can be made to prevent the completion of a sale transaction involving the artwork corresponding to the selected reserved electronic image. An indication of the reserve status of the work is displayed in conjunction with the display of the reserved work on any of the intelligent terminals. A buy order can be input on the intelligent terminals to transact a purchase of the artwork corresponding to the electronic image subject to the buy order. Instructions to complete the purchase are automatically generated and communicated to the intelligent terminals corresponding to the appropriate listing dealer and the appropriate buying dealer.

34 Claims, 48 Drawing Sheets

U.S. PATENT DOCUMENTS

| | | | |
|---|---|---|---|
| 4,931,929 | A | 6/1990 | Sherman |
| 4,972,318 | A | 11/1990 | Brown et al. |
| 4,984,155 | A | 1/1991 | Geier et al. |
| 5,025,395 | A | 6/1991 | Nose et al. |
| 5,032,989 | A | 7/1991 | Tornetta |
| 5,053,956 | A | 10/1991 | Donald et al. |
| 5,109,482 | A | 4/1992 | Bohrman |
| 5,179,651 | A | 1/1993 | Taaffe et al. |
| 5,208,745 | A | 5/1993 | Quentin et al. |
| 5,255,182 | A * | 10/1993 | Adams ............ 705/17 |
| 5,283,731 | A | 2/1994 | Lalonde et al. |
| 5,291,395 | A | 3/1994 | Abecassis |
| 5,301,172 | A | 4/1994 | Richards et al. |
| 5,305,200 | A | 4/1994 | Hartheimer et al. |
| 5,315,508 | A * | 5/1994 | Bain et al. ............ 705/28 |
| 5,319,542 | A | 6/1994 | King, Jr. et al. |
| 5,339,239 | A * | 8/1994 | Manabe et al. ........ 705/1 |
| 5,451,998 | A | 9/1995 | Hamrick |
| 5,576,951 | A | 11/1996 | Lockwood |
| 5,664,111 | A * | 9/1997 | Nahan et al. .......... 705/27 |
| 5,715,448 | A * | 2/1998 | Suzuki et al. .......... 707/9 |
| 5,771,380 | A | 6/1998 | Sagamihara et al. |
| 5,794,216 | A | 8/1998 | Brown |
| 5,832,459 | A | 11/1998 | Cameron et al. |
| 5,832,495 | A | 11/1998 | Gustman |
| 5,845,261 | A | 12/1998 | McAbian |
| 5,890,175 | A | 3/1999 | Wong et al. |
| 5,893,110 | A | 4/1999 | Weber et al. |
| 5,897,622 | A | 4/1999 | Blinn et al. |
| 5,999,915 | A | 12/1999 | Nahan et al. |
| 6,006,201 | A | 12/1999 | Berent et al. |
| 6,029,142 | A | 2/2000 | Hill |
| 6,032,130 | A | 2/2000 | Alloul et al. |
| 6,119,152 | A | 9/2000 | Carlin et al. |
| 6,128,600 | A | 10/2000 | Imamura et al. |
| 6,167,382 | A | 12/2000 | Sparks et al. |
| 6,195,649 | B1 | 2/2001 | Gifford et al. |
| 2002/0107777 | A1 * | 8/2002 | Lane et al. ............ 705/37 |

OTHER PUBLICATIONS

"Art Auction Catalogs to go Online." Wilson Library Bulletin, vol. 55, pp. 87-88, Oct. 1980.

"Moai selected by Art. Com"—Newsmie Aug. 13, 1999, p. 8033.

"Start-up Electronic Marketplaces Gain Steam." Electronic Marketplace Reports, vol. 8, No. 13, p. 1, Jul. 1994.

Brown, Christie. "An Electronic Market for Art? (Centrox on-line Image Database)." Forbes, vol. 147, No. 6, p. 137, Mar. 1991.

Buckler, Grant. "Centrox has Windows Interface for Art Database." Newsbytes News, Aug. 1994.

Crane, Gregory. "Hypermedia and the Study of Ancient Culture." IEEE Computer Graphics and Applications, vol. 11, No. 4, pp. 45-51, Jul. 1991.

Harward, V. Judson. "From Museum to Monitor: the Visual Exploration of the Ancient World." Academic Computing, vol. 2, No. 7, pp. 16-19, May 1988.

Hislop, Richard. "ArtQuest and the ASI Art Reference Library." Historical Social Research (GFR), vol. 14, pt. 4, pp. 66-69, 1989.

McCarthy, Paul, "Going Once: Computer Technology puts Art on the Auction Block." Omni, vol. 15, No. 11, p. 18, Sep. 1993.

Nordstrom binder Online Store at www.Nordstrom.com-Newsmie-Oct. 21, 1999 p. 6363.

Stoll, Marilyn. "Art Meets PC in Auction Catalogue." PC Week, vol. 5, No. 16, p. 48, Apr. 1988.

News and Notes, "Videodisc", Videodisc and Optical Disk Jul.-Aug. 1985, vol. 5, No. 4.

The Newman Video Tape, copyright 1992 (CD Provided). Applicants have no information on whether the Newman video tape was ever made public.

* cited by examiner

METHOD AND SYSTEM FOR ELECTRONICALLY EXECUTING SALE TRANSACTIONS ACROSS A PLURALITY OF NETWORKED TERMINALS

CROSS-REFERENCE TO RELATED APPLICATIONS

This application is a continuation of U.S. application Ser. No. 09/718,966 filed Nov. 22, 2000, now abandoned, which is herein incorporated by reference in its entirety. U.S. application Ser. No. 09/718,966 is a continuation of U.S. application Ser. No. 09/385,594, filed Aug. 30, 1999, now U.S. Pat. No. 6,343,273, which is a divisional of U.S. application Ser. No. 08/903,327, filed Jul. 17, 1997, now U.S. Pat. No. 5,999,915, which is a continuation of U.S. application Ser. No. 08/197,863, filed Feb. 16, 1994, now U.S. Pat. No. 5,664,111.

Additionally, Applicants have amended the Abstract as shown below to comply with the requirements of 37 C.F.R. §1.72(b). This version of the Abstract will replace the prior version of the Abstract in the application.

A system and method of electronically executing transactions with a preprogrammed main computer having data and image storage and retrieval equipment are presented. Electronic images of property for sale are created by a listing dealer and stored on the image storage equipment. Data is input and associated with stored images. Preprogrammed intelligent terminals each having data storage and retrieval equipment, display screen and input device, are located at listing dealers and buying dealers and communicate with the main computer. Search criteria are input for selecting stored images for review. Selected images and data are communicated to the intelligent terminals and displayed. A reservation is made to prevent a sale involving the property of the reserved image, and the reserve status is displayed. A buy order is input to purchase the reserved property. Instructions to complete the purchase are automatically generated and communicated to the appropriate intelligent terminals.

BACKGROUND OF THE INVENTION

1. Field of the Invention

The present invention relates generally to computerized multimedia systems, and more particularly to such systems for exploring and executing transactions.

2. Background of the Invention

The review and selection of art has been a "hit and miss" process for as long as art has been offered for sale. The aggregation of large quantities of art in the hands of individual art dealers or galleries was a first step towards placing a greater array of possibilities in front of a prospective buyer. However, since the artwork displayed or stored in a gallery represents only a minuscule fraction of the artwork available around the world, dealers normally use transparencies to create more opportunities to make a sale. Catalogues and the like provide still further methods for a dealer to show a client a more comprehensive selection of artwork. However, there is no method by which an art dealer can readily identify the specific features or elements a prospective customer seeks in artwork and then offer that customer artwork with those particular characteristics, unless the artwork is physically located in its gallery, or under its control. Thus, if the prospective customer is not satisfied with the artwork offered by that dealer from its own stock, the dealer is generally unable to make a sale.

If a customer is seeking a particular piece of artwork or works by a particular artist, a dealer may try to obtain such artwork from another dealer. However, there has been no method by which a dealer can readily identify inventory of artwork owned by other art dealers except through visits to such dealers, review of published catalogues, or referrals of other dealers who might be familiar with the particular piece of artwork or the works of an artist being sought. If such a dealer is identified, communication between the parties is generally by phone and mail and a photograph or transparency of the desired artwork is sent to the dealer who represents the prospective customer. The prospective customer may then be invited back to the gallery to examine the photograph or transparency and decide whether to proceed with the purchase.

These "systems" are grossly inefficient. There is no quick, systematic method for a dealer to identify the particular elements or features of artwork that a prospective customer may be seeking. Conversely, if a prospective customer desires specific artwork, or works of a specific artist, there is no system that allows the dealer to identify where such works can be found. If the dealer knows where to find such works, long periods of time may elapse communicating with the other dealer, waiting for the arrival of a transparency, and then reigniting the interest of the prospective customer. The present "systems" are equally inefficient for a dealer that wants to sell his own inventory of artwork. He must either wait for a prospective customer to walk into his gallery or send out expensive catalogues. A dealer has no other effective way to apprise other galleries of the artwork he has available to sell.

Another drawback to the present "systems" is the very high cost to dealers. A substantial investment in inventory, real estate (for physical space to display and store the artwork), insurance, handling, personnel, etc. must be incurred in maintaining an inventory of artwork.

Clearly, the current systems are both inefficient for the consumer, or purchaser of artwork, and the art dealer. Thus, the purchase of artwork is often a time consuming process, with the identification of a desired piece of artwork, more likely, the result of chance or serendipity.

OBJECTS OF THE INVENTION

Accordingly, it is an object of the present invention to provide a system and method for alleviating the foregoing problems and improving upon the prior systems and methods.

It is another object of the present invention to make available for sale a significantly greater selection of artwork than has previously been readily ascertainable.

It is also an object of the present invention to provide a prospective purchaser with a large selection of artwork that conforms to the specific tastes of the prospective purchaser and thereby facilitate a reduction in the time required to find desired artwork.

It is a further object to increase the sales potential of an art dealer by making his inventory available for immediate purchase by other dealers.

It is yet another object to provide dealers with ready access to artwork from the inventory of other dealers without requiring additional space or investment in inventory, insurance, real estate and other related costs.

It is a still further object to enable dealers to electronically market their artwork and electronically consummate transactions involving such artwork on a worldwide basis.

It is still another object of the present invention to facilitate an orderly and readily available market for the sale of artwork, through a systematized process that maintains a historical record of prices at which works of art are sold.

SUMMARY OF THE INVENTION

The present invention comprises a computerized system incorporating high resolution imaging, printing and database management, in a multimedia environment, for the marketing, selection, purchase, and sale of unique, high monetary value characteristic products, including the processing of all documents to effect and settle the resulting transaction, over a high speed communications network on a dynamic, real time basis. The system is preferably used for the purchase and sale of art by dealers in the art industry, but is readily adaptable for use with other product categories with similar characteristics such as antiques, jewelry, oriental rugs, numismatics, philately, and others.

The system of the present invention (the "System") specifically addresses existing limitations within the art industry that directly impact a dealer's profitability. The System provides member dealers access to an extensive and diverse collection of artwork from the inventories of other member dealers around the world to satisfy the most demanding customers while, concurrently, offering member dealers the opportunity to sell their inventory throughout the world. It also enables artists to offer their work for sale directly through any member dealer.

Original works of art are photographed with high resolution cameras, converted to digital images on computer controlled electronic scanning equipment, categorized by different criteria, and stored in a complex computer database along with information about the artist and artwork. The digital images and related data are available twenty four hours a day for virtually instantaneous transmission over the desired media, i.e. fiber optic cables to dealers who are part of a wide area network which extends around the world (the "Network"). Each dealer in the Network has use of high resolution monitors and sophisticated color printing equipment so that the works of art can be viewed or printed in photographic quality along with information about the artist and artwork, and all other data necessary to effect a sale. The System enables a member dealer to offer its customers a "virtual inventory," or access to the authorized works of art of every dealer on the Network.

The System replicates the interaction between a salesperson and customer during the sale process with the added benefits of a wealth of information and alternative selections at the salesperson's fingertips. The System is very "user friendly," readily learned, and quickly implemented. Despite its sophistication, salespersons and customers can use the System with no more difficulty than using a bank's automatic teller machine.

The System is preferably housed in a prefabricated unit that can be modified to the decor of the dealer's gallery. In one embodiment the unit is approximately six and one-half feet high, five feet wide, and two feet deep, with two different size, flush-mounted, high resolution monitors. A rounded elongated table approximately four and a half feet long and three feet wide, extends out from the unit. The configuration of the System includes a computer keyboard and mouse to manipulate images and data on the monitors. The keyboard is used principally to enter information necessary to customize images and data and enter the name and address of a specific customer.

In typical transactions, a salesperson and customer sit around the table, discuss the customer's preferences, and review artwork the gallery has to offer in the same manner as that sale process is currently conducted. However, as compared to any prior systems, the salesperson has a more efficient method of helping the customer focus on particular classifications of interest. This is true whether the customer is a knowledgeable collector or a novice. The salesperson also has a considerably larger number of possibilities to offer a customer, which enhances his ability to make a sale. The System guides the salesperson to display, on the larger monitor, images of artwork from the dealer's own inventory and inventories of member dealers around the world, categorized by different criteria.

Based on the customer's choices, the salesperson is able to build a portfolio of possibilities. The customer can examine details such as texture, condition, and color in images magnified on the System's high resolution monitors. The artwork can also be printed in photographic quality better than gallery catalogue photographs. The System's use of multi-media also allows three dimensional objects such as sculpture to be rotated on the monitor and viewed from all sides. Still photographs of the artist can dissolve into video with the artist speaking directly to the customer. If the customer wishes to look at additional pieces, the System is totally flexible and new selections can be made at will.

If the customer likes a particular work, but has not firmly decided to purchase it, the salesperson can reserve it throughout the entire dealer network for a limited period. During this period no one else can purchase that artwork, which is marked on the monitor, for any dealer viewing it, with a green dot (customarily used for a "hold" sign in galleries everywhere). If the customer decides to make the purchase, notification is instantly sent throughout the global network and that particular work is no longer available for sale, and it is marked on the monitor with a red dot (customarily used for a "sold" sign in galleries everywhere).

Using simple commands, a series of electronic communications are initiated between the host computer and the buying and listing dealers to effect, and ultimately consummate, the transaction. These include purchase and sale invoices, wire transfer instructions, confirmations of shipment and receipt, and a number of other documents.

The invention provides both the sophisticated and unsophisticated customer (the retail purchaser of artwork) with a quick and easy way to find desired artwork, through a selection process that identifies works of art by a hierarchy of characteristics. It provides an art dealer the opportunity to increase his profitability by increasing his overall sale of artwork. This is accomplished through sales of his own inventory to other dealers as well as sales of artwork not in his inventory, on a timely and highly cost effective basis.

The invention also allows the dealer to provide more personalized service to his customers, such as the preparation of personalized portfolios of individual artwork collections and catalogues for a customized exhibition, less expensively and much faster than under traditional methods. It enables artists to offer their works for sale to a much wider audience than is possible under any existing method. It also enables individual owners to offer their artwork for sale to a wide audience in a forum other than an auction, while allowing them to retain physical possession of such artwork until it is sold.

The invention is unique because it is the only method by which artwork from the inventories of a group of dealers that is continually updated on a dynamic, real time basis, can be seen visually on high resolution monitors or catalogue quality photographic reproductions, and then purchased electronically. It is also the only system that immediately initiates and electronically processes all the documents necessary to consummate the related commercial transaction. Further, it is the only system that allows interior designers and architects to readily identify and purchase existing artwork that matches specific color standards.

The inherent design of the invention enables a dealer to develop a profile of desired characteristics of artwork for each customer. Periodically, or as new artwork is added to the system, the dealer can prepare a portfolio of such artwork for the customer, thus increasing the possibilities for that customer to find a desired work and the dealer to increase its sales.

The multimedia capabilities of the invention enable its use for teleconferencing. Thus, an "Opening" in the gallery of one dealer can be broadcast simultaneously to galleries of other dealers with direct participation of the featured artist. Such capabilities increase the opportunity for more art enthusiasts to participate in an opening event and increase the number of potential customers for the artwork offered for sale.

The creation of a historical record of prices at which individual artwork or works of a particular artist are sold at dealer wholesale prices, provides a more consistent and accurate basis to conduct appraisals for insurance or estate purposes. In addition the extremely large inventory of art available for perusal, allows the appraiser an amazing tool to find or locate works by artist's name, style, subject, size, suggested retail and dealers' costs, etc.

Though designed to be used in commercial transactions, a separate application of the system can also be used by a museum to archive its own inventory with a file of color images and data for each work in its possession, which, together with the factual data, can be made available for their own curatorial uses as well as to educational institutions as an easy to use tool to learn about art through access to total collections of work from the most famous artists to those who are rarely seen.

The invention's imaging and search capabilities can be readily adapted to other industries in which the products sold have characteristics similar to works of art, that is, generally unique in nature and high monetary value. Jewelry, furniture, oriental rugs and antiques, numismatics, philately, are some examples of such products.

While there exists some computer software that performs certain of the functions of the present invention, such software is geared to the management of a particular gallery's own inventory. Through the use of modems, some can communicate data with other galleries, but they do not offer real-time, simultaneous access to color images of inventories of galleries on a worldwide or even countrywide network for the purpose of buying and selling products. Nor do they offer the automatic electronic processing of documents between parties to consummate a commercial transaction. The System's "Client-Server" design, the architecture of choice in most distributed data networks, is an extremely efficient method of handling enormous volumes of images and data, and allows for a comprehensive, transaction based, dynamic, on line, worldwide approach to the purchase and sale of art and other products.

As can be clearly seen, the present invention yields substantial improvements over existing systems. Other features and advantages of the invention are set forth in the following description and drawings.

DETAILED DESCRIPTION

Figure 1:
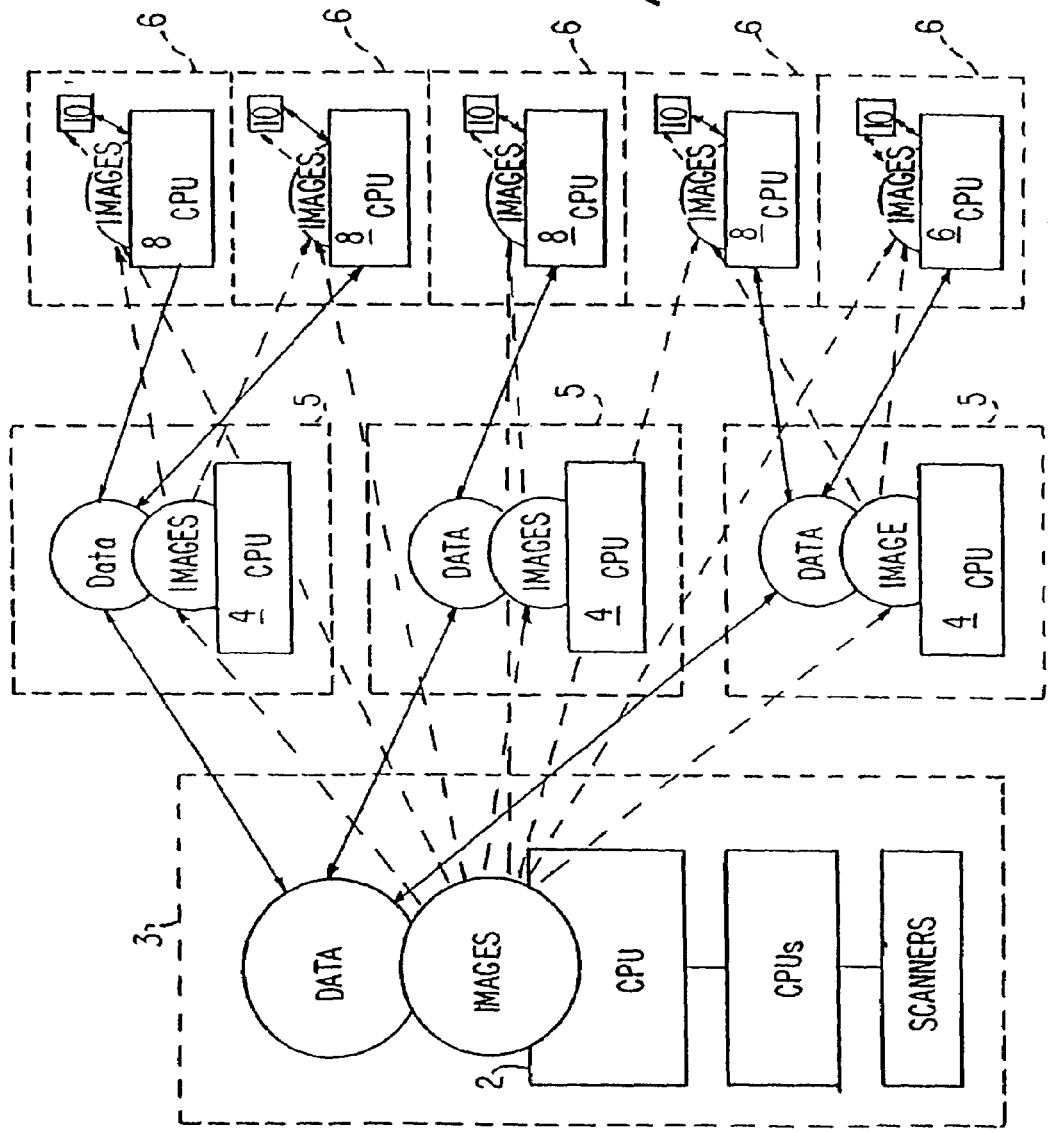
FIG. 1 is a schematic diagram of the overall hardware design of the present invention.
Figure 2:
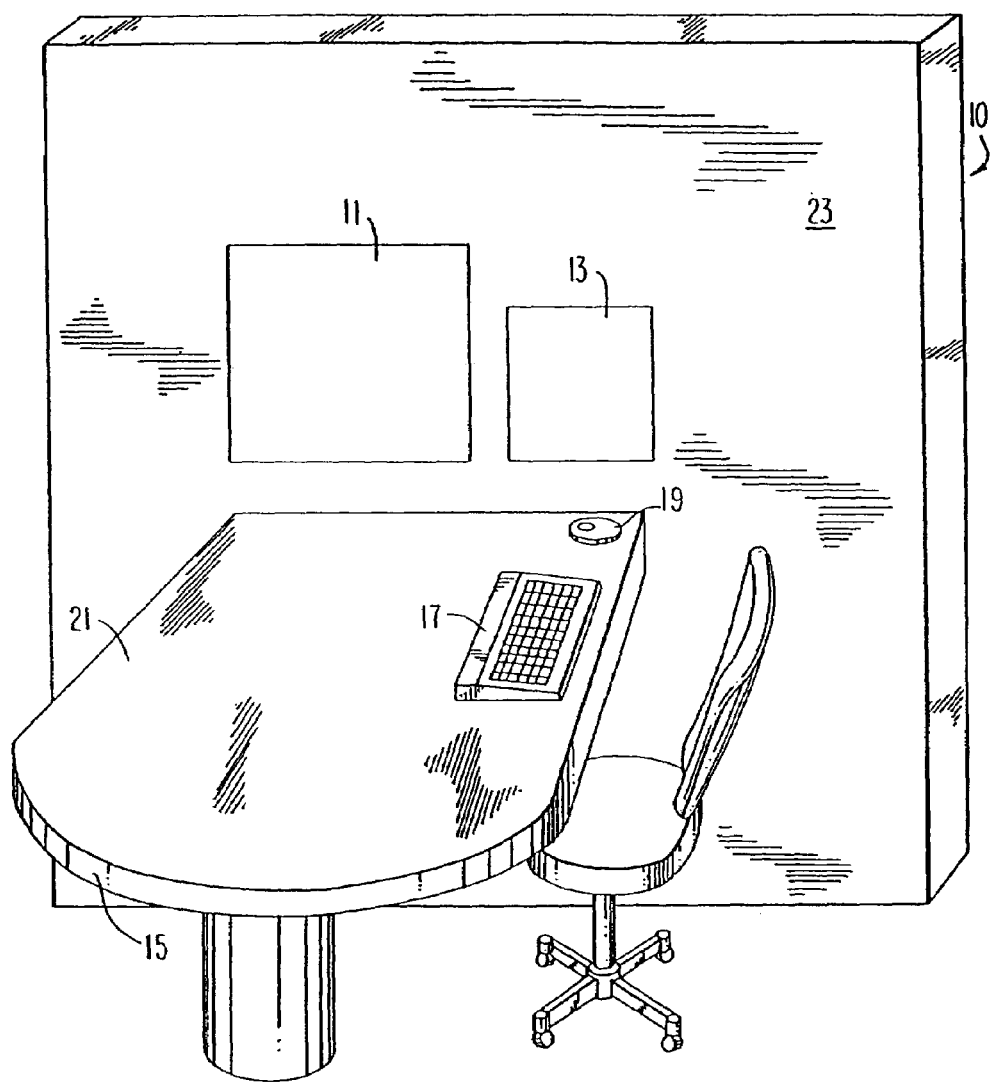
FIG. 2 is a perspective view of a client sale suite of the present invention.

Referring to FIG. 1, the overall system of the present invention 1 preferably comprises a central or host computer 2, at least one remote regional node 4 and a plurality of remote gallery locations 6.

In one preferred embodiment, the host computer system 2 comprises a Macintosh Quadra 950 computer with 16 megabytes of random access memory ("RAM") a 2 gigabyte hard drive, two color display monitors and a network adapter. The host site 3 has a channel bank and a bridge or a router which works with frame relay wide area networks. The regional node computer configuration(s) 4 preferably comprise the same configuration as the host computer system 2. The regional node sites 5 also have the same communications equipment as the host site 2.

Each gallery location 6 has one management unit 8 which preferably comprises at least a Macintosh Classic II computer with 4 megabytes of RAM, an 80 megabyte hard drive, and a network adapter card. A black and white printer is also preferably connected to the computer. At least one client sale suite 10 is also present at each gallery location 6. Each client sale suite 10, preferably comprises at least a Macintosh Centris 650 computer with 16 megabytes of RAM, a one megabyte hard drive, a high resolution graphics card, an Envision compression/decompression card, a housing module (a prefabricated unit which houses the computer and monitors), and two high resolution color monitors, one preferably at least 21 inches, measured diagonally. A superior high quality color printer (e.g., a wax thermal transfer printer) capable of making catalogue quality color prints is also preferably connected to the computer of the sale suite 10.

In order to make the system as efficient as possible, each gallery location 6 has, stored on the management unit 8, the software necessary to perform all the transaction and communication functions including: communication with remote data/image locations; creation and completion of sales documentation; etc. The sale suite 10 has the software necessary to perform particular local functions such as the client criteria selection, artwork image storage and retrieval, artwork image display, and artwork image printing. This distribution permits a gallery salesperson to use the system of the present invention without incurring significant time lags as each distinct function is called. Similarly an image caching system is used in which images are cached both at the local gallery 6 and at regional nodes 5. Those images not found at either the local gallery 6 or the regional node 5 can always be retrieved from the host 2. Data is always received from the regional nodes 5.

The equipment at each regional node 5 is preferably a duplication of the equipment at the host node 3. The data base is also duplicated at each regional node 5. Whenever a regional data base is updated, the information is relayed to the host 2 which, in turn, updates each regional data base. Thus all the data bases reflect the most recent information.

The use of high quality images of artwork in an effective and efficient manner is at the heart of the present invention. Therefore, the creation and storage of the digitized images must be carefully undertaken. First, the artwork is typically photographed in a conventional manner. Then, the images of artwork are preferably brought into the system using one of three different methods of scanning, using scanners 23 connected to CFUs 25.

The first scanning technique is preferred for transparencies that are 4"×5" or smaller, however, other scanners can accommodate any size transparencies or reflective art. A Barneyscan Color Imaging Systems QuickScan 4520 RS scanner is used with Color Access Software by CIS loaded onto an Apple Macintosh Quadra 700 computer with 20 megabytes of RAM and a 500 megabyte hard drive. Scanner calibration and color adjustments are made in the Color Access software. The transparency is then scanned and indexed with information about the artist, the artwork and key words describing the work. When the scan or a group of scans are completed they are preferably converted into PICT RGB files using Photoshop software by Adobe Systems. This conversion allows the images to be manipulated by the sale suite 10, at a later date.

The second scanning technique is used for flat reflective art and transparencies larger than 4"×5". A Howteck Scanmaster 3+ flatbed scanner is used with Photoshop software loaded onto the Macintosh Quadra 700 computer. All color adjustments are done manually, but no conversion need be done. The quality of the scanned images using this technique is significantly less than those done with the Barneyscan scanner.

The third scanning technique is not "scanning" in the same sense as the first two described techniques. In this technique a third party (Kodak) performs the scanning by taking film (usually 35 mm) and transferring it to compact disk ("Photo CD"). Images on Photo CD need only to be resized, slightly color adjusted and indexed using the Photoshop software. The images are then saved without the necessity of conversion. The quality of such images is typically very good.

After the images have been saved, they are compressed using Apple Quick Time compression. This reduces the image size to approximately one seventh of its original size (e.g. 1.2 megabytes down to 171 kilobytes). Finally, the images are transferred to the host computer for permanent storage.

Figure 3:
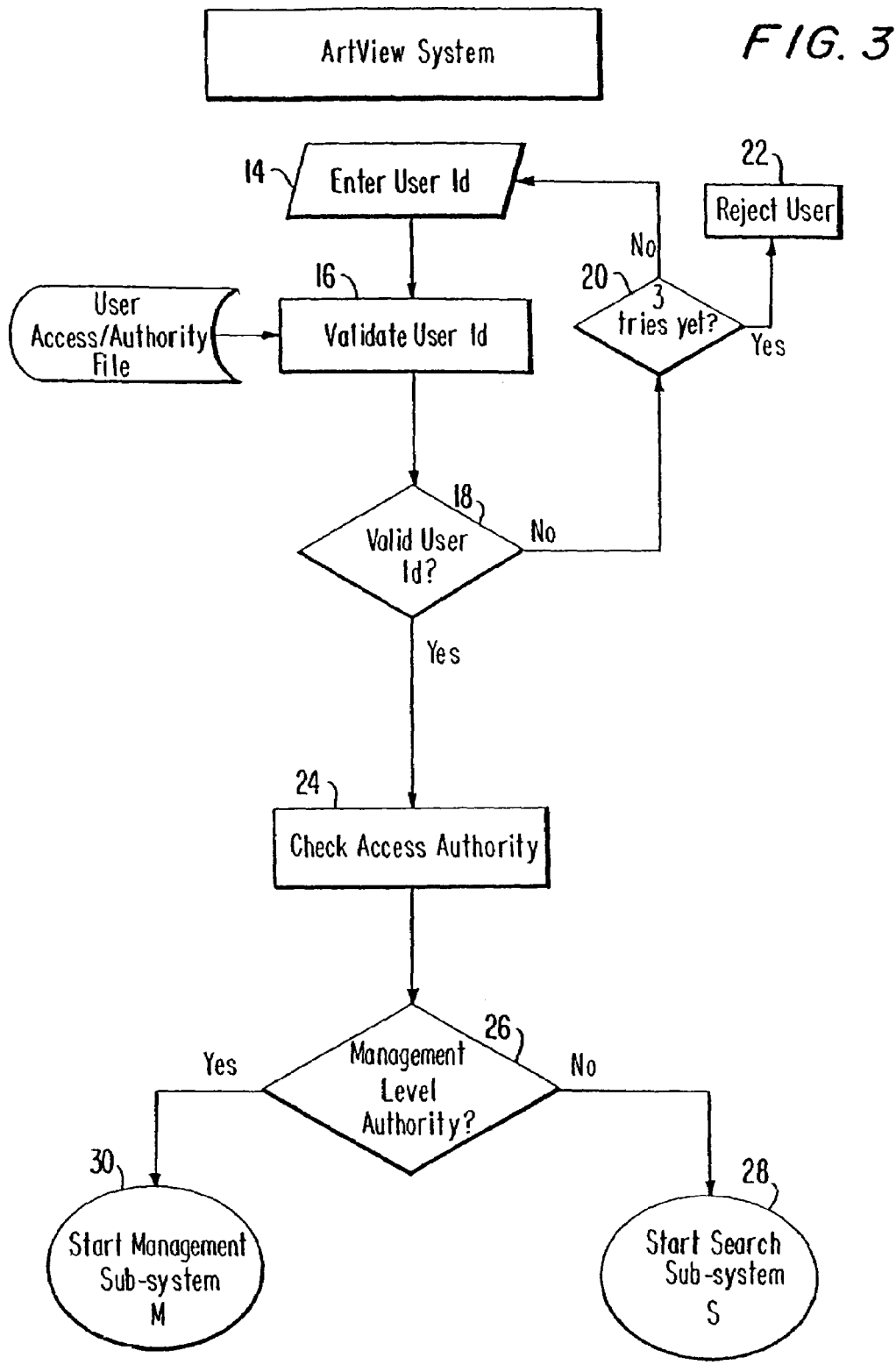
FIGS. 3-23 are flow chart diagrams illustrating various features of the present invention.

In a typical art sale situation, a dealer meets a prospective buyer in his gallery. The dealer and the buyer(s) sit around the table 15 of sales suite 10. The sales suite 10 is an intelligent terminal comprising a computer 21, a keyboard 17 and a pointing device (mouse) 19, a work monitor 13 (for text input and review), and a view monitor 11 (for viewing images) mounted in a wall unit and associated with a table 15. The dealer begins, as shown in FIG. 3, by initiating a log on procedure 14-28 which validates the dealer's ID code and determines his level of authority (to restrict his access to certain system functions, if necessary).

Figure 4:
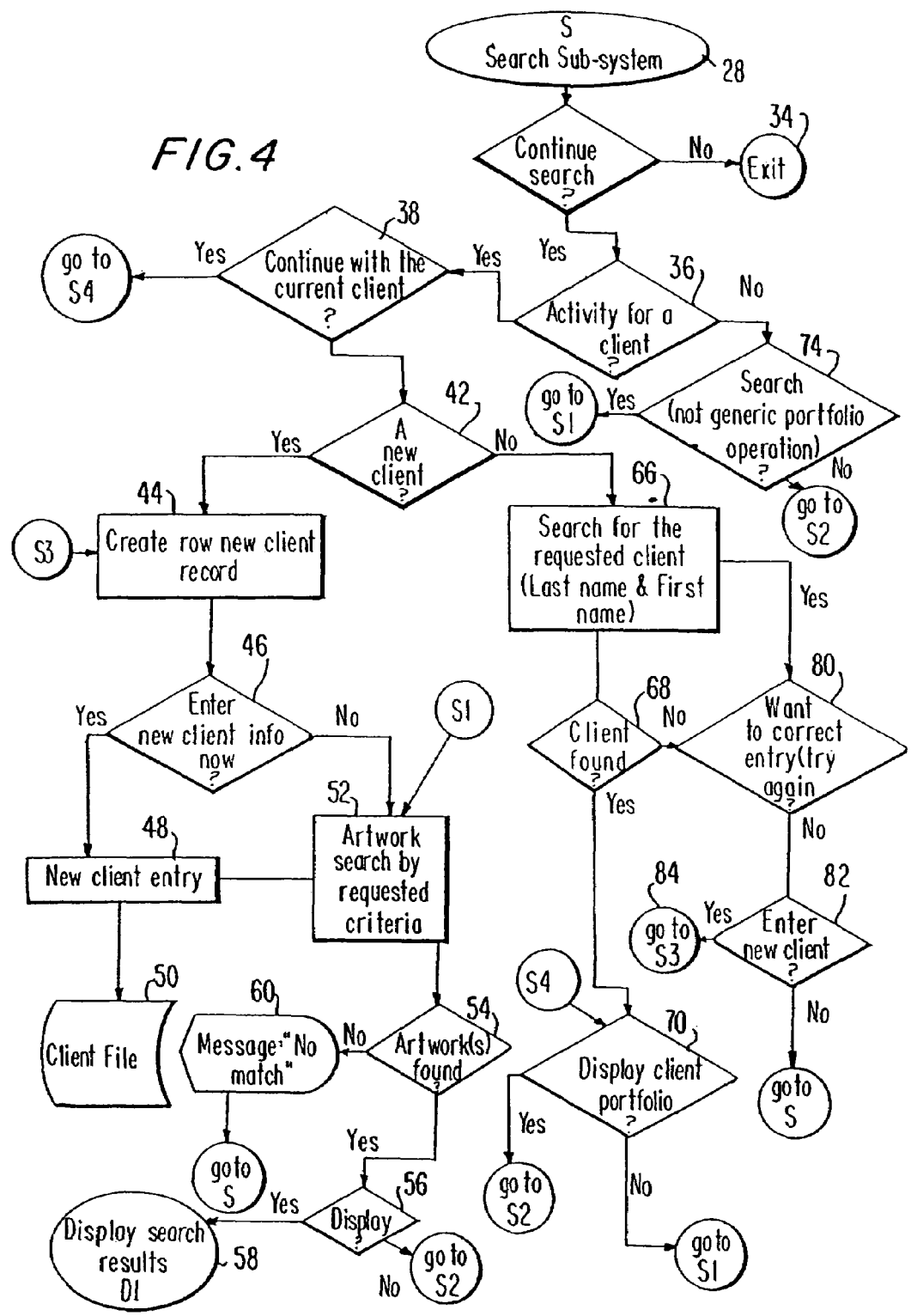
Figure 5:
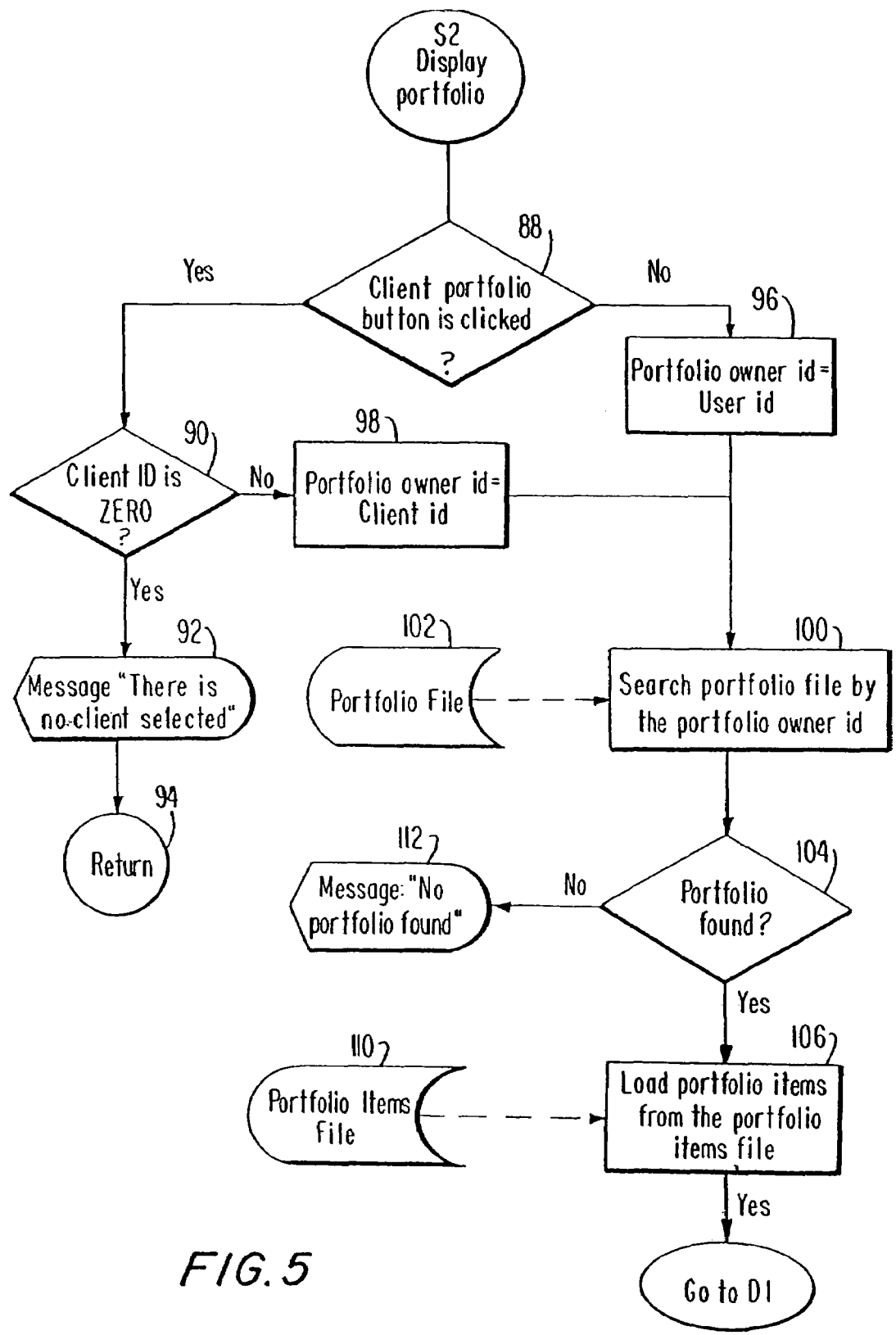

The subsystem (client data base) is then searched 28 to see if the prospective buyer was a previous client. Referring now to FIG. 4, if there was previous activity for the client, the dealer may continue with that client's activities by displaying a prior created portfolio (any group of selected artwork) of the client's prior selections 38, 42, 66-70, 88-90, 98, 100-106, 110, 118-158 (FIGS. 4 and 5), add or delete items, or continue to purchase work(s), enter an existing client or enter a new client 42-50.

For each portfolio, an identification of each relevant image of each piece of art is kept in a portfolio file identified by a portfolio owner ID 96-98. The actual images are not stored in the file, but rather the access "locations" of each image are stored to minimize storage space.

Assuming a client with an existing portfolio is selected, the works are displayed on the view monitor 11 of the sale suit 10 in either vignette or large display format. (See FIG. 6). These formats and the various options available after the display of the artwork are described below in detail. If display of an existing client's portfolio is not desired, or if the dealer is working with a new client, the dealer may enter a variety of selection criteria to identify artwork which comports with the client's taste or desire 52. For example, if the buyer knows the title of a work he wants to buy, that can be input via the screen shown below in Table 1.

TABLE 1

| Client Consultant | Title ISAN® | Artist |
|---|---|---|
| Price: 0 | Size H × W  0   0 | Keyword: |
| Style / Medium | Subject / Color | Location / Portfolio |

Similarly, if the buyer is interested in the works of a particular artist, that too can be input via the screen of Table 1. The following categories are also preferably available as selection criteria via the screen of Table 1:

(1) Style, with the following subcategories:
Color field;
Cubist;
Expressionist;
Impressionist;
Minimalist;
Naive;
Old Master;
Realist;
School of Paris;
Surrealist;
(2) Medium, with a first subcategory of:
Decorative Arts and sub-sub categories of:
Ceramics;
Furniture;
Glass;
Textiles;
a second subcategory of Drawing and sub-sub categories of:
Charcoal;
Ink;
Pastel;
Pencil;
Mixed Media;
a third sub category of Painting with sub-sub categories of:
Acrylic;
Gouache;
Mixed Media;
Oil;
Tempera;
Water color;
a fourth subcategory of Photography with sub-sub categories of:
Black and White;
Color;
Mixed Media;
Painted Photo;
a fifth subcategory of Prints with sub-sub categories of:
Aquatint;
Carborundum;

Etching;
Lithograph;
Livres d'Artiste;
Mixed Media;
Monotype;
Silkscreen;
Woodblock;
and a sixth subcategory of Sculpture with sub-sub categories of:
Bronze;
Metal;
Mixed Media;
Outdoor;
Stone;
Wood;
(3) Material with the subcategories of:
Board;
Canvas;
Paper;
(4) Subject with the subcategories of:
Abstract;
Figurative;
Landscape;
Still Life;
(5) Price, which can be entered as a range or a maximum;
(6) Size, by local unit (e.g., cm or inches);
(7) Color, by "pantone" number or range, or visual selection;
(8) Location, by country or U.S. State; or
(9) Keyword, with synonyms (each piece of artwork is indexed by Keyword(s) and their synonyms when it is stored on the system, e.g., Sea, Flower, Boat, Love, Mist, etc.).

A search for artwork matching the chosen selection criteria is conducted and if any is found, it can be displayed.

If no search criterion is entered, the computer, in accordance with an algorithm, will generate a random selection of artwork from the system's database, which can also be displayed on a timed sequence, to operate until the user chooses to invoke a search.

Figure 6:
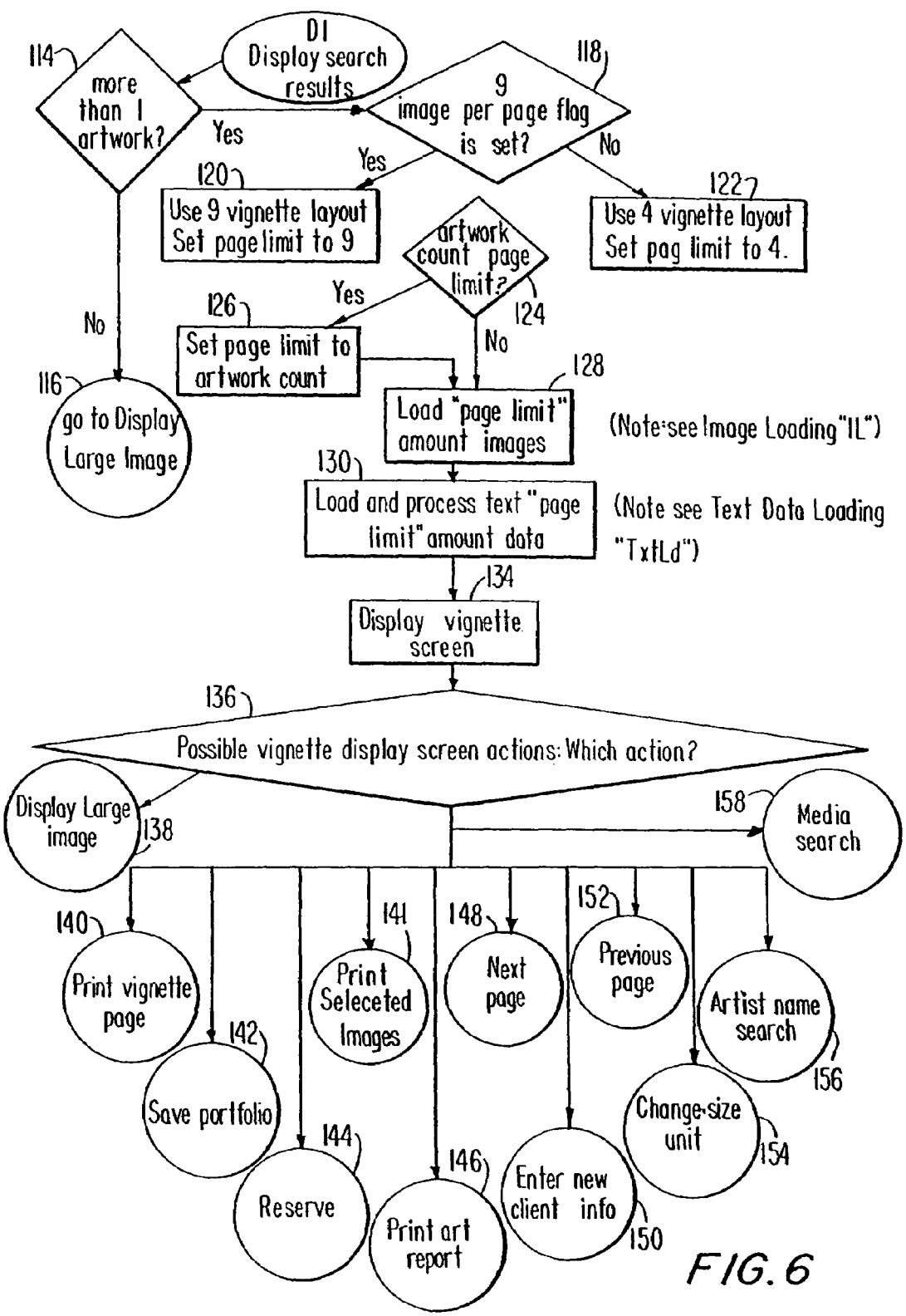
Figure 7:
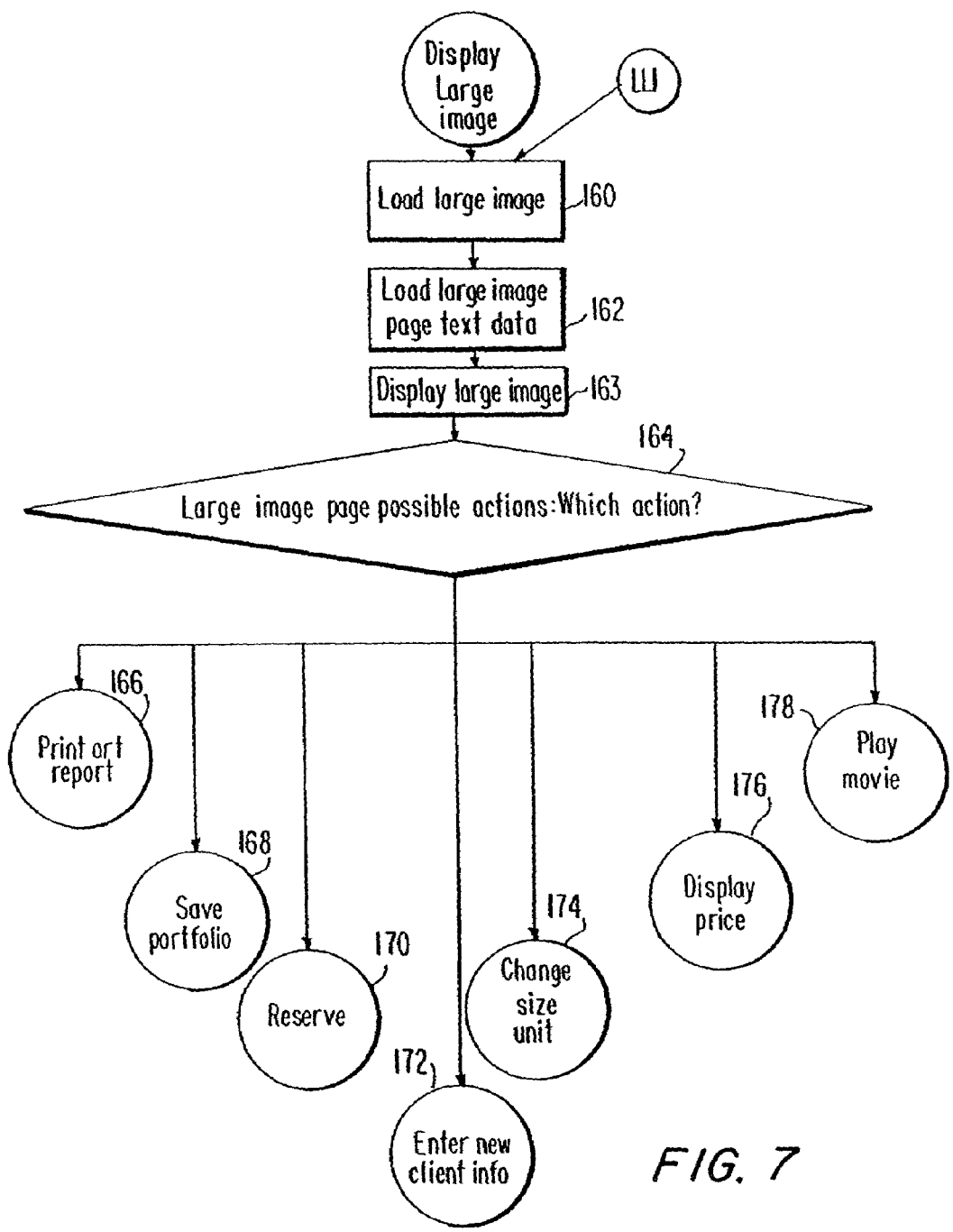
Figure 8:
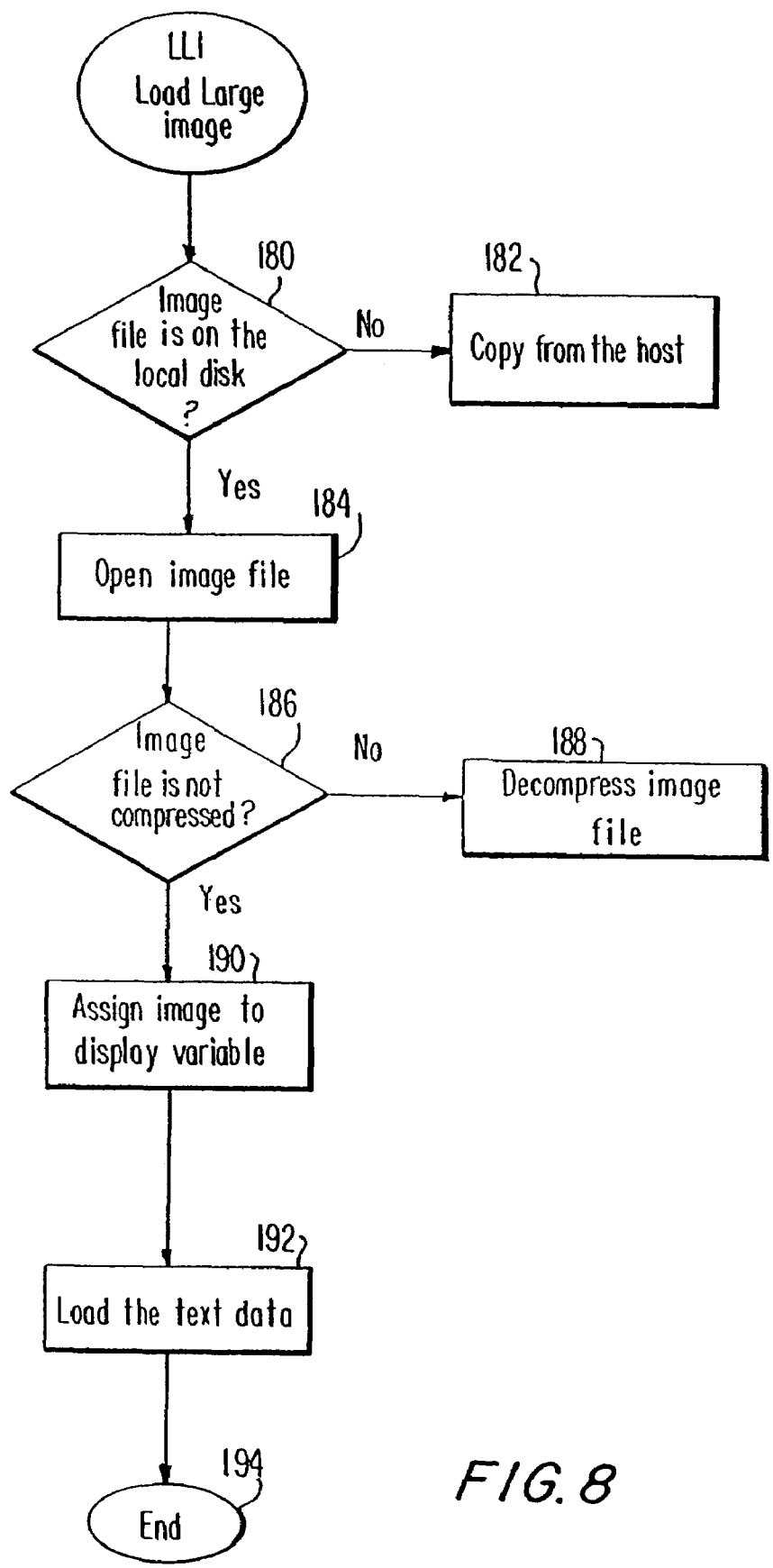

If artwork is located via selection criteria or randomly selected, it can preferably be displayed, as shown in FIGS. 6, 7, and 8 in at least two display formats. The first display format is called the "vignette" format. This is a reduced size format to fit a rectangle 156×212 pixels in which multiple images can be simultaneously displayed on the screen. Users may choose either four or nine images to be displayed in this format 118-122.

Multiple images can be selected from the database after the search. Viewers then have the ability to "page" through the selected images (a page is defined as a group of 9 or 4 vignettes together) 124-136, 148, 152.

The second display format is the large image format in which a single image is displayed. This format is chosen automatically when only one piece of artwork matches the selection criteria or when the dealer wants to display a larger, full screen image 132. This format is also chosen automatically when a portfolio, as described above, has only one image 114-116.

When the vignette format is employed, the work monitor 13 preferably shows the title, artist, medium and size of each work displayed on the view monitor 11. (See Table 2). A number of options are also displayed and available for selection from the work monitor 13. (See Table 2). They include: displaying a selected image in the large image format 138; printing the vignette screen (or "page") 140; printing selected images 141; saving all selected works (images) as a portfolio 142; reserving one or more selected works 144; printing an art report 146; entering new client information 150; displaying the next or previous page 148, 152; changing the size units 154; searching for works by a particular artist 156; and searching for works in a particular subject, style, and/or medium 158. (See FIG. 6).

TABLE 2

| "Dragons Doom" Frederick Perryman Drawing link 36″ × 42″ | "Adam's Folly" Wrinkles Galore Photography, Color 11″ × 17″ | EXPAND<br><<<br>>><br>SHOW<br>DELETE |
|---|---|---|
| "Cynic's View" Jack Karlhammer Prints, Aquatint 28″ × 64″ | "Over a Credenza" A. M. Selaznog Decorative Arts, Furniture 72″ × 36″ × 42″ | SAVE<br>PRINT V<br>PRINT A<br>RETURN |

The selection of a particular vignette image to display in large format is straightforward. Preferably using the mouse pointing device, the dealer "clicks" on the image of one of the works identified on the monitor 13 to select it. He then clicks on the vignette enlarge "button" which invokes the display large image routine 160-163, 180-194 depicted in FIGS. 7 and 8.

Figure 9:
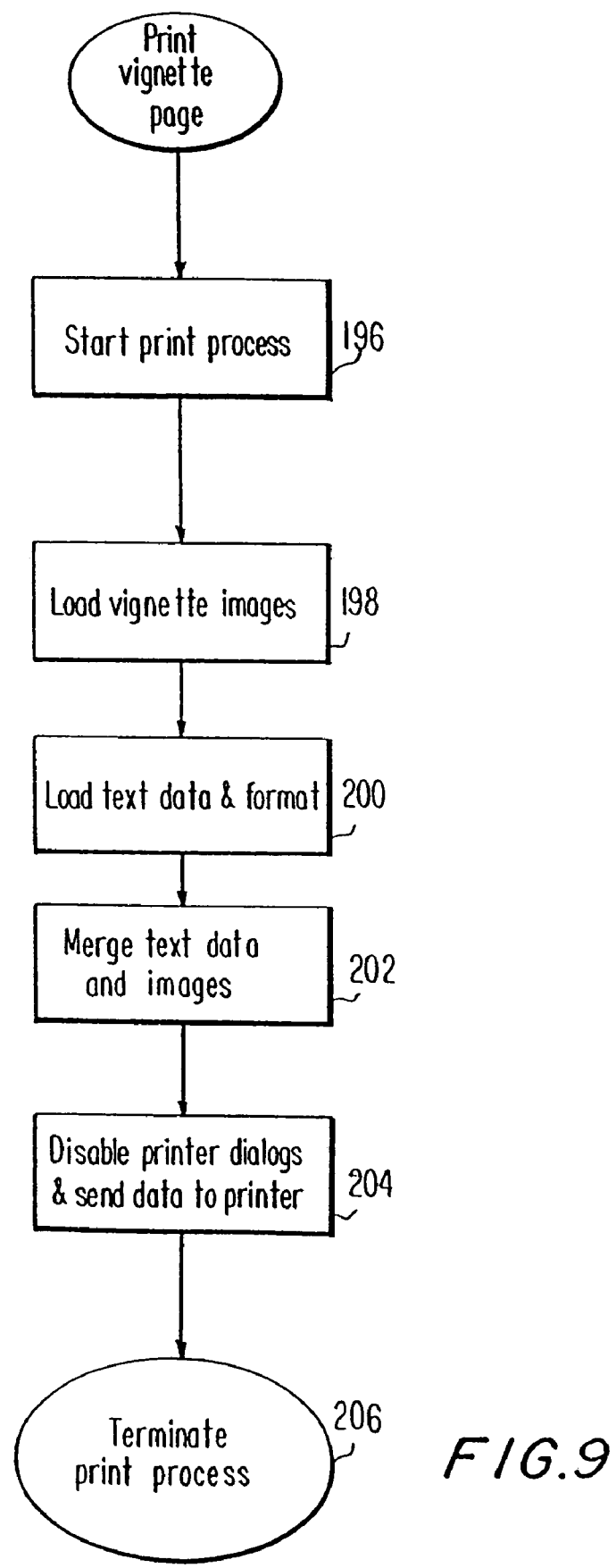

Printing the vignette screen is accomplished by selecting a "Print V" button which invokes the print vignette page routine 196-206 shown in FIG. 9. The print process comprises the display of one or more screens of printer information which confirm or allow the change of default information such as: printer; number of copies; etc. The vignette images are loaded 198 along with text data comprising a preselected caption which typically includes the dealer name, artist, title of artwork, size, date, etc. 200, the information is merged 202 and then sent to the printer for printing 204. The printer is preferably a color wax thermal transfer printer for printing extremely high quality graphic images. An example of one such printer is the ProofPositive Full-Page Color Printer by Supermac. However, other high quality color printers will suffice.

The printing of a single large image is very similar to the printing of the vignette screen described above. The only difference is the selection of an individual work on the work monitor 13 and the use of a "Print A" button rather than the Print V button. All other steps proceed as shown in FIG. 9.

Figure 10:
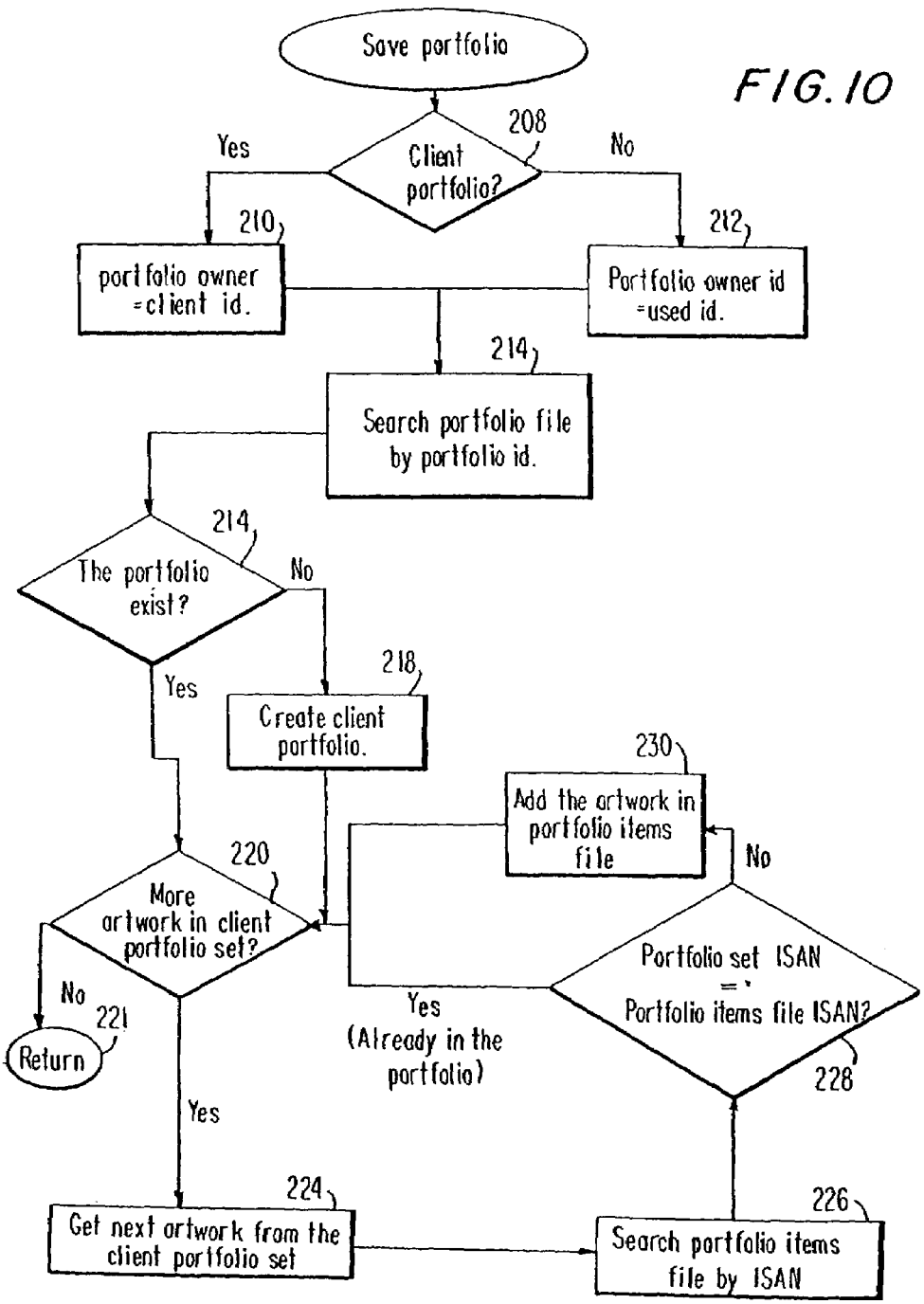

The saving of one or more selected works to an existing or new portfolio 208-230 follows the routine shown in FIG. 10. The routine is invoked by clicking on the on-screen "Save" button. At that point, the system determines whether the portfolio is being created or enhanced for a specified client or for the user/dealer 208. (A dealer might create a standard portfolio of selected works in his own inventory or of a popular genre). Based on the type of portfolio, an identification code ("ID") is ascertained to identify the portfolio 210 or 212. The portfolio file is then searched to determine if the portfolio already exists 214. If the portfolio already exists, the item to be added is compared against those already in the portfolio to determine if it is a duplicate 220-230. This is accomplished by comparing "ISANs", 228. (ISAN stands for International Standard Artwork Number and will be used throughout the art world to identify individual works of art.) If the work is not in the portfolio it is added and the system then checks for further works to be added 230, 220. When all the selected works have been added to the portfolio, the system returns control to the vignette display routine 221 shown in FIG. 6.

Figure 11:
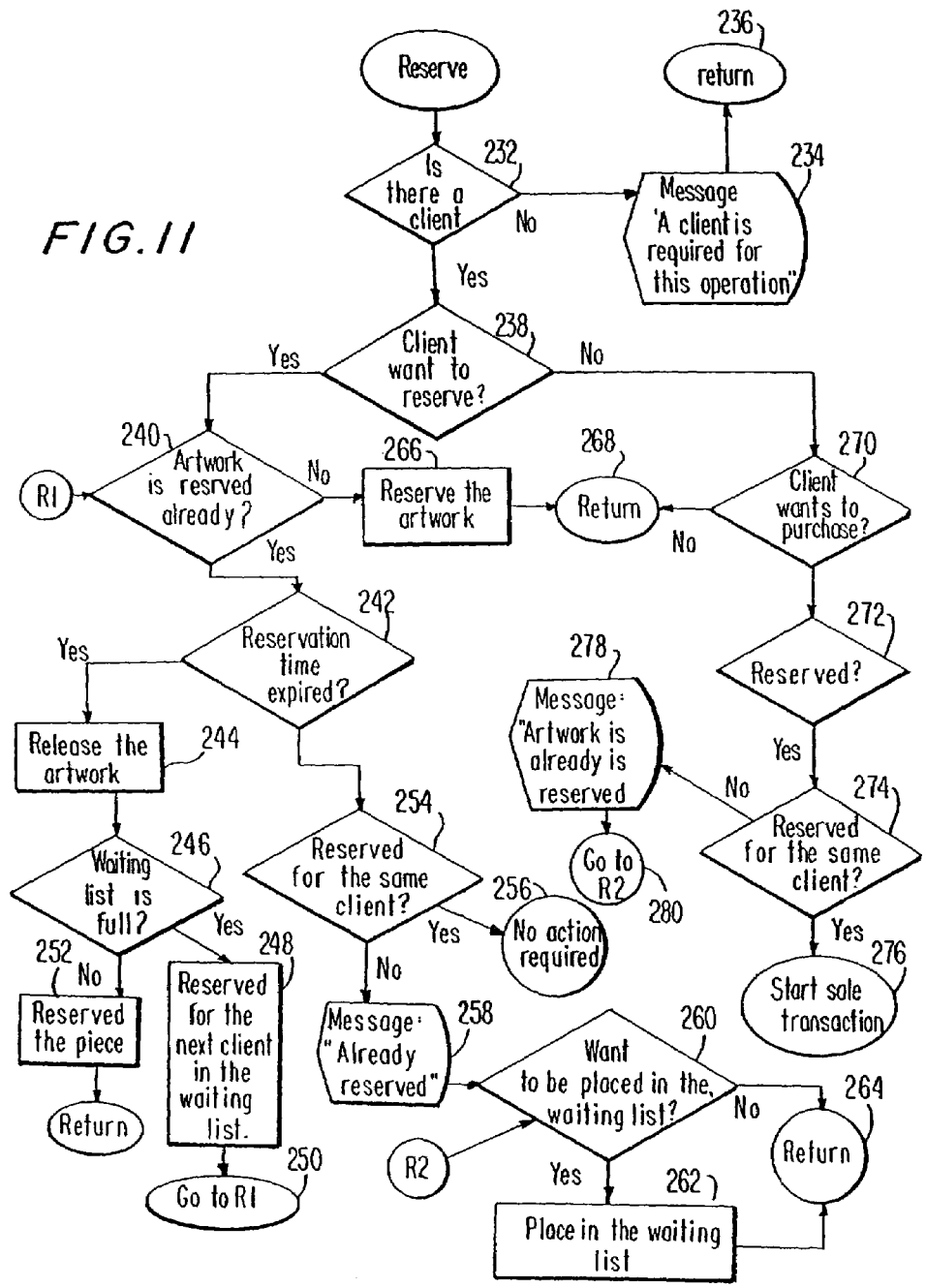

The reserve process, whereby a client can reserve one or more selected works for a period of time, is another unique feature of the present invention and is shown in FIG. 11. The placement of a reserve on a work prevents anyone else from purchasing that work during the reservation period. When this routine is invoked, the system first verifies that a reservation is being made on behalf of a client 232. If not, control is returned to the vignette display routine 234-236. Assuming all is in order, a signal is sent over the network to the host computer to determine if a reserve has already been placed on the work 240. If no previous reserve has been placed, the system stores the current request on the host computer 2 and reserves the work for the present client for a period of time 266. If the selected work is subject to a valid reserve 242, the present client is so informed and may be added to a waiting list (queue) 258, 260-264. When the reservation time expires, the next person on the waiting list is automatically given a reserve on that work 242-250. Should the client wish to purchase the work, the purchase process cannot be begun if someone else has already reserved it 270-274, 278. If that client holds the reservation or there is no reservation, the sale transaction can be undertaken 274-276.

Figure 12:
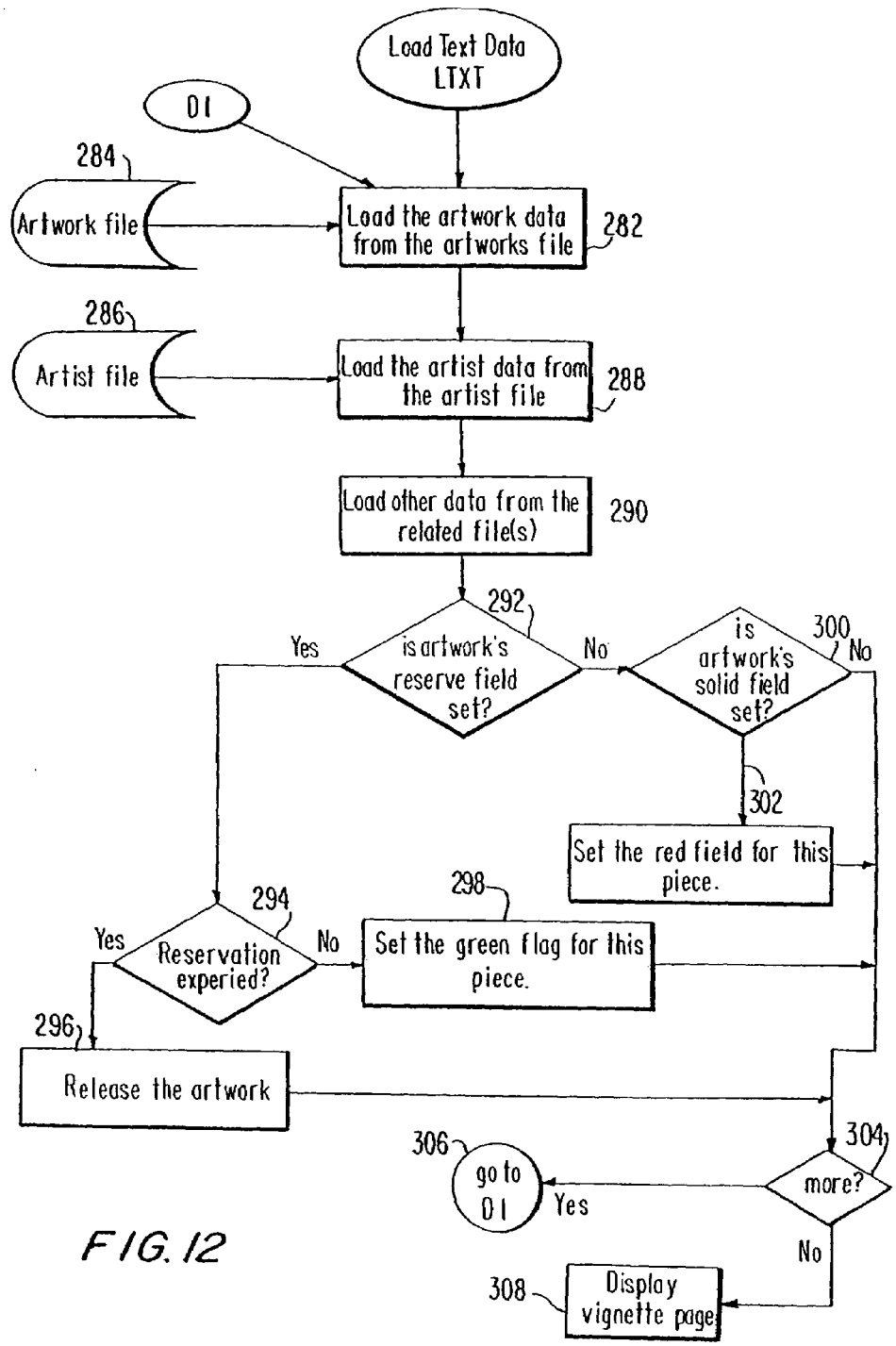
Figure 13:
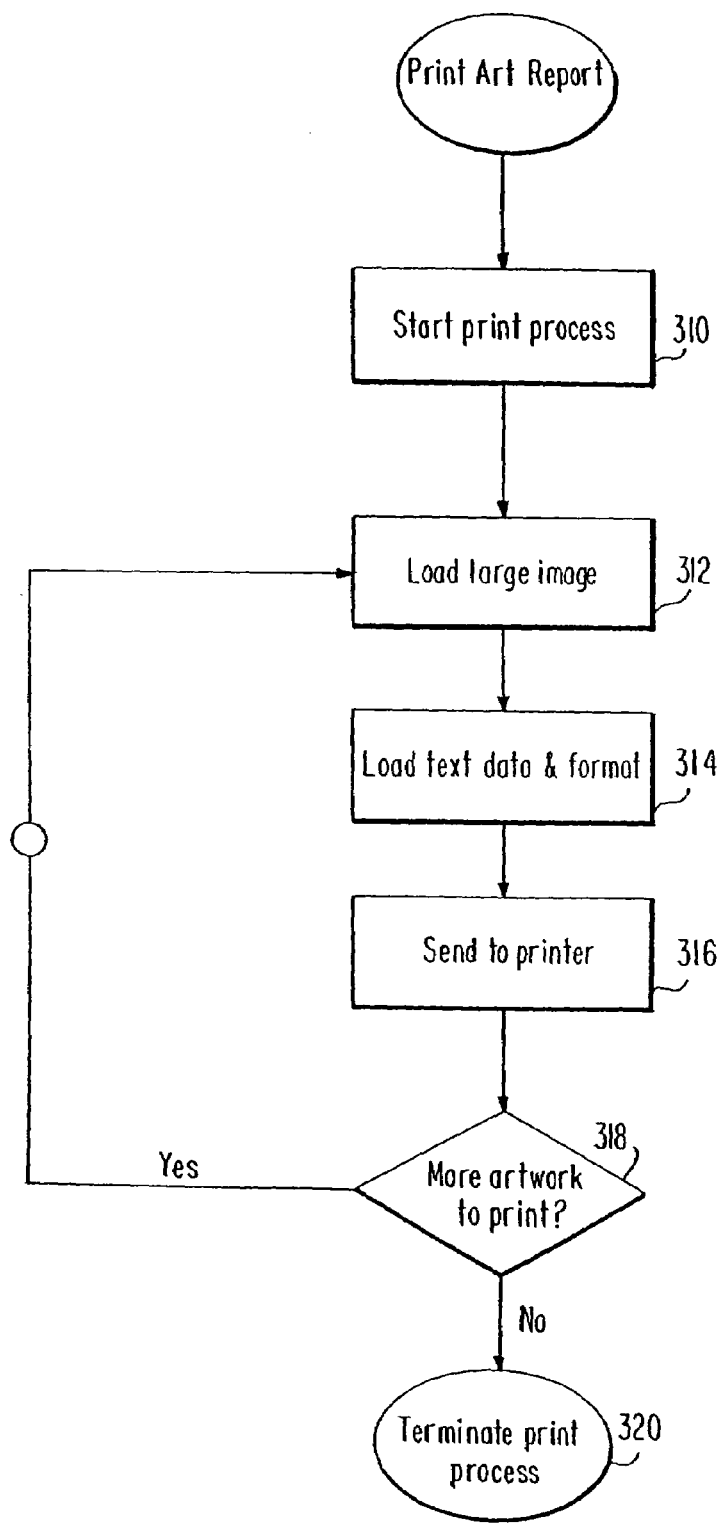

An art report comprises a print-out of one or more selected images and any relevant information about the work(s) which is stored on the system. This information includes the artist's name, title of artwork, date, size and medium, and may include items such as birth date, common media, selling prices, data about the work itself such as previous selling price(s), etc., and whether the work has been reserved or sold. The routine which loads the text data is shown in FIG. 12, while the art report print routine is shown in FIG. 13. After the text data is accumulated 282-308, the art report print routine proceeds in a manner virtually identical to that for printing vignettes of large images 310-320, described above.

Figure 14:
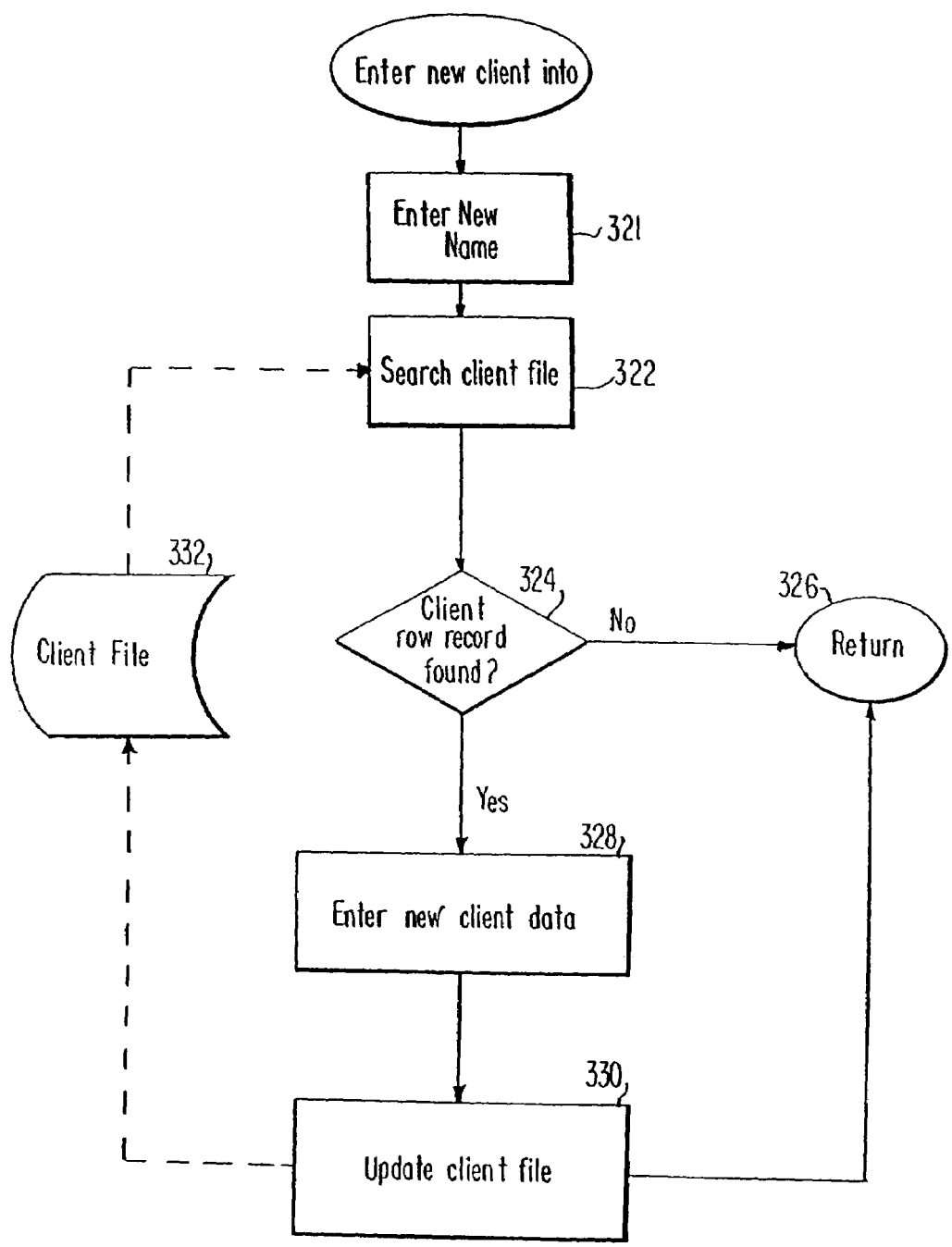

New client information can be entered at virtually any time during use of the system. After the new client option (as defined above) is selected (which creates a client record), the user can enter detailed client information any time he/she wishes. This must be done, however, before another client is identified, in one of the ways described above. The client information option, which is available on the Search screen, the Vignette screen and the Large Image screen, gives the user the ability to complete the detailed client information. In other words, a new client button is clicked and a prompt appears requesting input of the new client's name. As shown in FIG. 14, after the client's name is input 321, the system then checks the client database file 332 to verify that the client is not already on the system 322-326. The system then prompts for additional information about the client 328 and then stores all input information 330 as a client record in the client database file 332.

Figure 15:
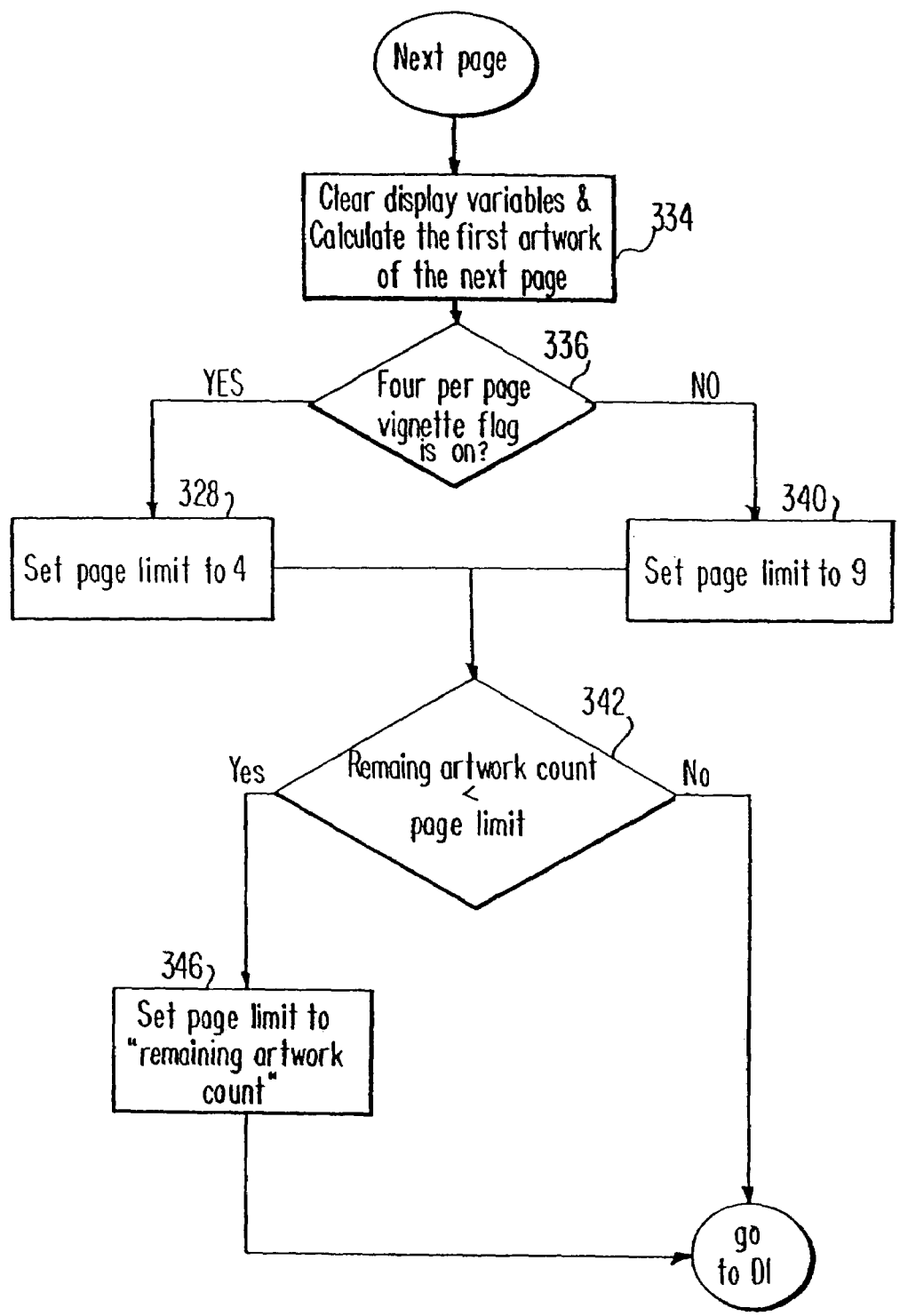
Figure 16:
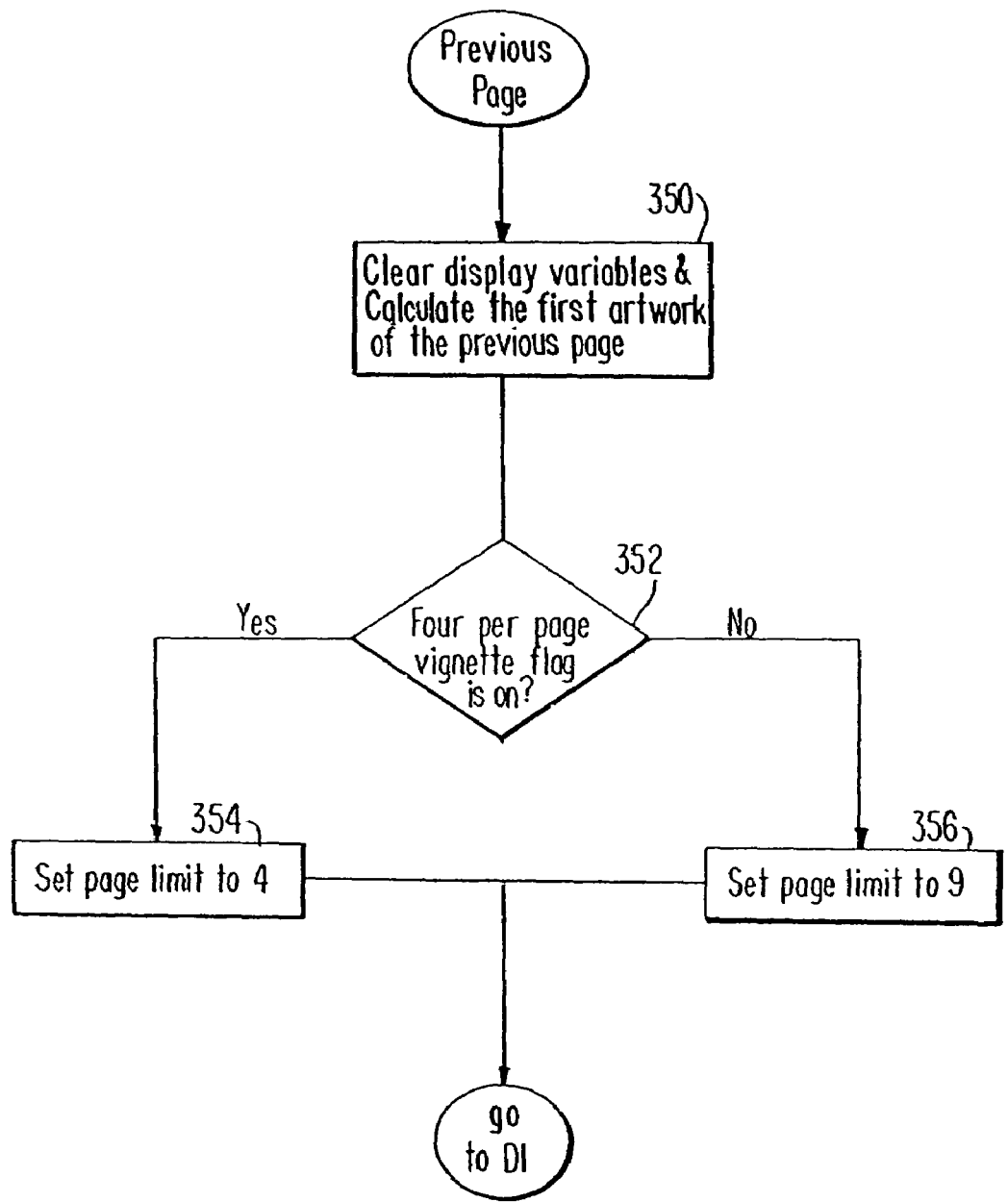

As shown in FIGS. 15 and 16, displaying the next or previous page of a vignette screen involves the initial clearance of all current display variables 334/350. Then the first work of the next or previous page is calculated 334/350. A determination of the number of images to be displayed is made 336-340/352-356 and if a previous page is to be displayed, the display routine shown in FIG. 6 is immediately invoked. If the next page is to be displayed the system first determines whether there are less available than the full number of images capable of being displayed 342. If there are less than the full number of images to fill the page, the page limit is set to the new amount 346. Thereafter, the display routine of FIG. 6 is again invoked.

Figure 17:
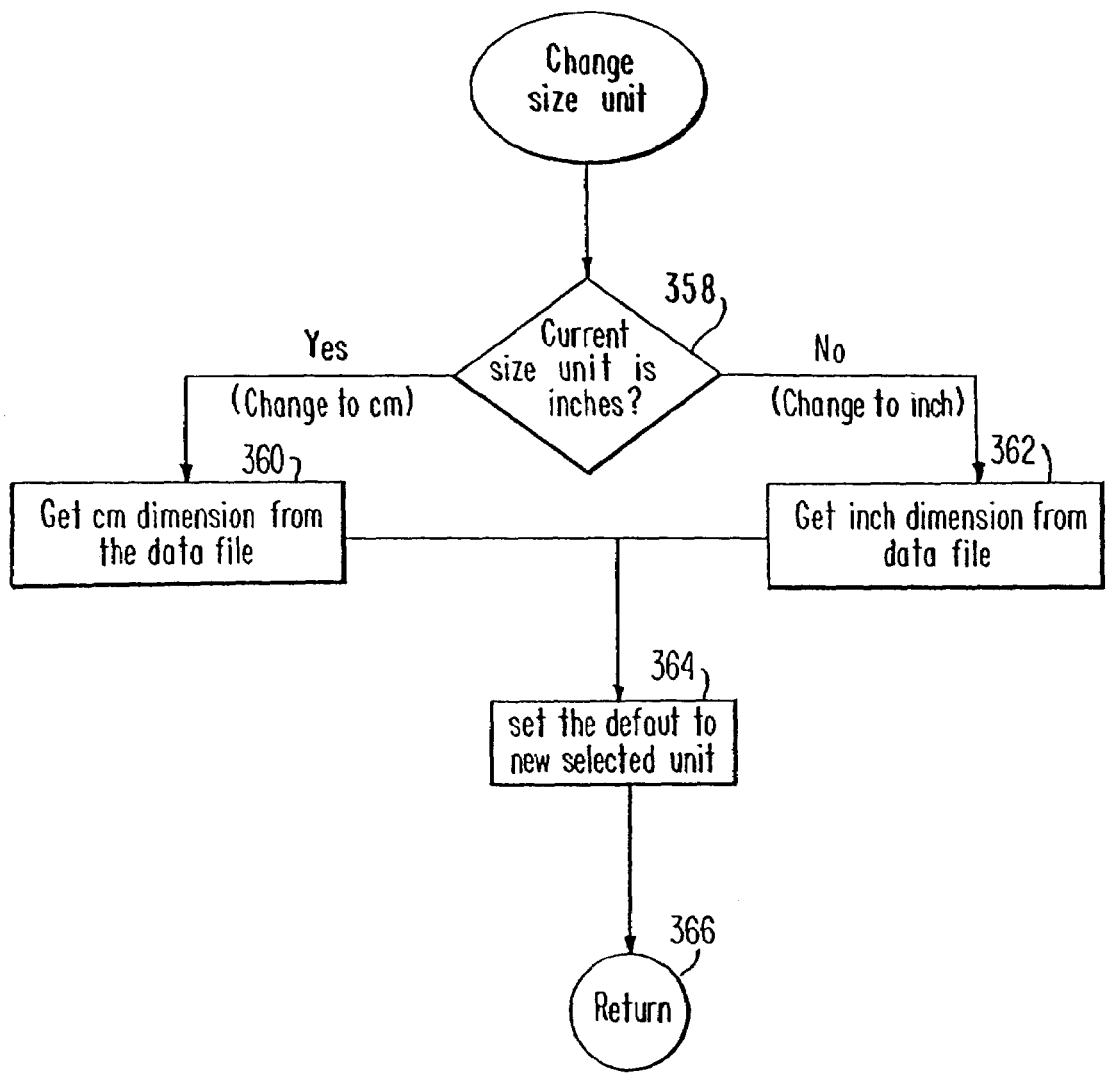

The default size units can be altered so that the system automatically presents the preferred units of measurement of the various displayed works. This is accomplished by clicking on the dimension display area in the artwork page, or the dimension unit in "options". A change size unit routine 358-366 is then invoked and the necessary data 360 or 362 is retrieved from the artwork data file. (See FIG. 17).

Figure 18:
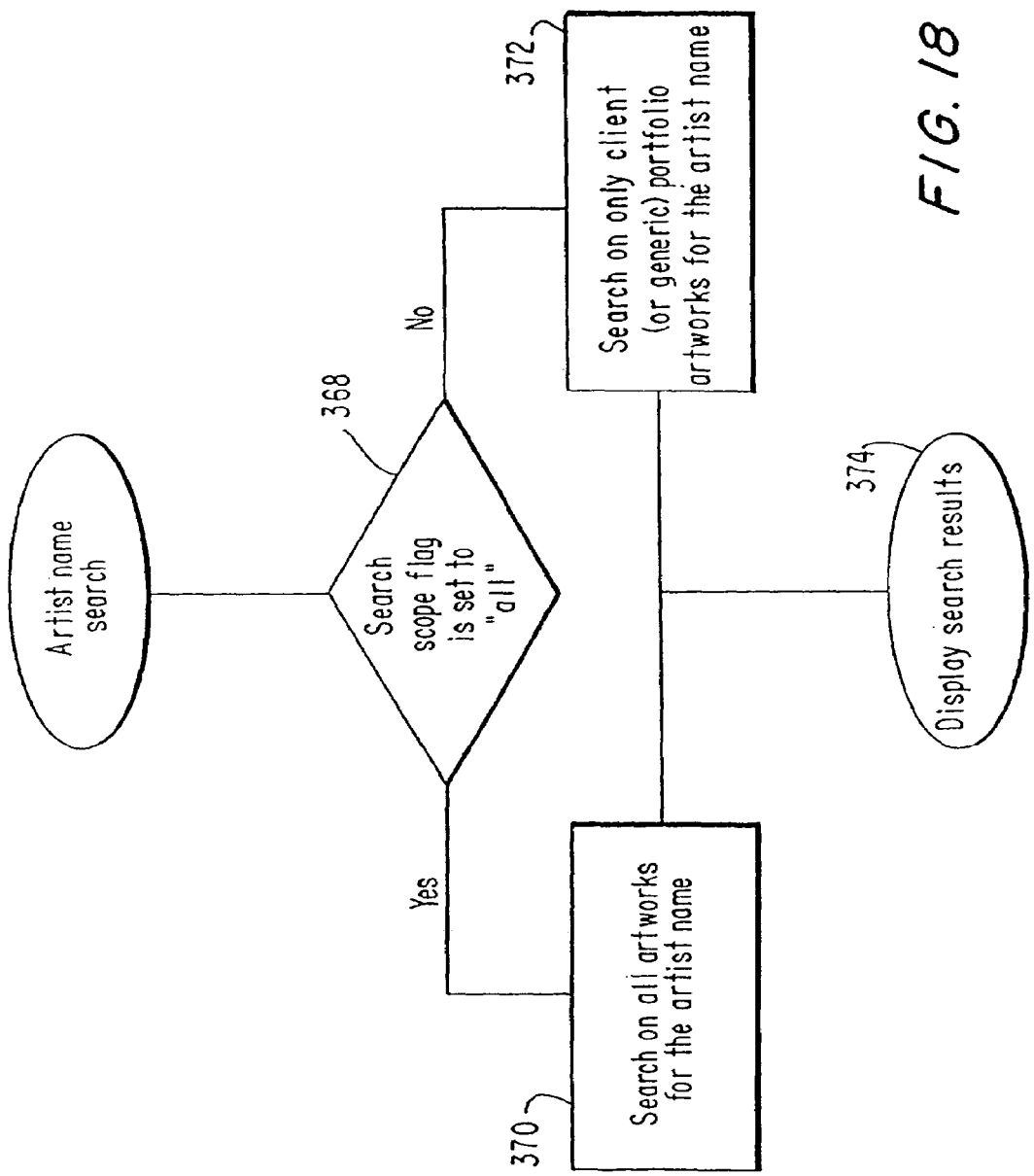
Figure 19:
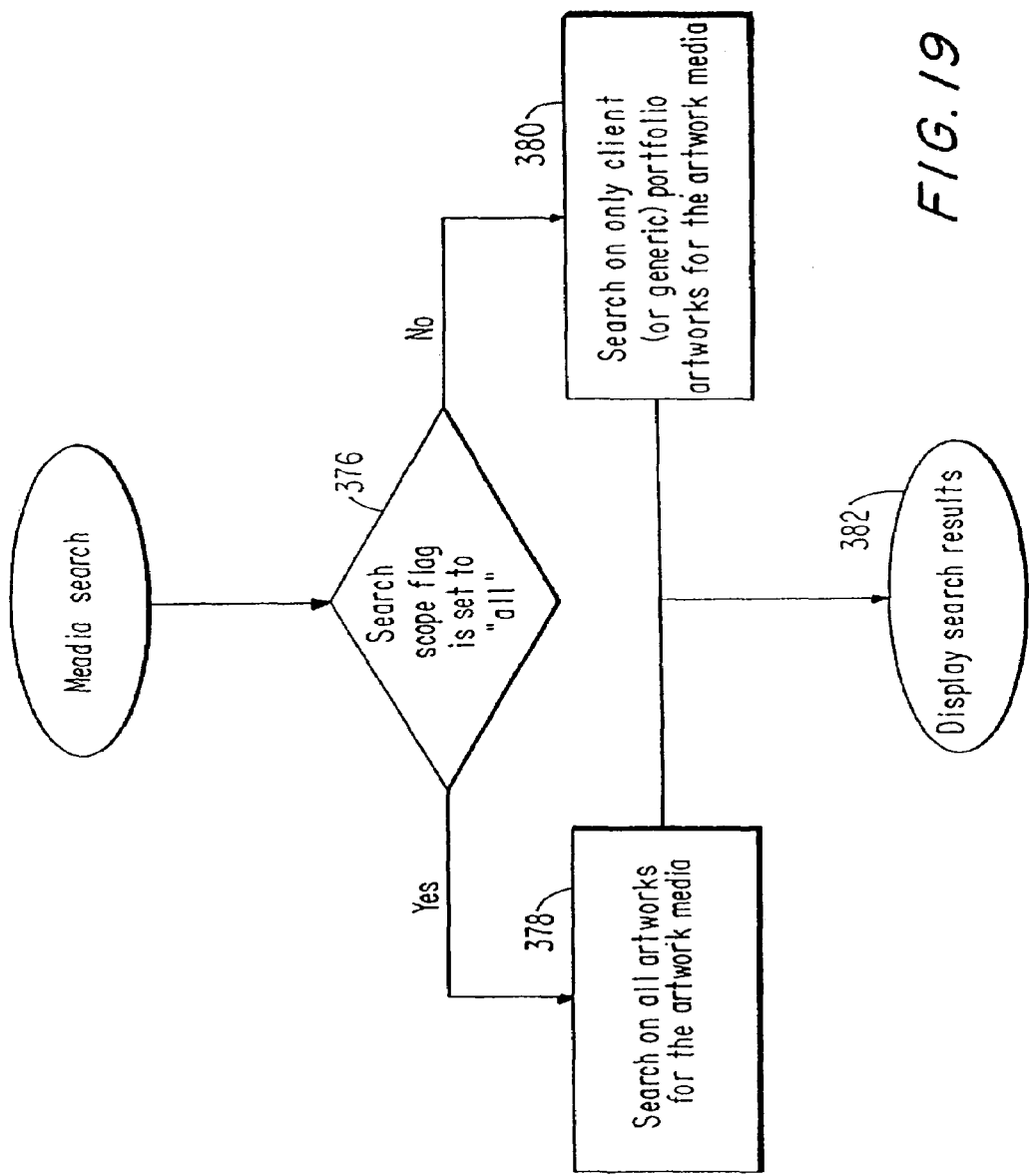

Searches for additional works of a selected artist or medium can be conducted by clicking on the artist's name and/or a medium. An "Expand" button toggles the default search scope between the entire system and the currently selected portfolio (See FIGS. 18 and 19). Depending on the search criteria chosen, either a media search routine 376-382 or an artist name search routine 368-374 is invoked. The search results can then be displayed as set forth in FIG. 6.

When a single image is displayed in the large image format on the view monitor 11, a brief biography of the artist is displayed on the work monitor along with slightly different options than are available when the vignette format is chosen. (See FIGS. 7 and 8). The two key option differences are the availability of playing movies about selected artists and displaying price data.

Figure 20:
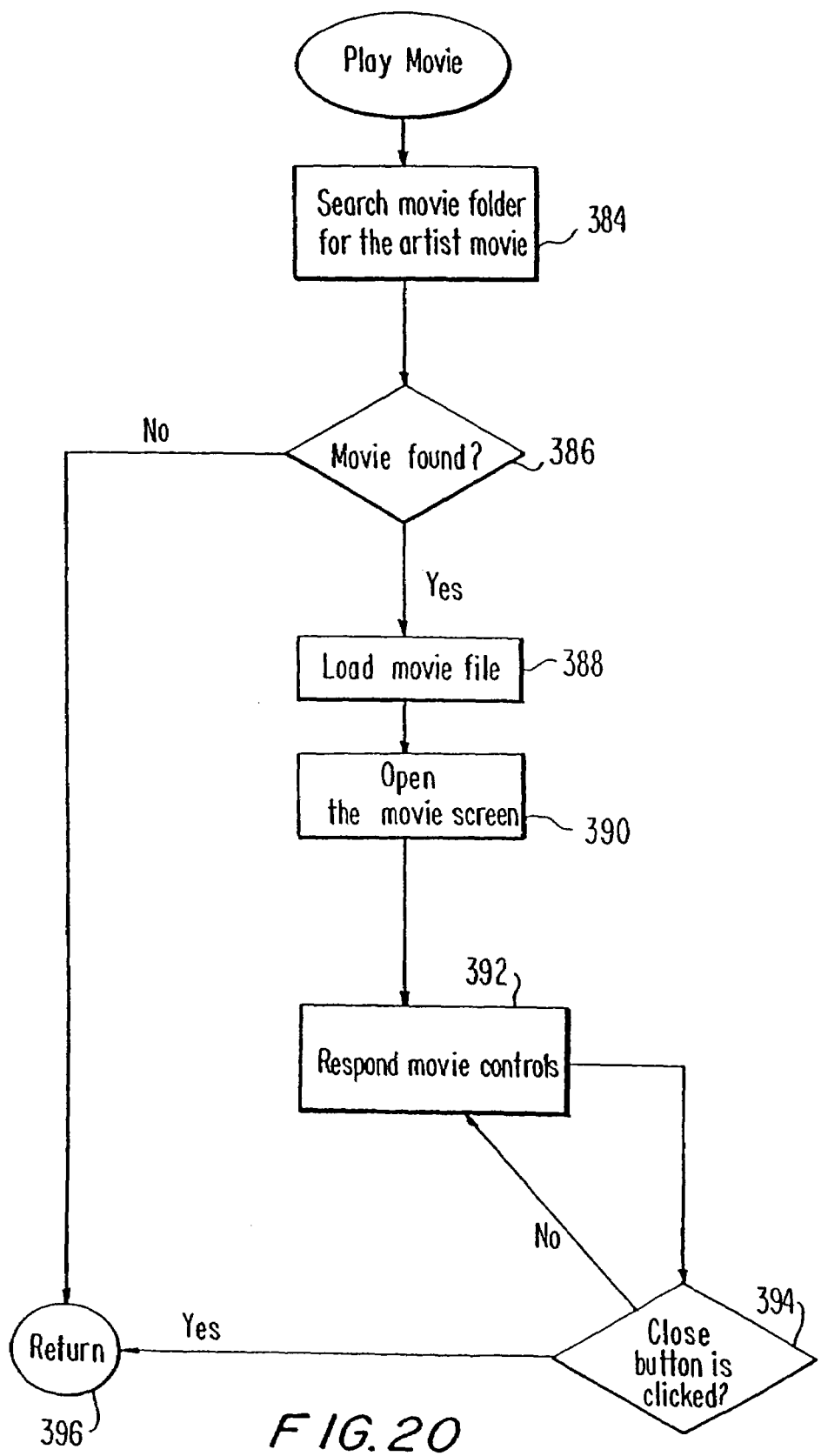

Selecting a movie button on the screen plays any available video image corresponding to the artist of the displayed work. As shown in FIG. 20, a movie file is searched to locate any corresponding artist's movie 384. If a movie is found 386-390, it is loaded and available for viewing on the work monitor 13. A series of buttons, like those on a VCR, appear beneath the movie screen which permit the dealer to play, stop, rewind, etc. the movie 392. When the dealer is finished showing the movie, the movie screen is closed by clicking on the movie close button 394 and control is returned to the large image work monitor with the artist's biography 396.

Figure 21:
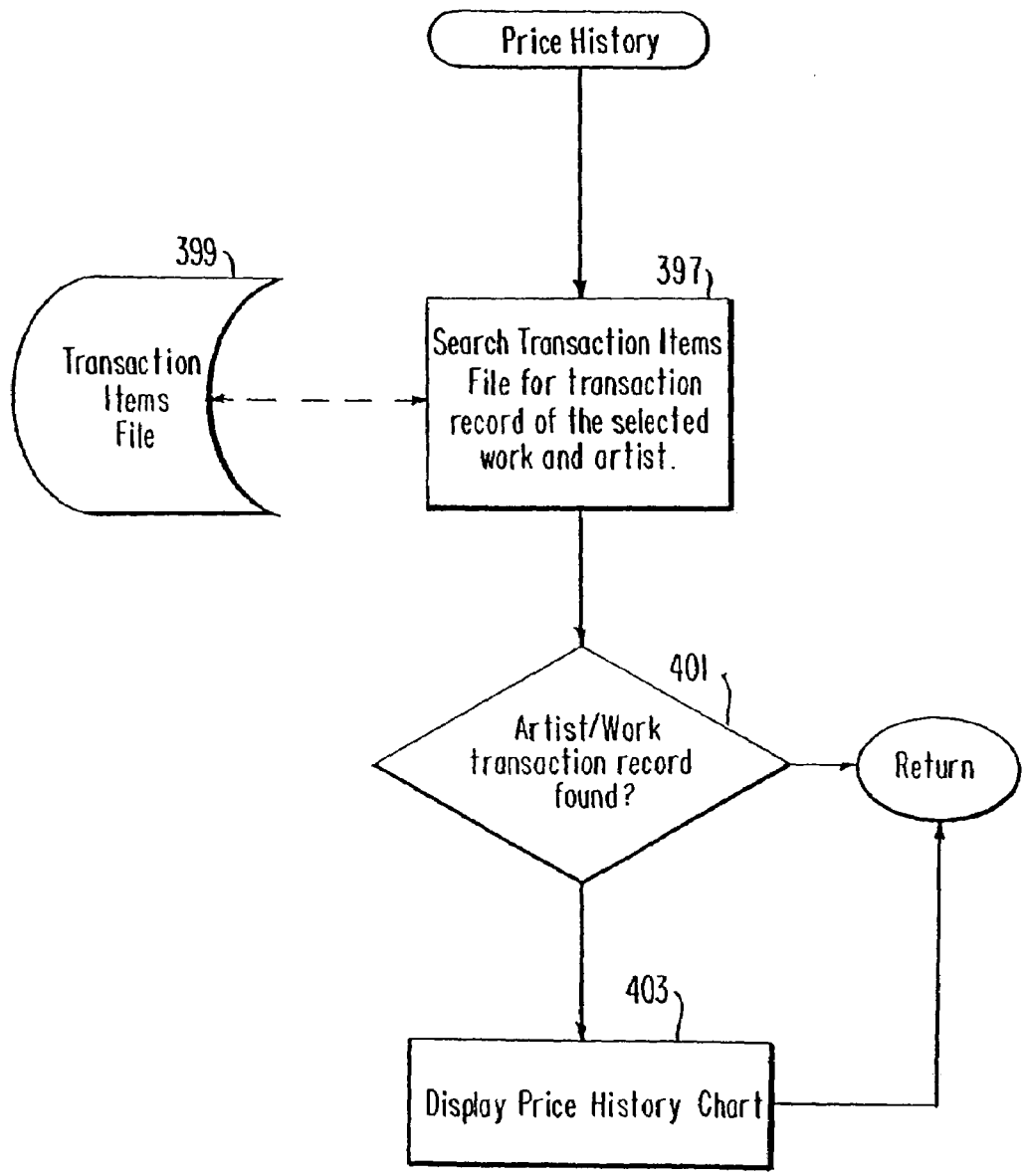
Figure 22:
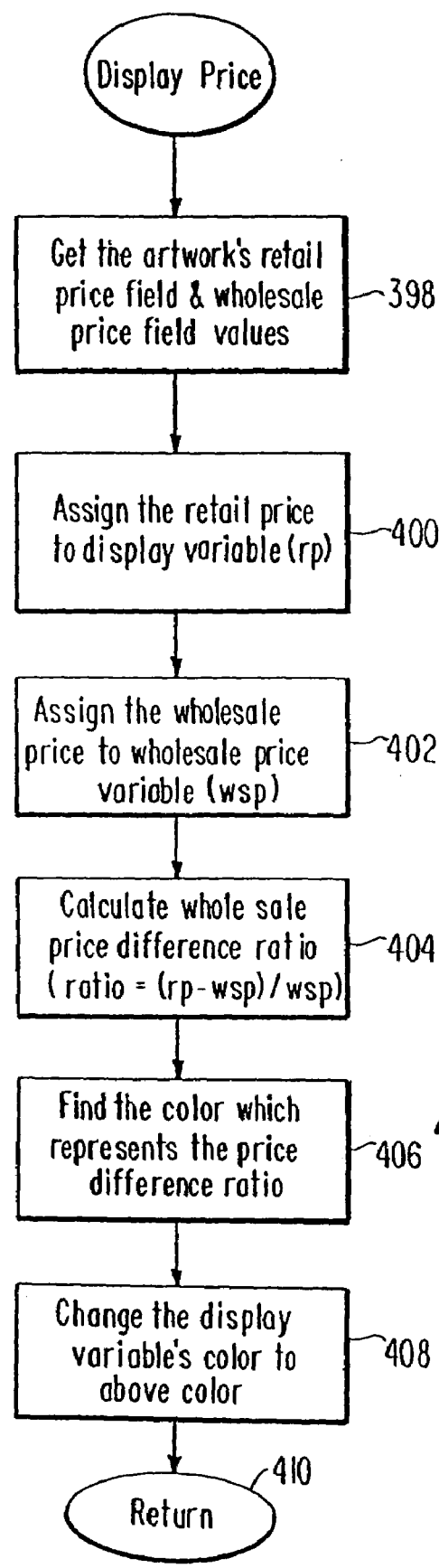

Clicking on a "History" button displays a price history of the displayed work. (See FIG. 21). It accomplishes this by accessing information 397, stored on the system in a Price file 399, which delineates the wholesale prices paid for the work. If information about prices paid for the work and/or other works of the same artist is on the system 403, chart of prices paid for a given artist's works, defined by size, medium, and other criteria, is displayed with a cross reference to the dates of sale 403. This information is important to create and verify trends.

Clicking on the Price button shows the suggested retail price. A price difference ratio is calculated between the "suggested retail" and the "net" or "wholesale" price and a color is then momentarily displayed surrounding the retail price 398-408. The price difference ratio is calculated by taking the retail price paid minus the wholesale price paid divided by the wholesale price divided by wholesale price. This establishes the amount of discount from the suggested retail price. This discount is indicated by the color which may be selected for various discounts, such as red for 20%, blue for 30%, etc. A supplemental numeral is shown elsewhere on the screen which is used for the second discount digit, for example, a 3 added to a blue color would indicate a 33% discount from the retail price. This approach assists the dealer in setting a price in a way that prevents a customer from determining the mark up.

Figure 23:
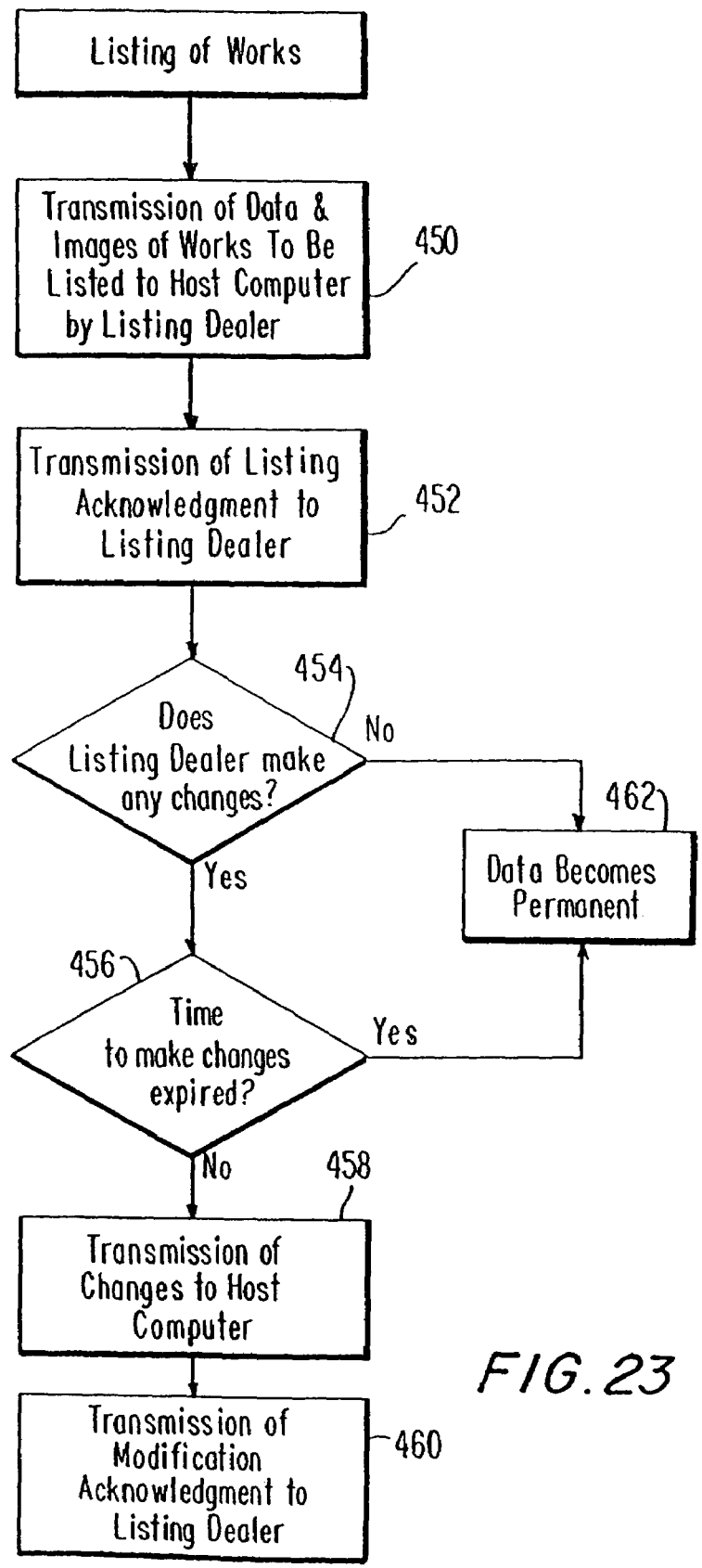

As shown in FIG. 23, when a dealer wishes to list his artwork on the system (a "listing dealer"), he arranges for the digitization of his works in one of the manners described above. He also transmits data about the various works and their corresponding artists 450—entering the information into a standard form. When the images and data have been successfully entered into the host computer 2, the system provides a numbered listing acknowledgment 452 along with an invoice for the listings. The listing dealer then has a limited time to make any changes before the data becomes permanent 462.

If the listing dealer wishes to change any of his listing data, he makes the changes and then sends them electronically 454-458 to the host computer 2. The system, in response to receipt of changed listing data from a listing dealer, acknowledges the recordation of those changes by automatically generating a distinctly numbered modification acknowledgment 460.

Figure 24:
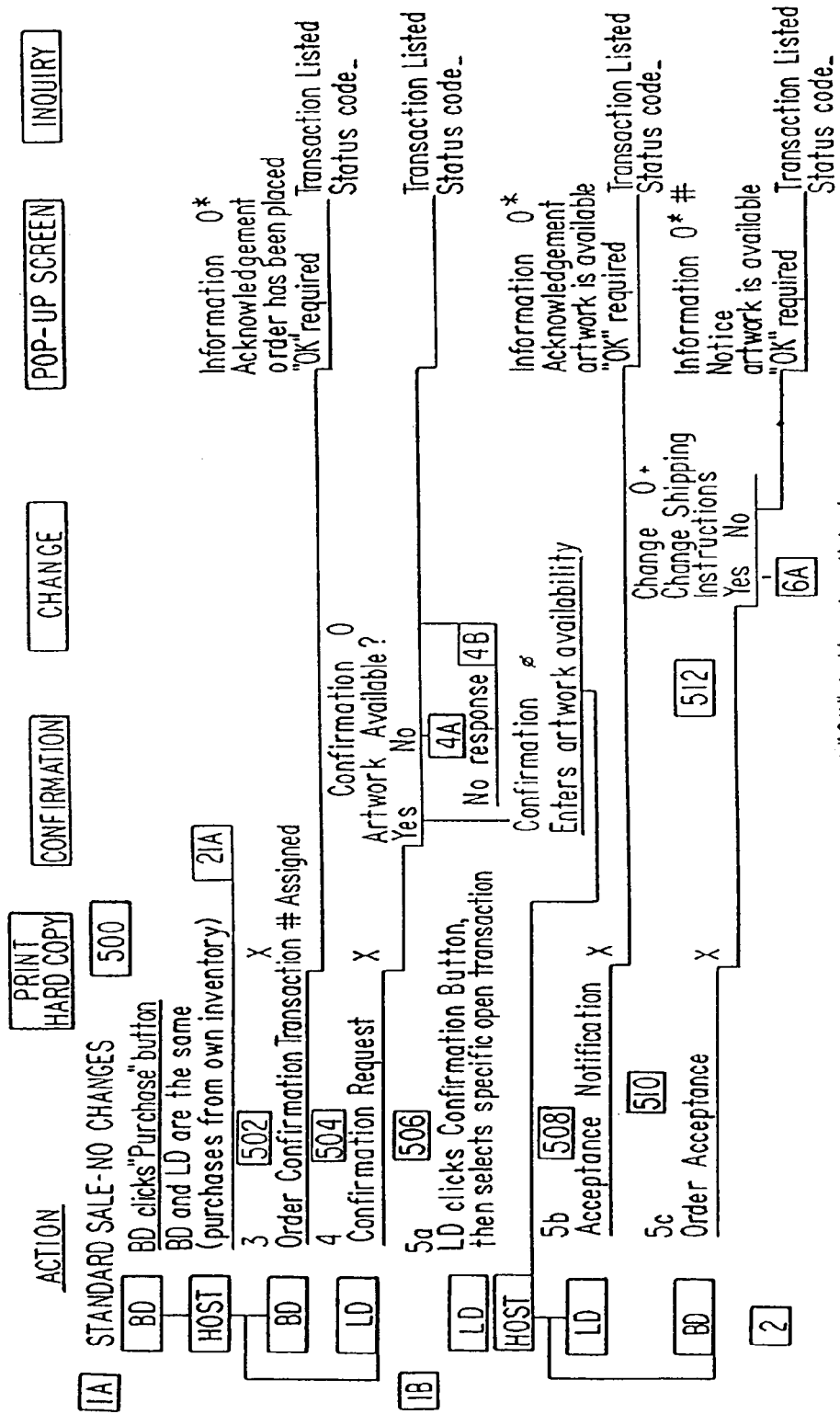
FIGS. 24-48 are "action diagrams" illustrating various features of the present invention.
Figure 25:
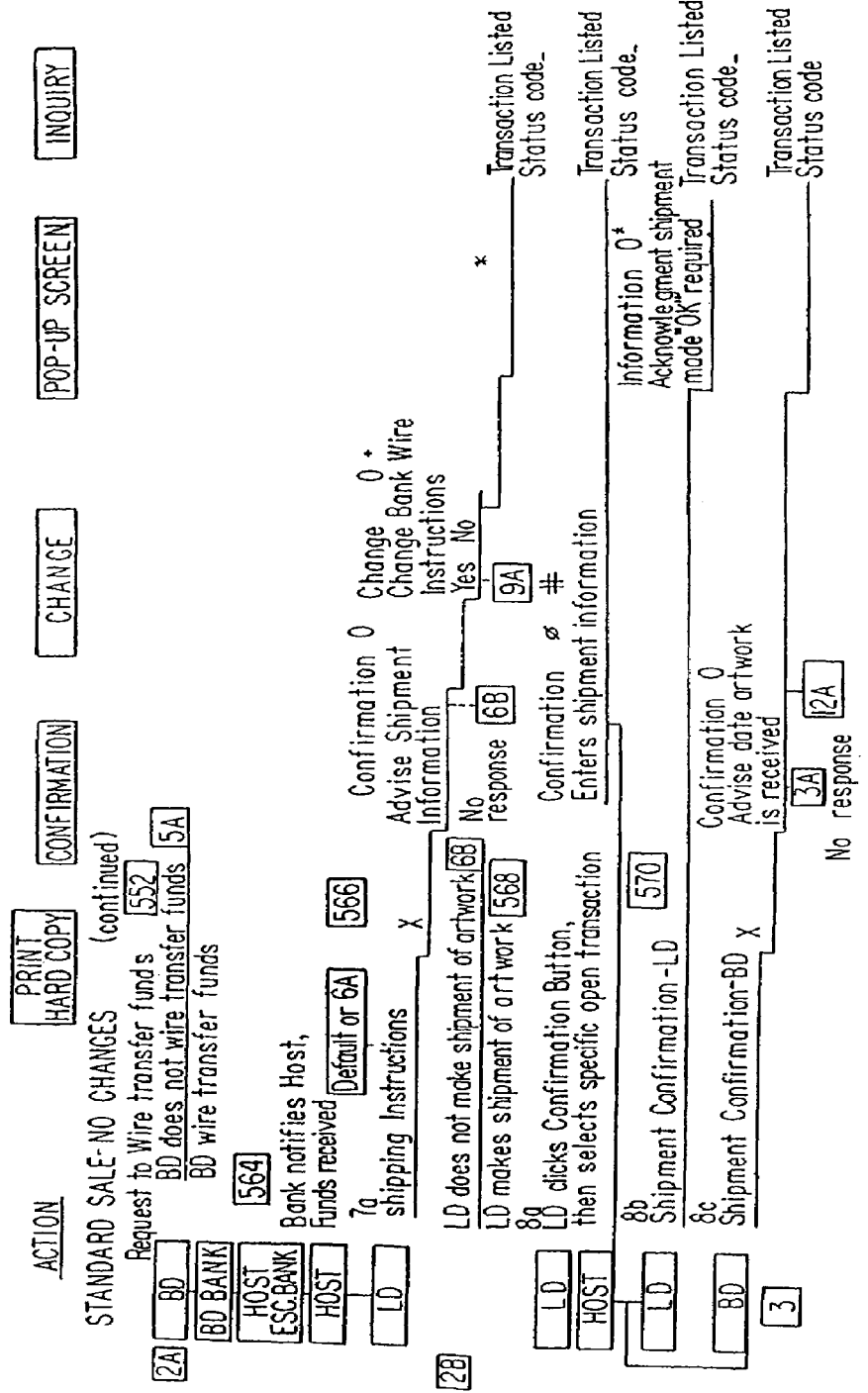
Figure 26:
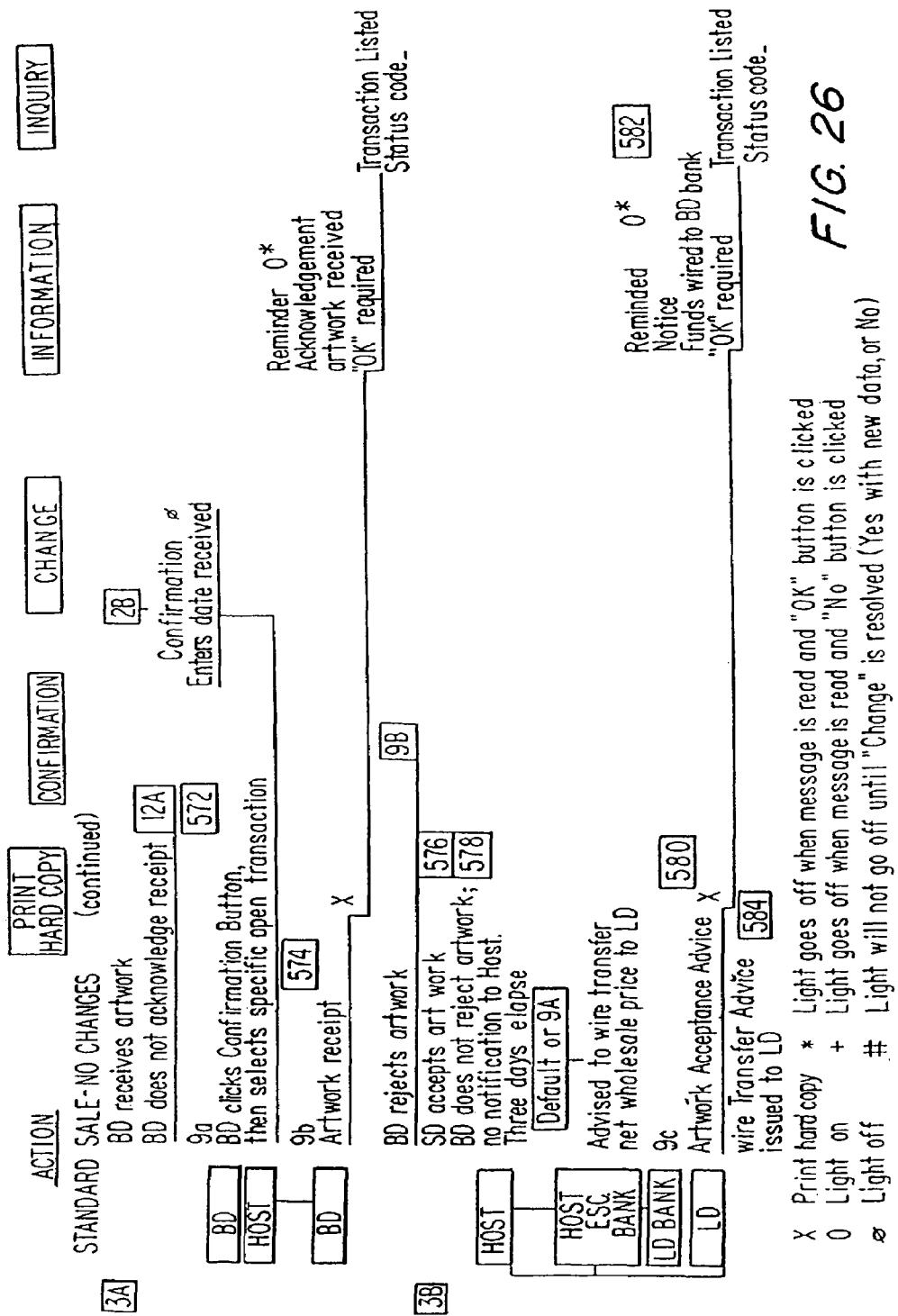
Figure 27:
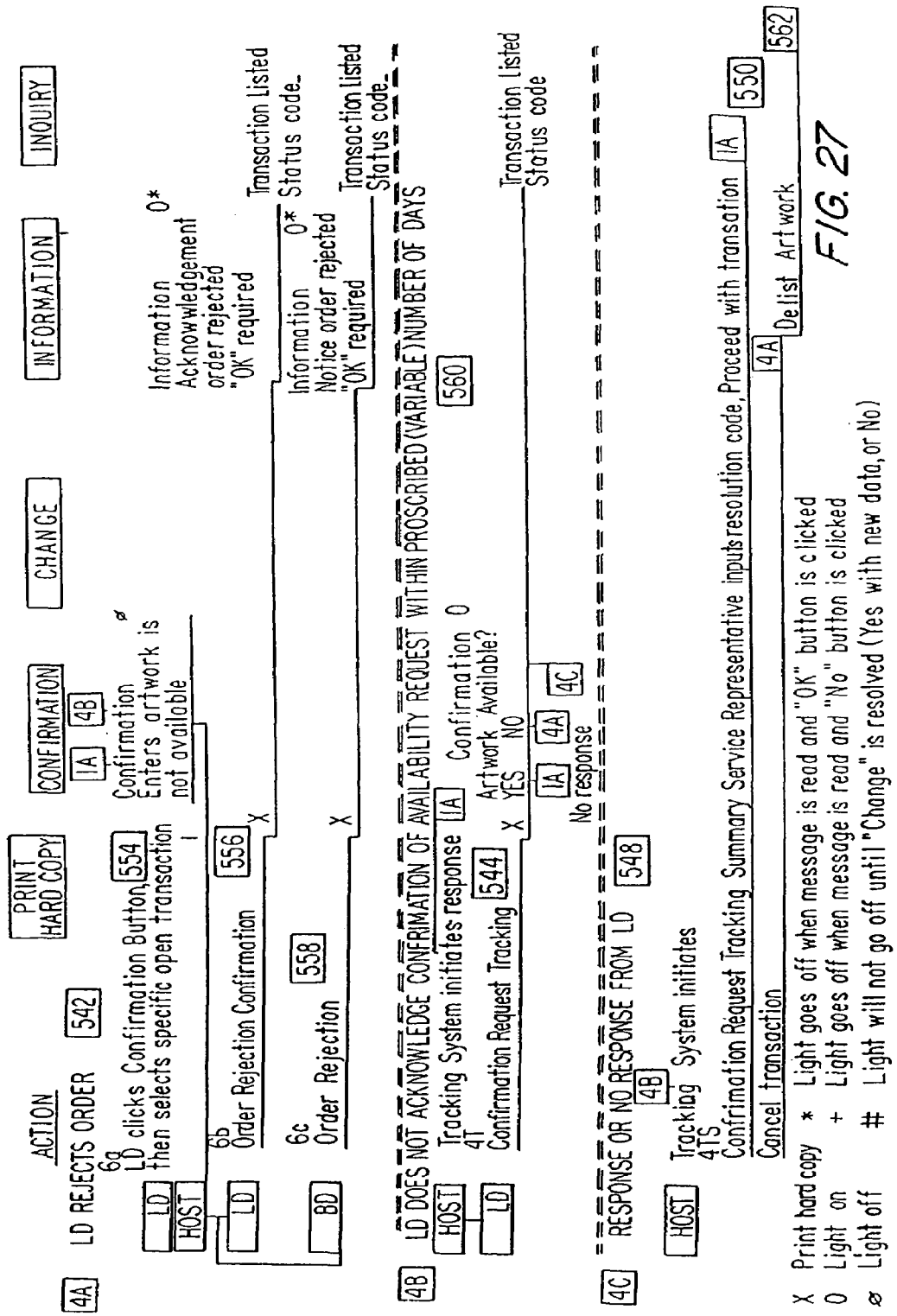
Figure 28:
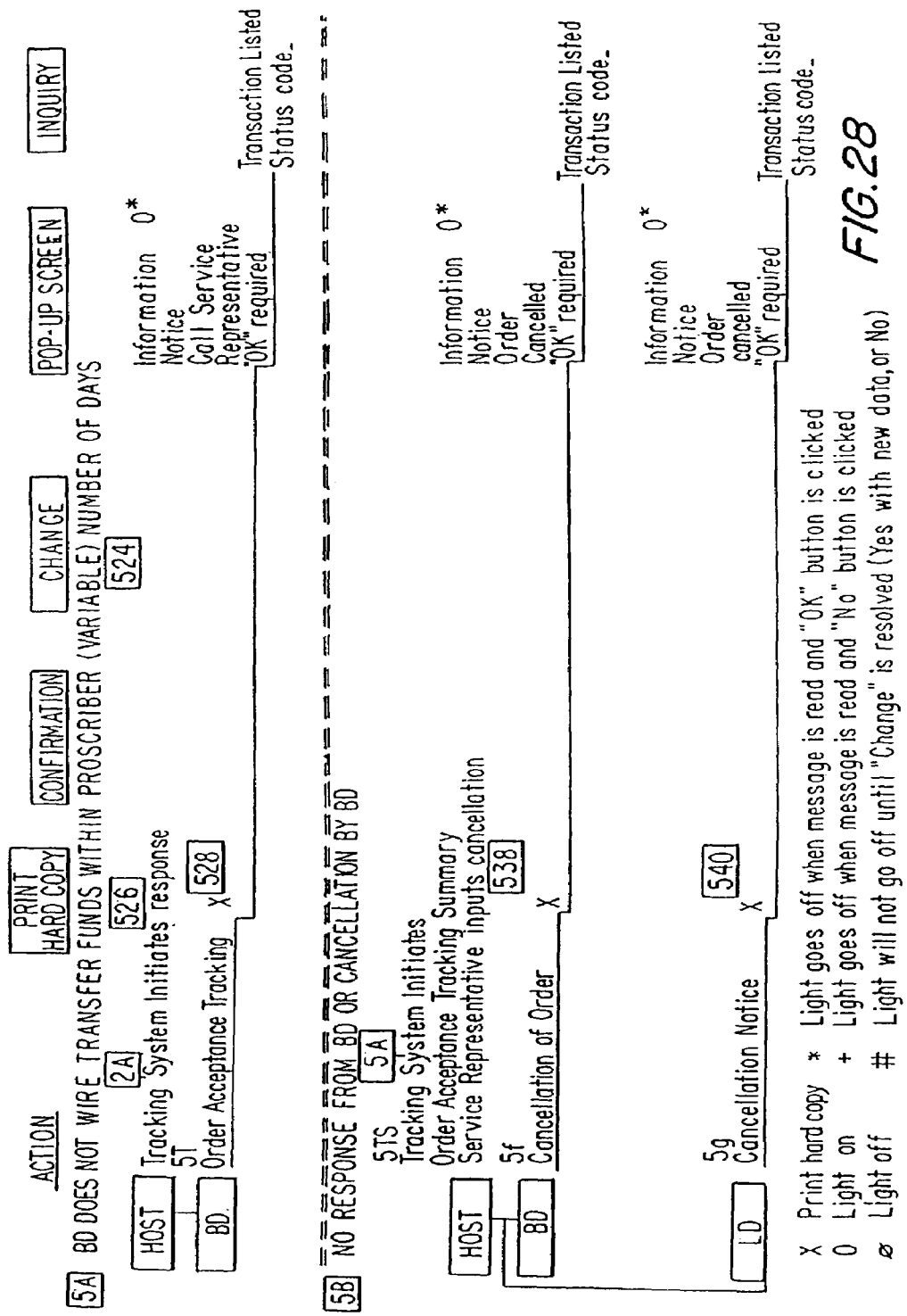
Figure 29:
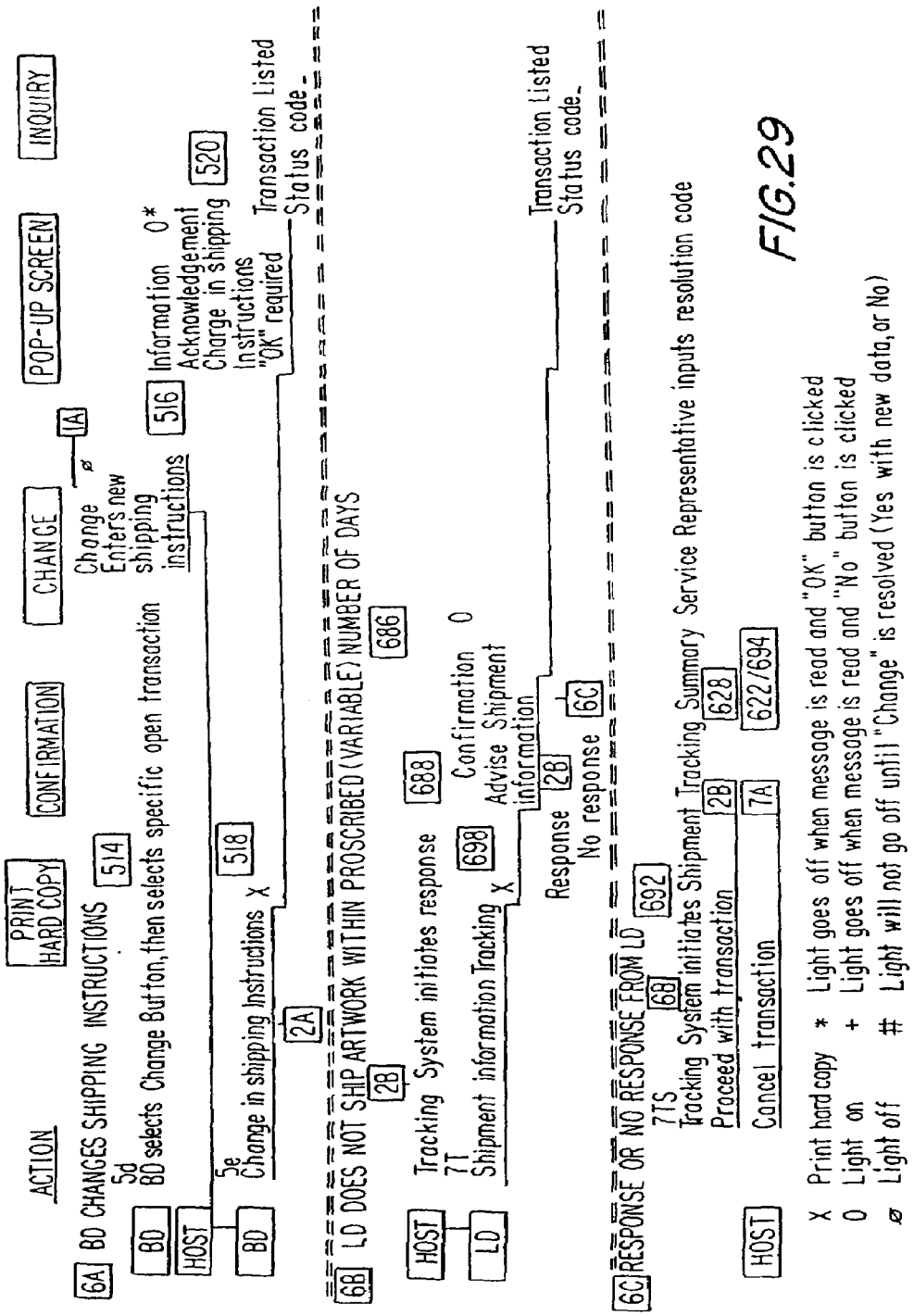
Figure 30:
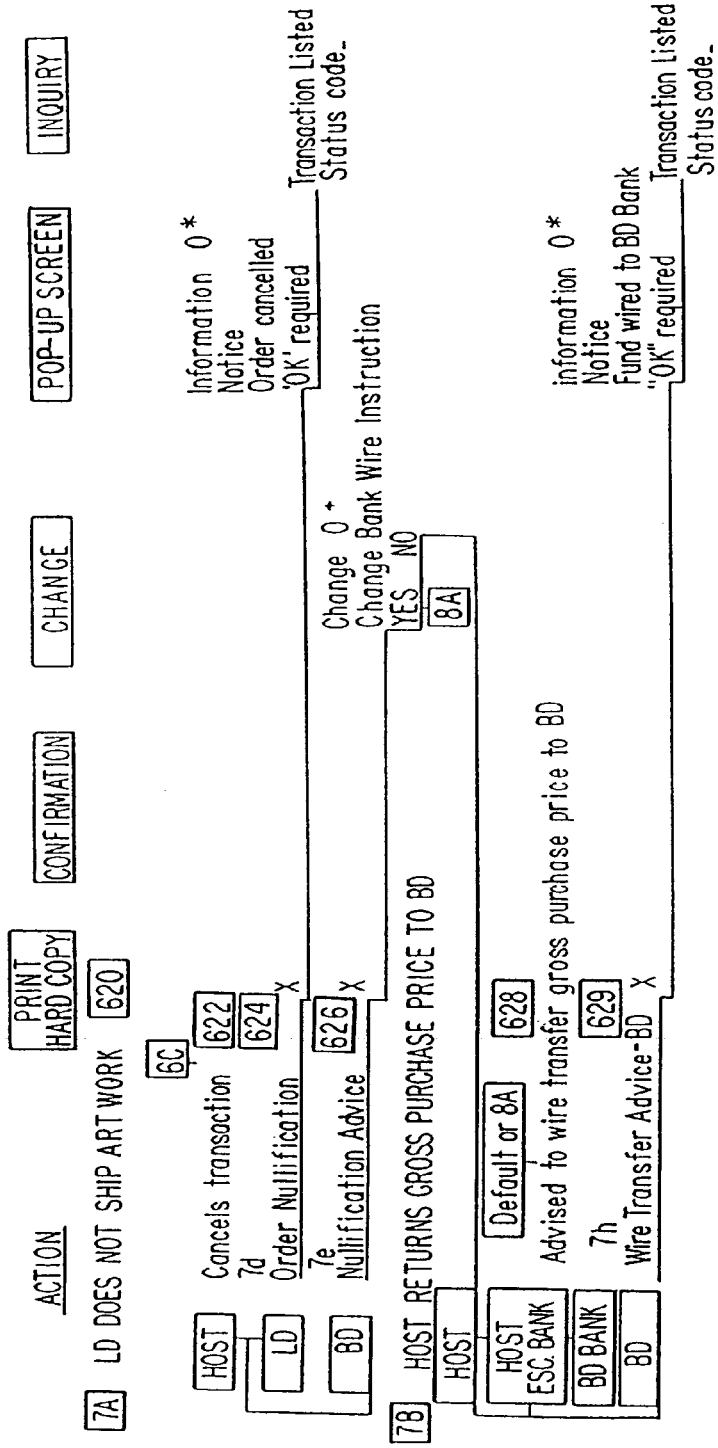
Figure 31:
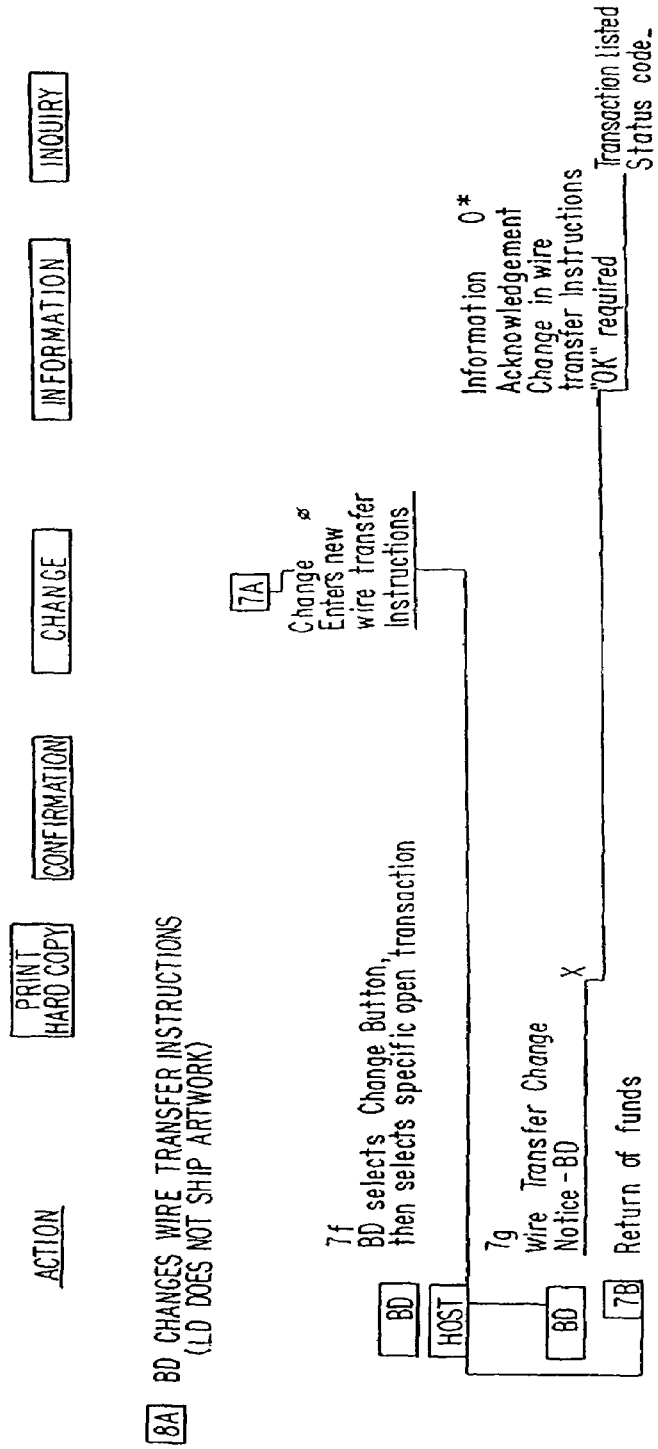
Figure 32:
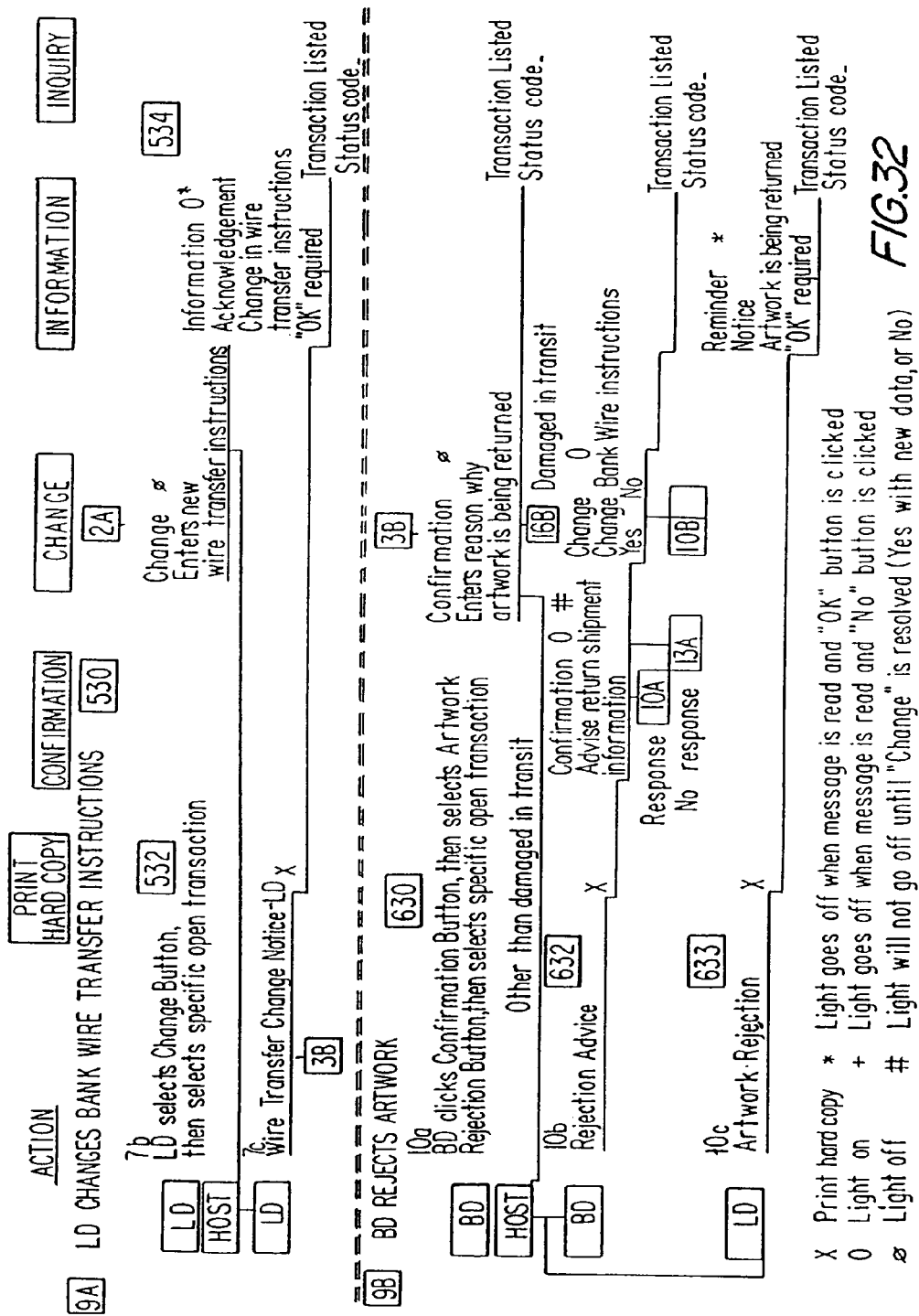
Figure 33:
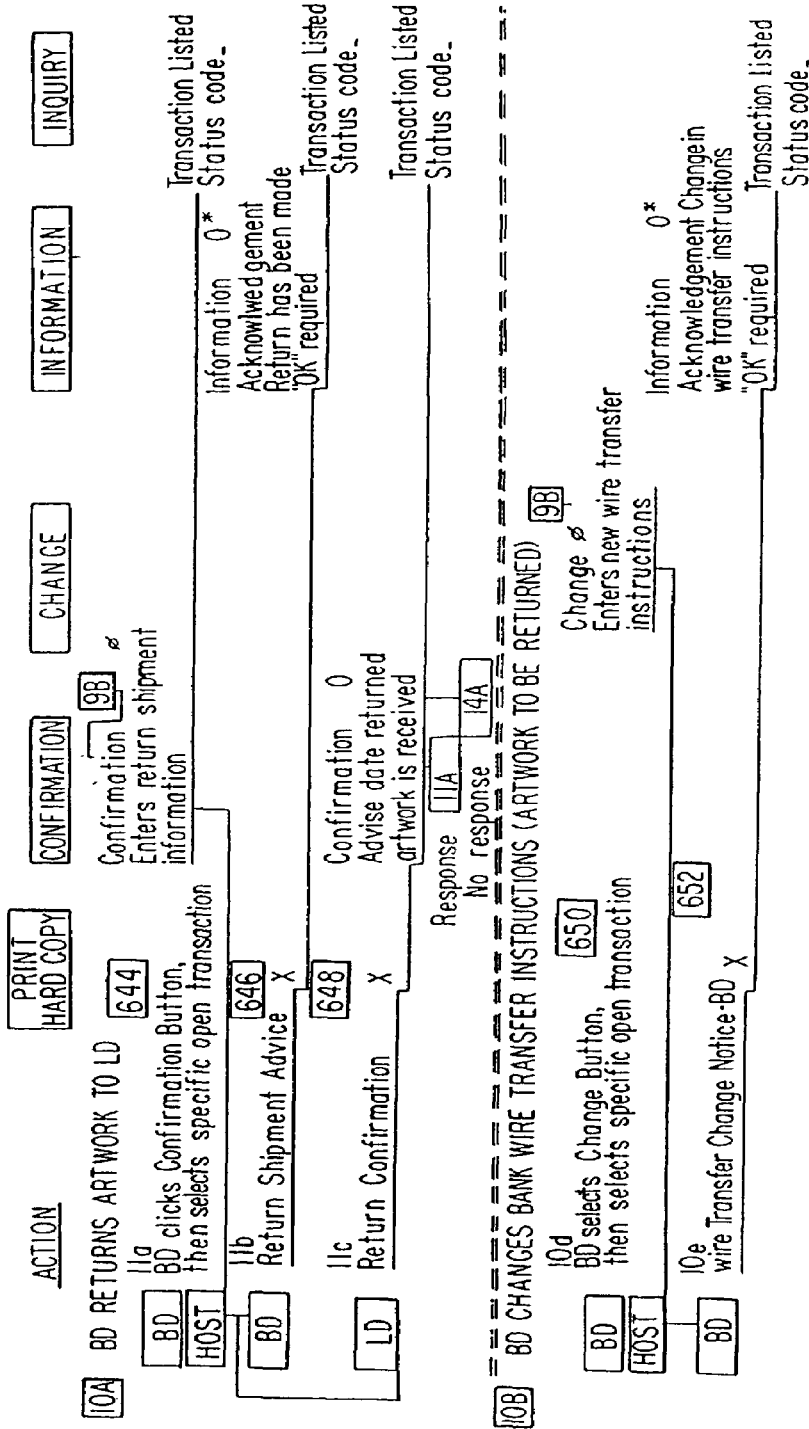
Figure 34:
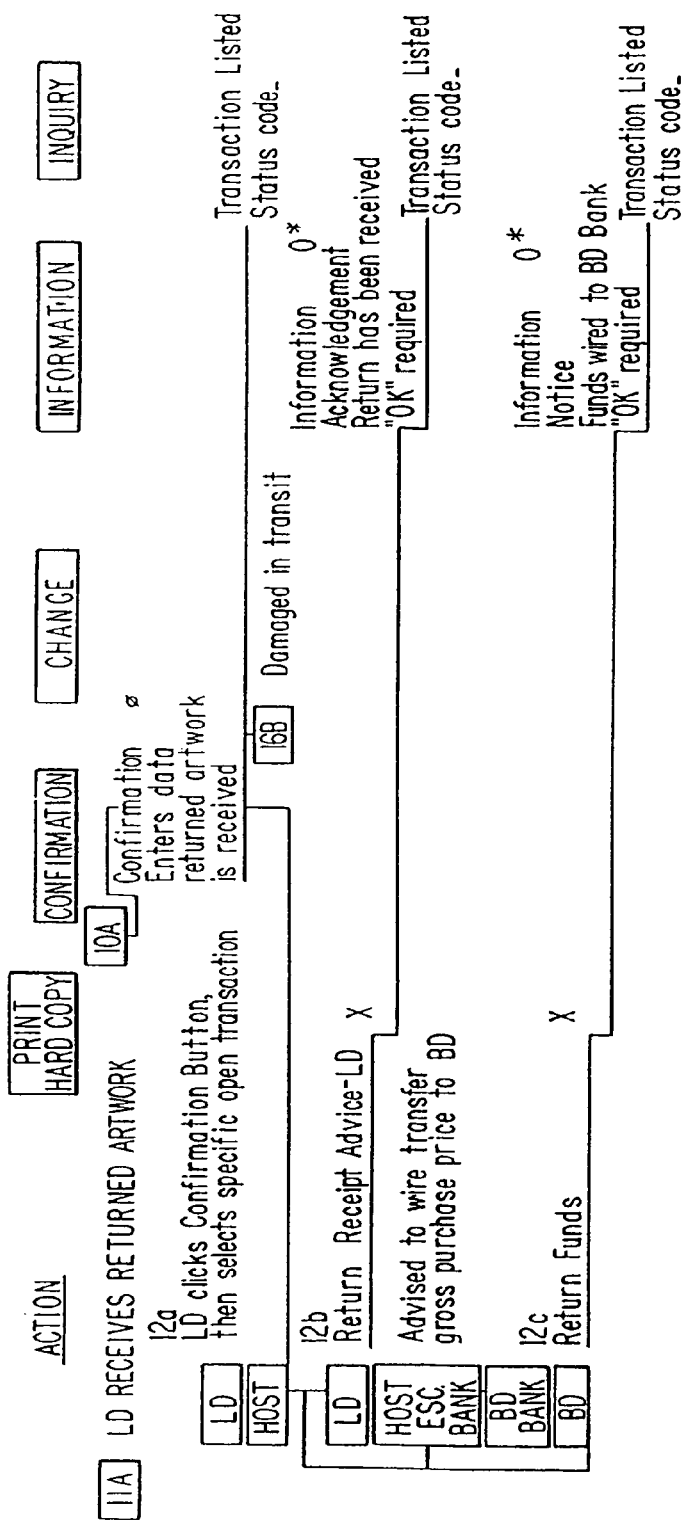
Figure 35:
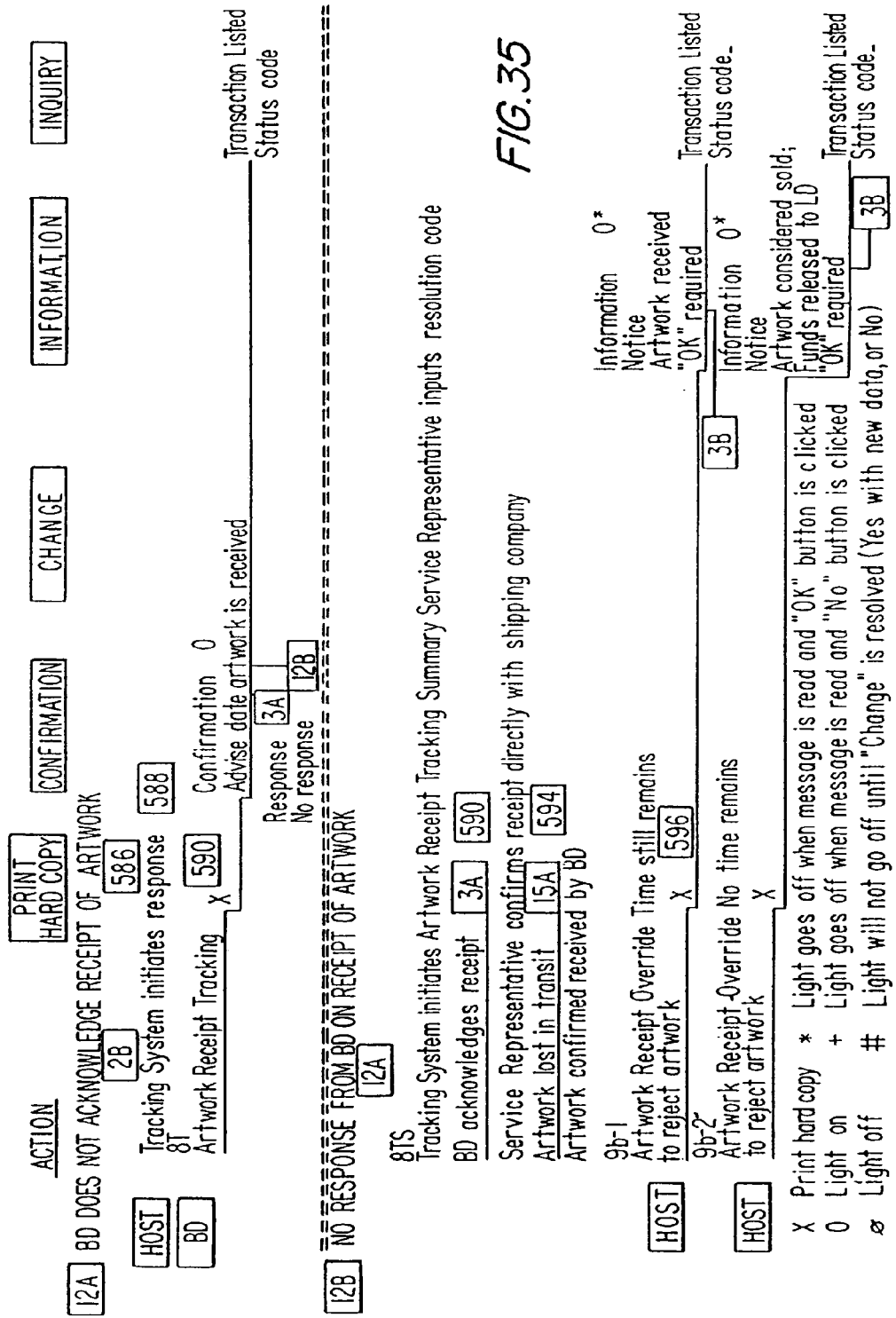
Figure 36:
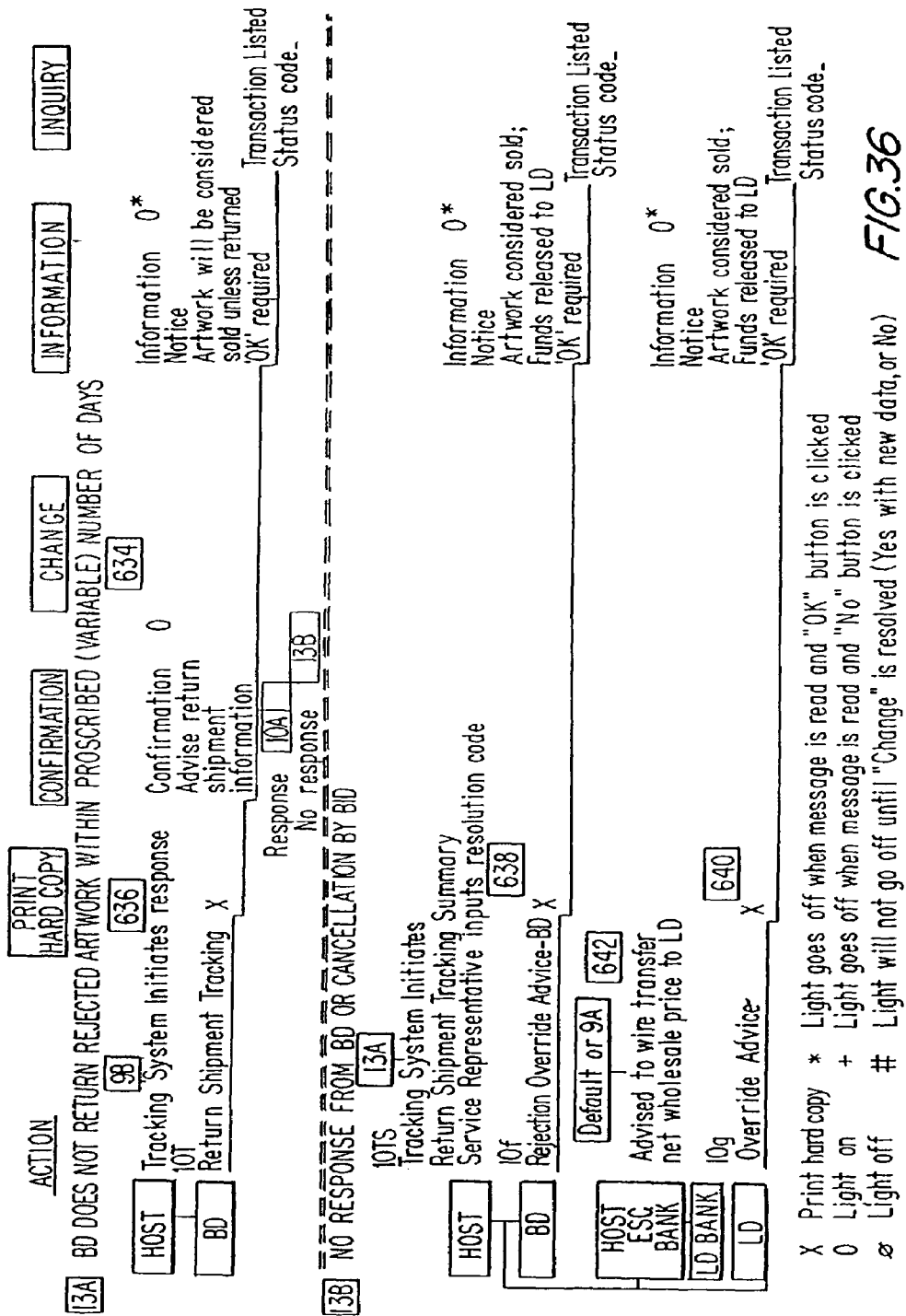
Figure 37:
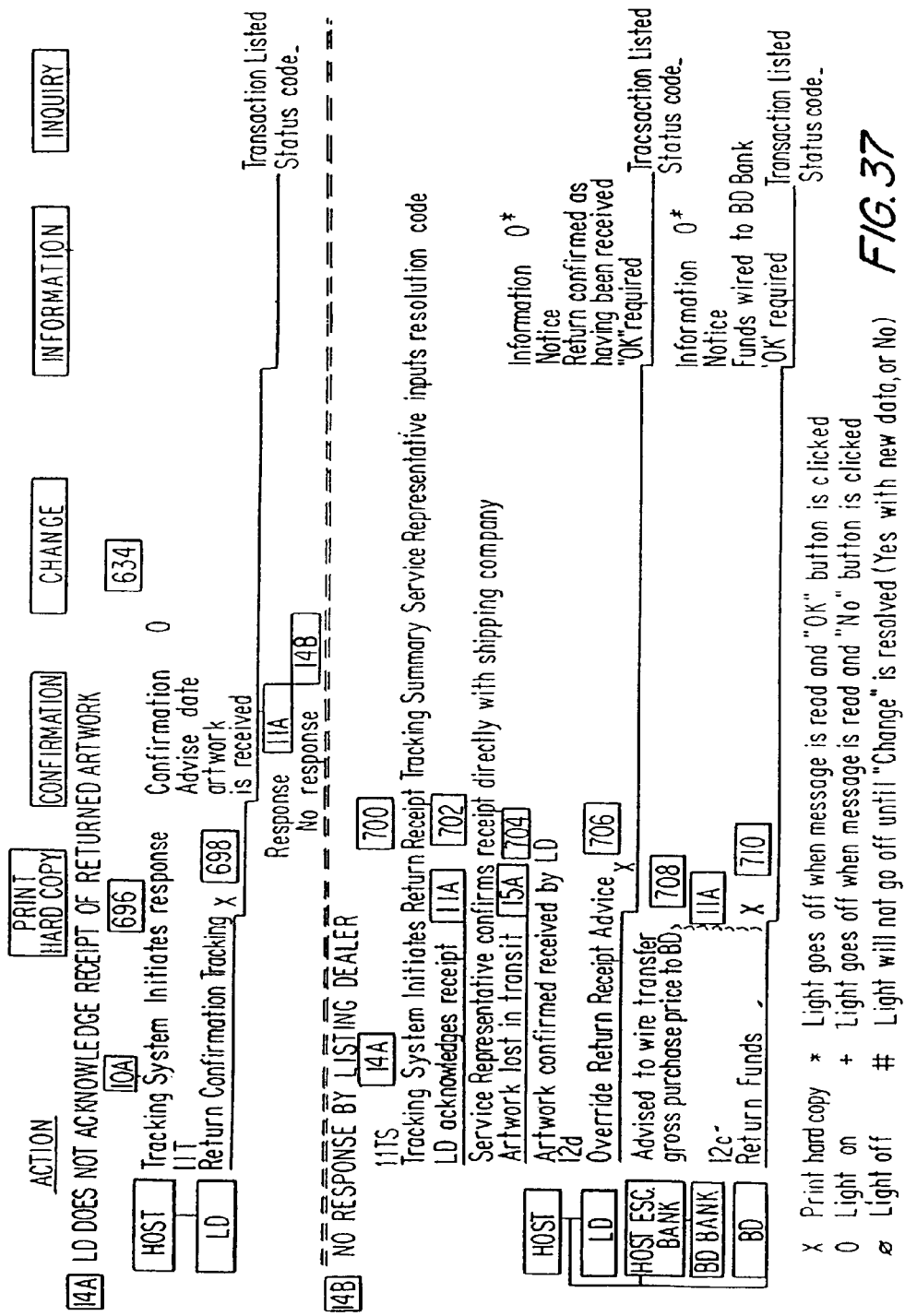
Figure 38:
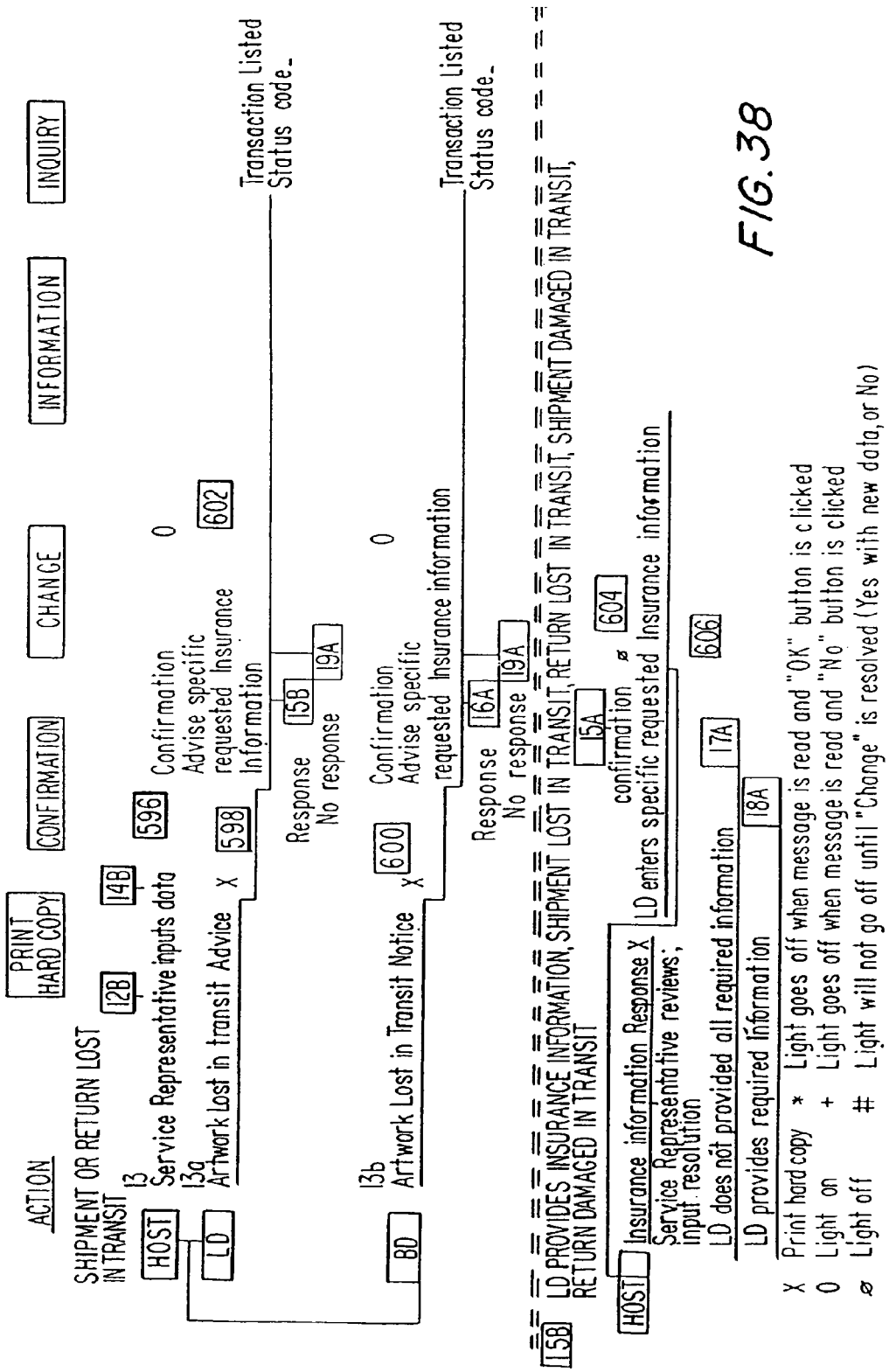
Figure 39:
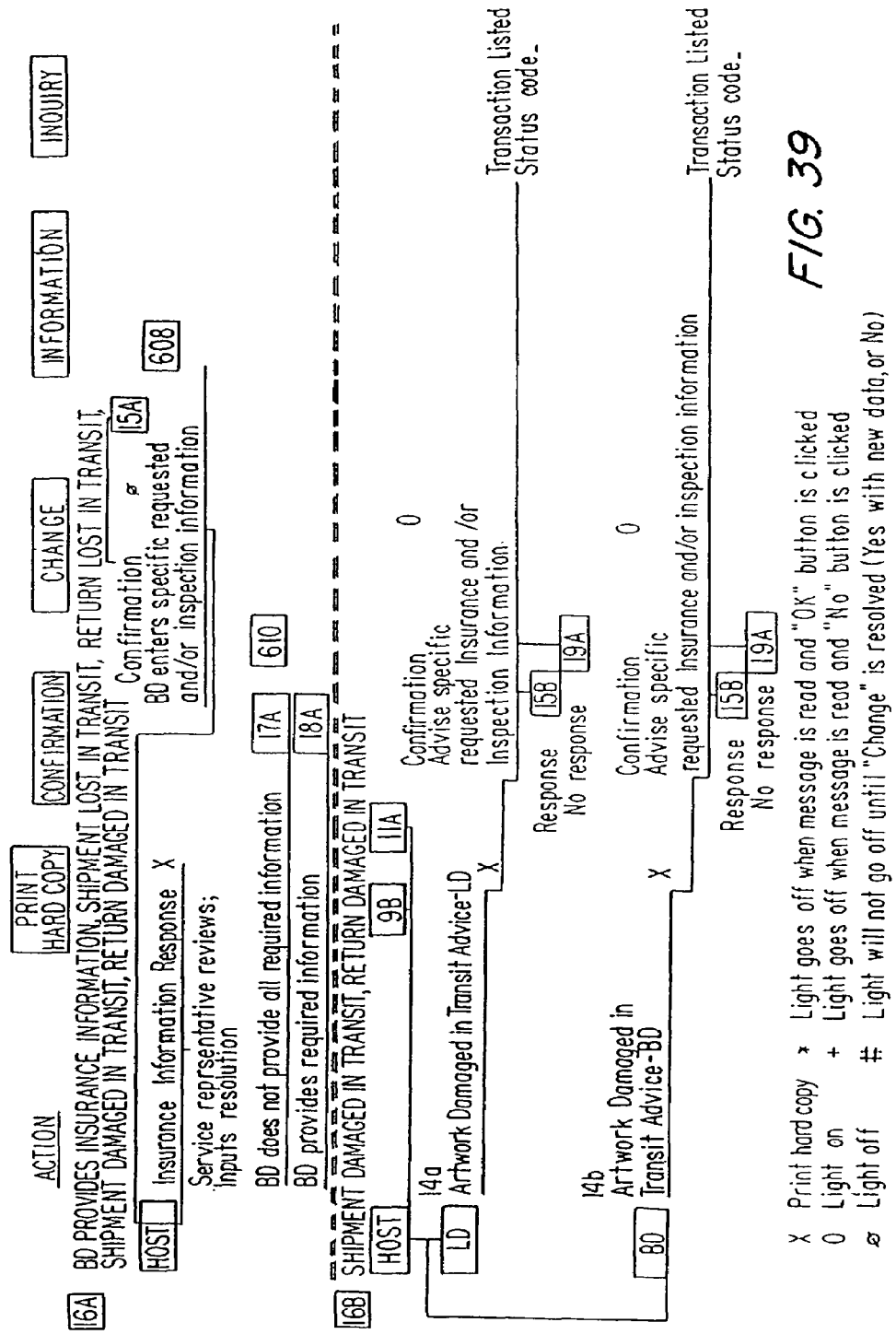
Figure 40:
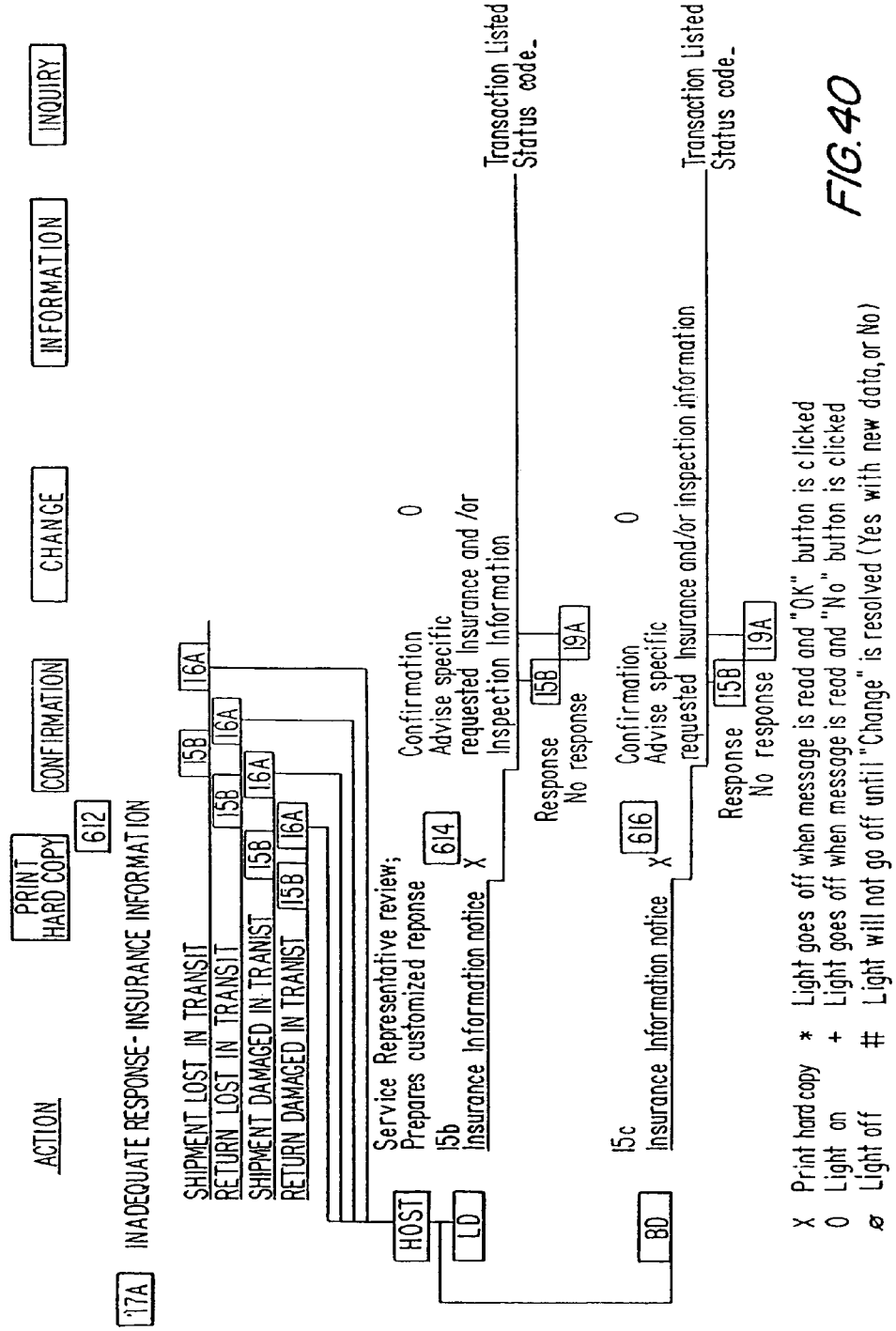
Figure 41:
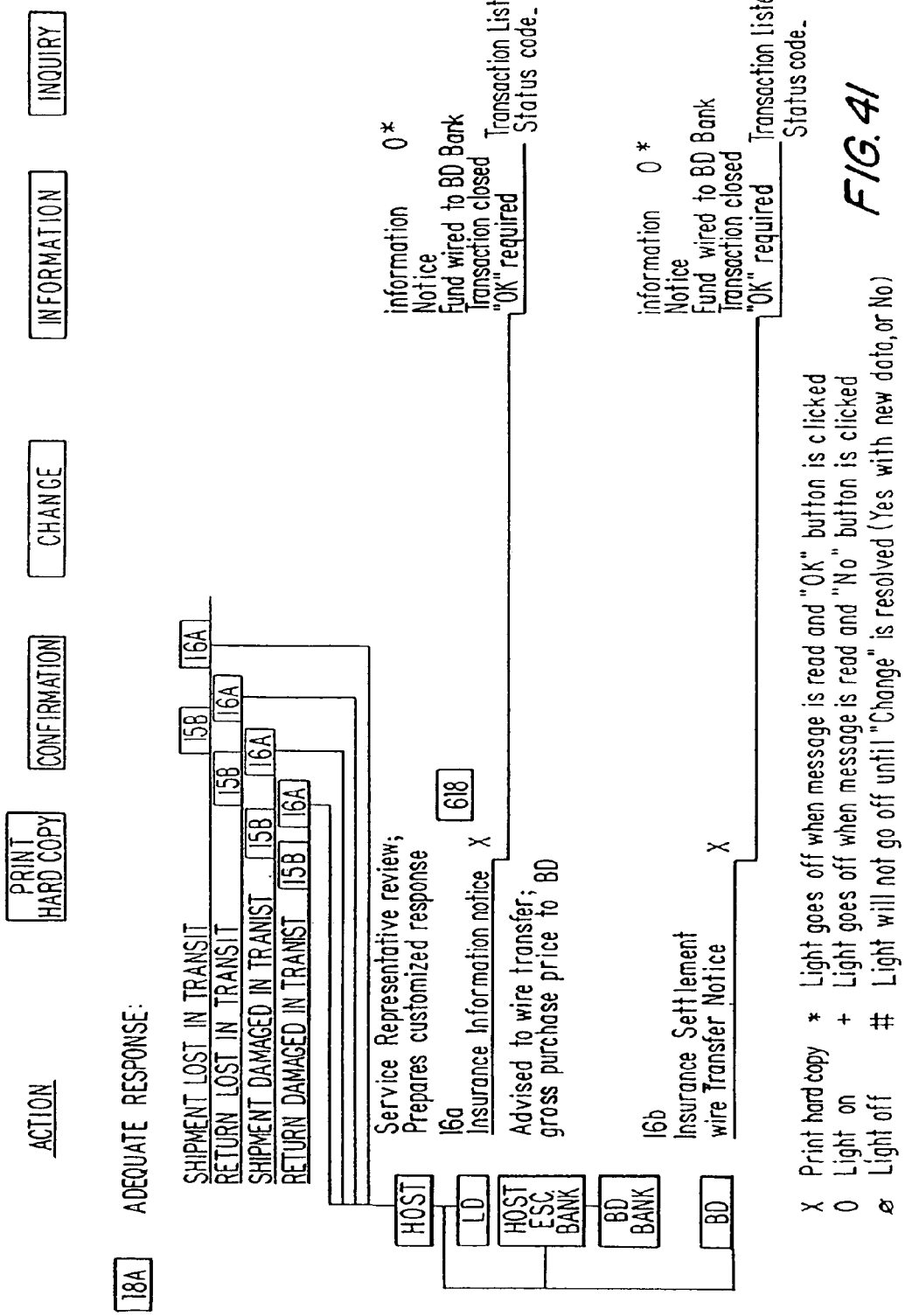
Figure 42:
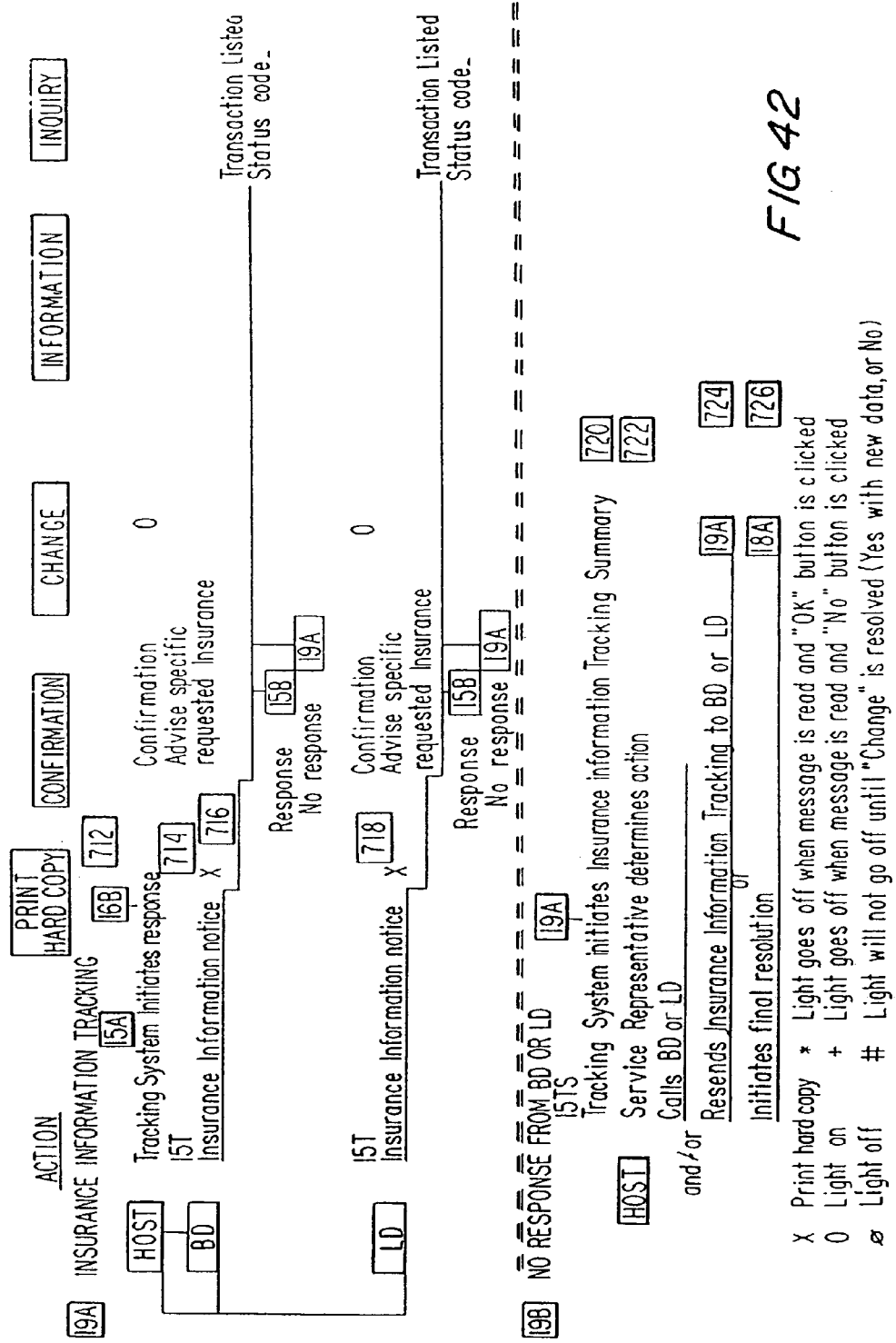
Figure 43:
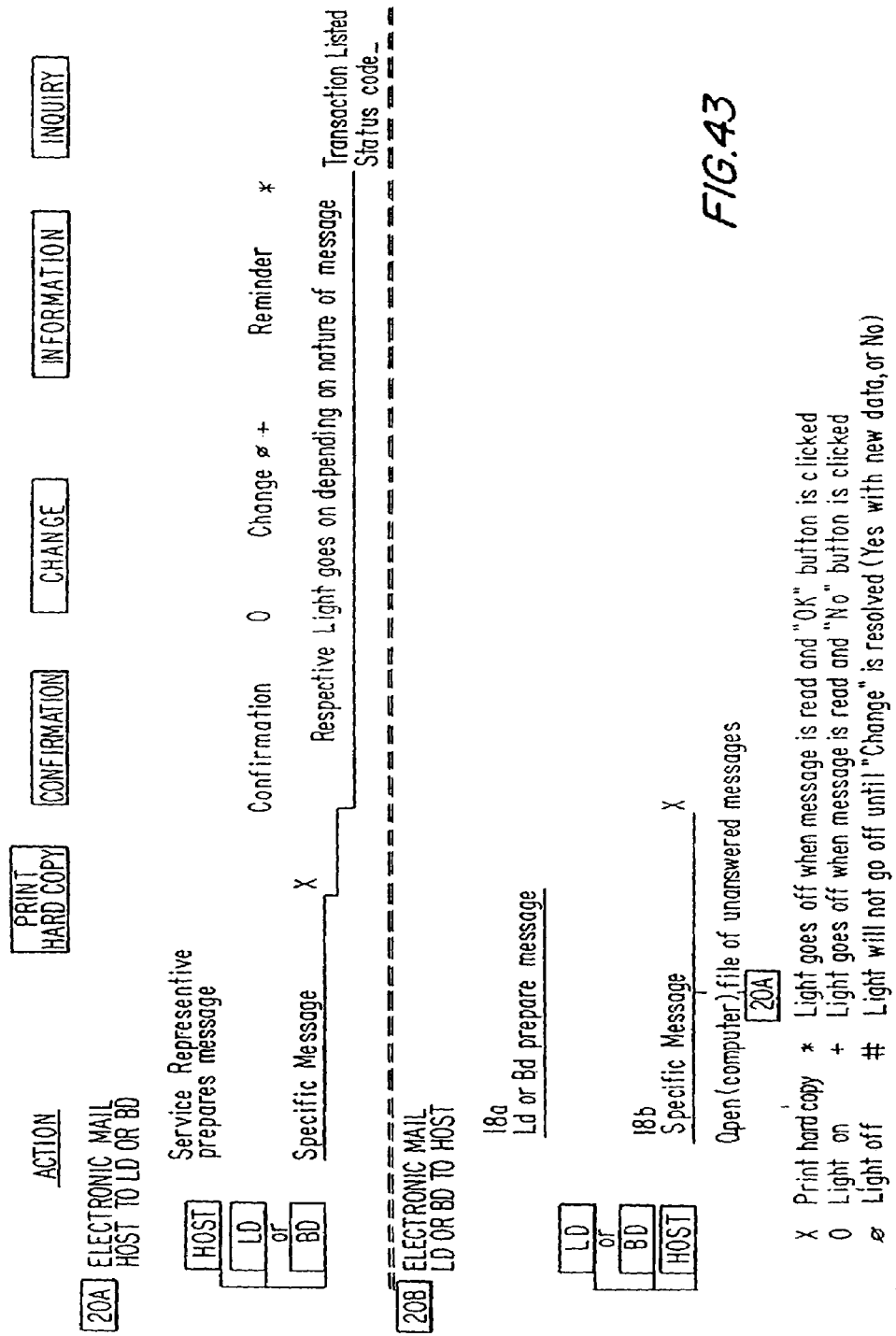
Figure 44:
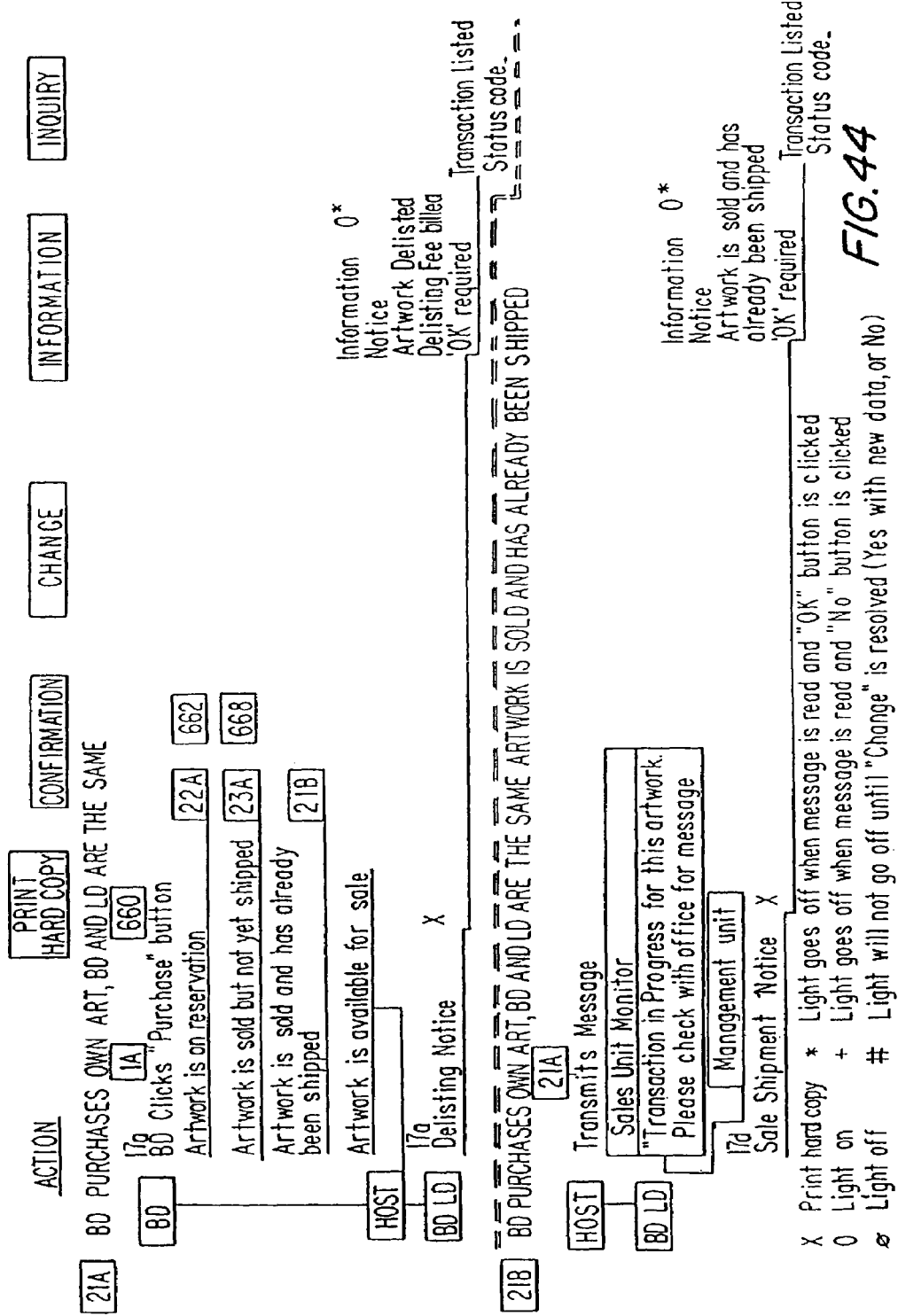
Figure 45:
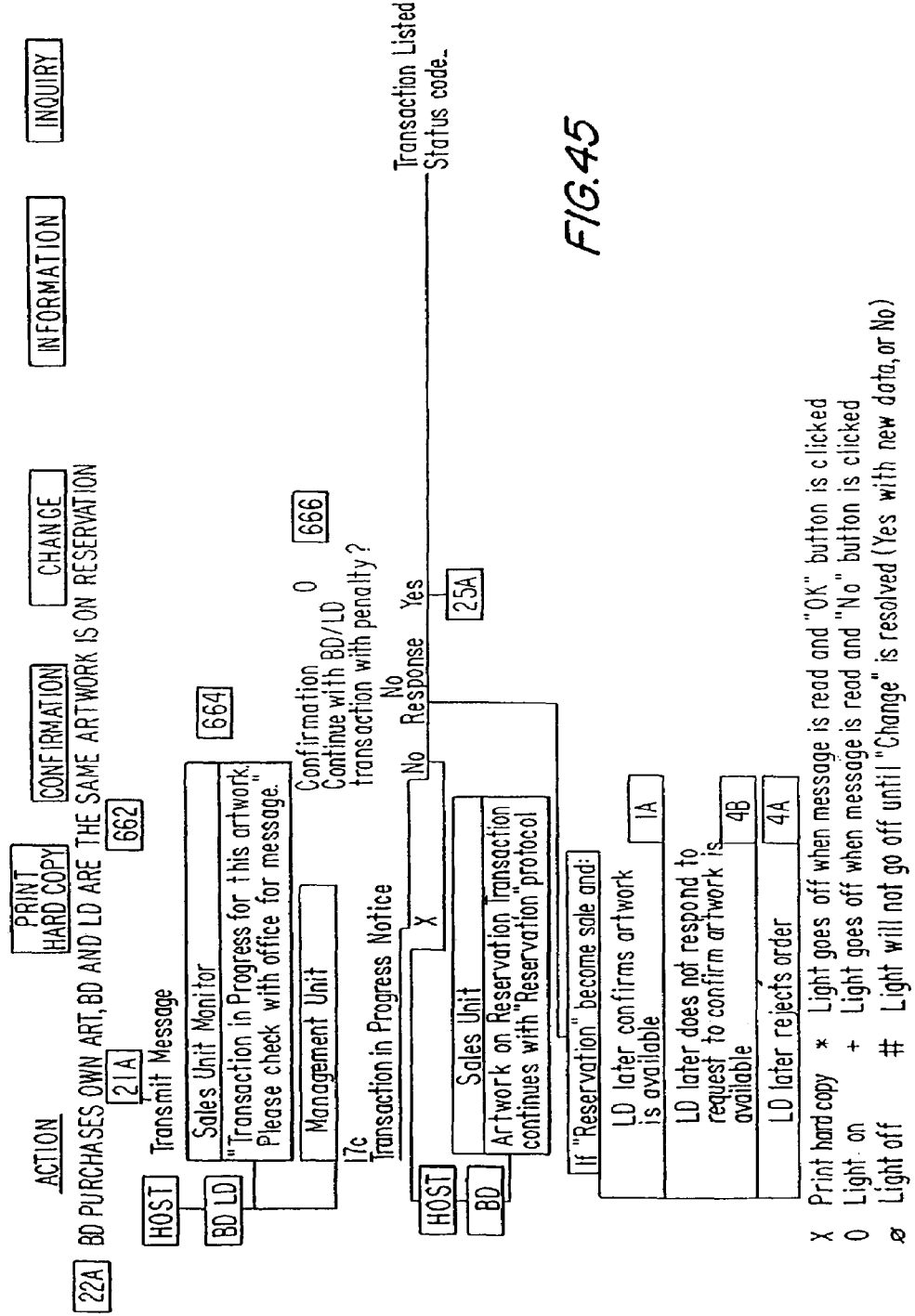
Figure 46:
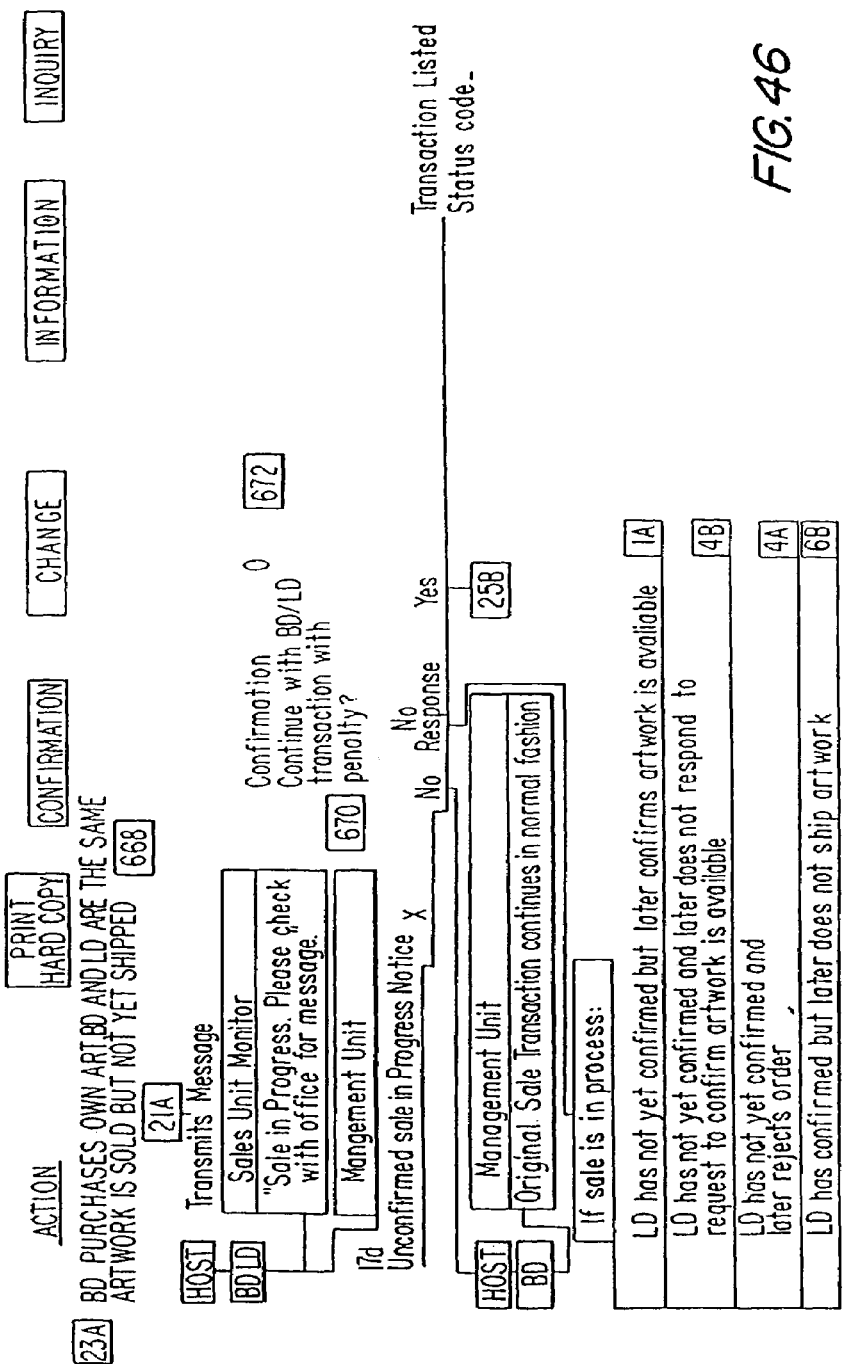
Figure 47:
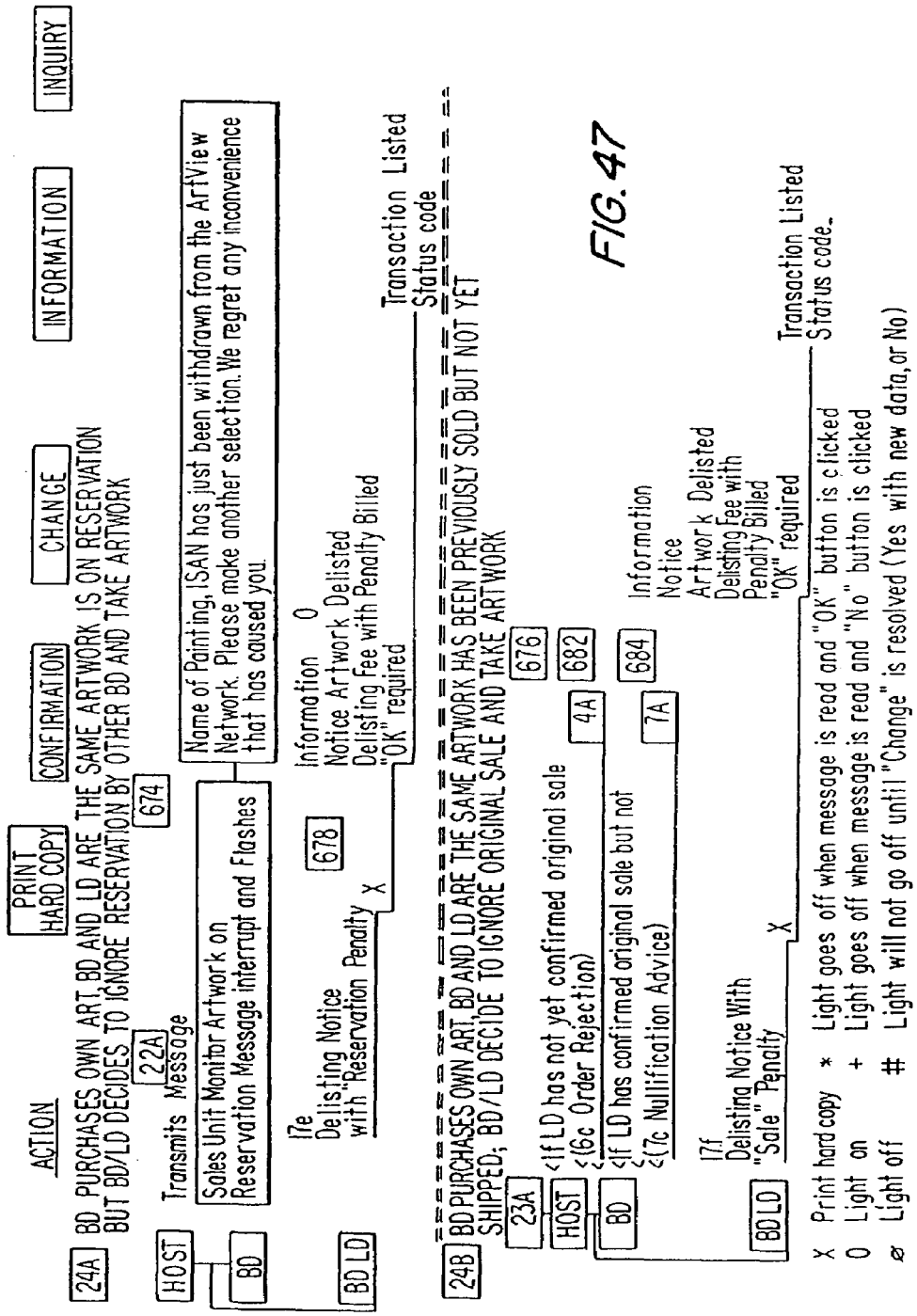
Figure 48:
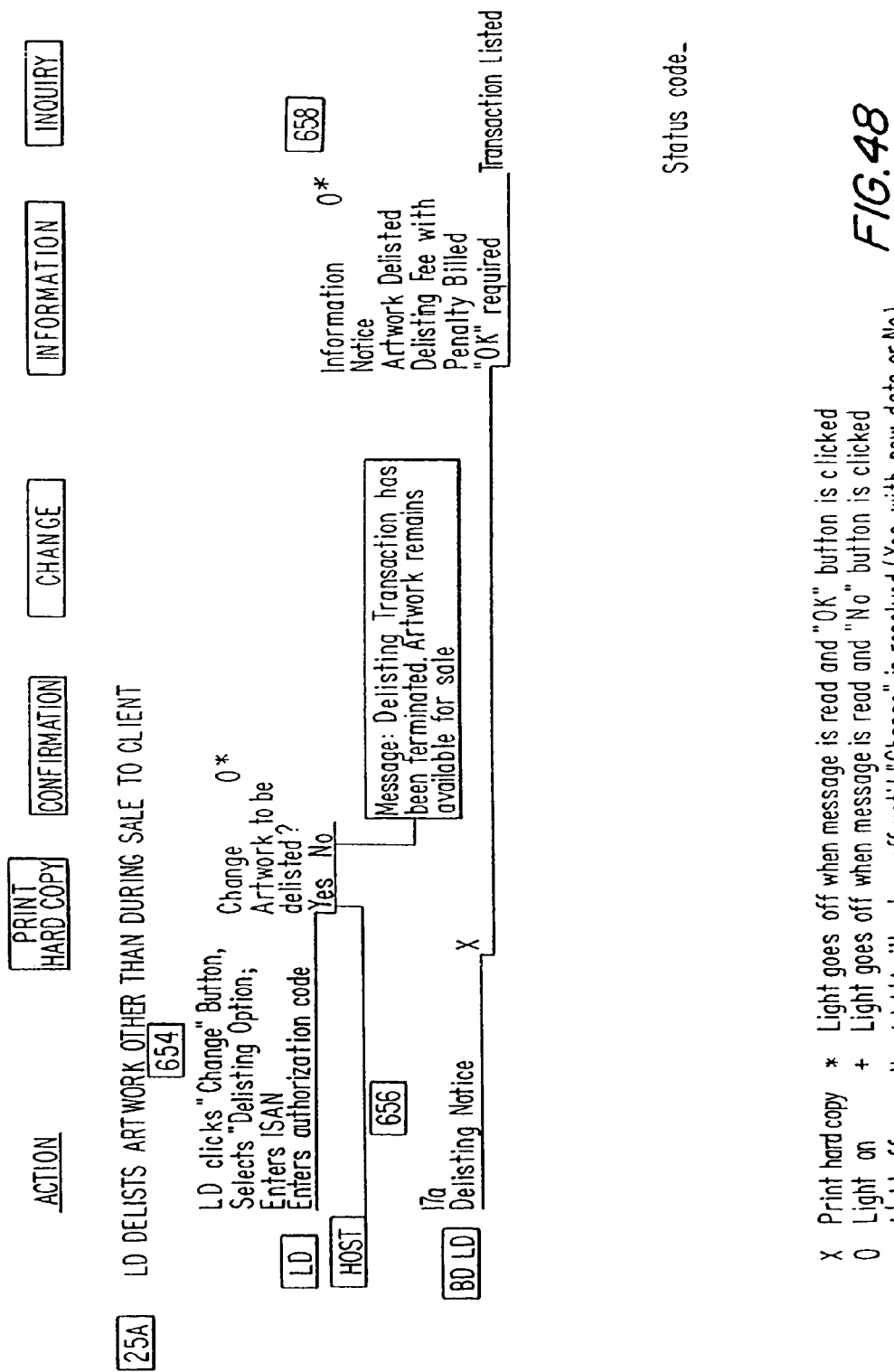

As shown in FIG. 24, when a dealer places a buy order on behalf of a client 500 and acknowledges it, the system generates an order confirmation and assigns a transaction number 502. The listing dealer is then requested to electronically confirm that the work sold is still available 504. This confirmation request is visible to the listing dealer when he next successfully logs on to the system.

If the listing dealer confirms that the work is still available 506, an acceptance notification 508 is electronically conveyed to the listing dealer. At the same time, an order acceptance 510 is conveyed to the buying dealer as well as an inquiry as to any change in the buying dealer's default shipping instructions 512. (A change in default shipping instructions 514, 516, 518 results in an electronic acknowledgment to the buying dealer and an electronic notification to the listing dealer 520.) Finally, the system requests that the buying dealer wire transfer funds to pay for the purchased work 522. At this time, the listing dealer can issue modified wire transfer instructions such as name and address of bank to receive funds 524, 526. The system will electronically acknowledge receipt of the modification with a wire transfer change notice to the listing dealer 528. (The buying dealer can also effect changes in the wire transfer instructions for the source of money in the same manner.) The transfer is preferably made to an escrow account maintained by the system purveyor.

If the system does not receive notification that the buying dealer has wire transferred the necessary funds within a predetermined period of time 530, the system issues an electronic order acceptance tracking notice to the buying dealer 532, 534. If after another predetermined period of time, the system still has not received notification that the buying dealer has wire transferred the funds 536, the system cancels the order 538 issues an order cancellation notice to the buying dealer and the listing dealer 540.

If the listing dealer rejects the order of the buying dealer 542 or does not respond to a confirmation of availability request 544-548, the system cancels the transaction 550. When the listing dealer formally rejects the order 552-554, an order rejection confirmation 556 is electronically conveyed to the listing dealer. At the same time, the system sends an electronic notice to the buying dealer informing him that the requested work is not available 558. If no response is received from the listing dealer within a predetermined time period 560, a confirmation request tracking notice is electronically sent to the listing dealer 544-546. If this too is ignored, for a predetermined period of time, the system sends transaction cancellation notices to both the buying and listing dealers 548-550. A "delisting" of the unavailable art work then takes place 562, and a "delisting" charge is made to the listing dealer.

After the system has received notification that the buying dealer has transferred sufficient funds for the purchased work 564, a shipping authorization and corresponding instructions are electronically sent to the listing dealer 566. When the listing dealer advises the system that the purchased work has been shipped 568 a shipment confirmation notice is electronically sent to the listing dealer and the buying dealer 570. Similarly, an artwork receipt confirmation is issued to the buying dealer and the listing dealer when the buying dealer notifies the system that the artwork has been physically received 572, 574. If, after the issuance of a receipt confirmation 574 the buying dealer indicates his acceptance of the work 576, or if a predetermined period of time elapses without notification of rejection of the work 578 the system issues an artwork acceptance advice to the listing dealer 580. The escrowed purchase funds are then transferred to the listing dealer's account 582 and notification of the wire transfer is made electronically by way of a wire transfer advice to the listing dealer 584.

If the buying dealer does not inform the system that the shipped work has been received within a predetermined period of time 586 the system issues a notice to track the shipment 588-590. If inquiry reveals that the buying dealer has received the work but has simply failed to acknowledge receipt, an artwork receipt override advice is electronically issued to the buying dealer 592. The buying dealer then still has a predetermined time within which to reject the work. In the event that an inquiry shows that the buying dealer never received the work and it was lost in transit 594, an artwork lost in transit advice is electronically conveyed to both the listing and buying dealers 596-600. At this time, the system automatically opens a form for the input of specific insurance information 602. If either the buying or listing dealer fails to provide adequate insurance information 604-612, the system will automatically issue an insurance information notice requesting the necessary information 614, 616. Should a settlement or other disposition of the lost artwork claim be achieved, the system, when advised of the result, will issue a notice to the buying and listing dealers, including all manually input details 618. (The same insurance procedure is undertaken for artwork which is damaged in transit.)

After a predetermined period of time, if the listing dealer fails to ship the purchased work 620, or fails to notify the system that the work has been shipped, the system initiates a confirmation request. If there is still no response, the system cancels the transaction 622 and sends an order nullification advice to the buying dealer 626 and an order nullification to the listing dealer 624. If the work has actually been shipped, the listing dealer notifies the system and the process continues as described above 628. Thereafter the system issues a notice for the return transfer of the buying dealer's escrowed funds 628 and a wire transfer advice when completed.

Should the buying dealer receive the artwork, but thereafter reject it 630, the system first issues a rejection to the buying dealer 632. It then issues an artwork rejection notice to the listing dealer 634. If the buying dealer does not inform the system that he has return shipped the rejected work within a predetermined period of time 634, an artwork rejection tracking notice is issued 636. If the buying dealer continues to fail to respond or indicates a lack of intention to ship the rejected work, a rejection override advice is issued by the system to the buying dealer 638 and the listing dealer 640. A notice authorizing the transfer of the purchase funds from the escrow account to the listing dealer's account follows 642. If the buying dealer properly ships the rejected work and notifies the system accordingly, the same procedure applies 644-652, as outlined above, as that with respect to initial shipments from the listing dealer.

A delisting notice is issued when the listing dealer clicks the "Change" button on the work's monitor 13, selects the "Delisting" option, enters the work's ISAN and his authorization code 654-656. If a delisting fee is charged, the system automatically generates the necessary paperwork 658. A delisting notice is also issued by the system to the listing dealer when the listing dealer sells to one of its own customers. This happens automatically when the listing dealer clicks on the "Purchase" button and thus, also becomes the buying dealer 660.

Since there are generally significant advantages to a listing dealer when he can sell artwork from his own inventory to a customer in his own gallery (e.g., higher profit margin, no time delays, no shipping, etc.), the system provides the listing dealer with the ability to override reservations and sales to other dealers. In such instances, when the listing dealer becomes the buying dealer, the system presents the listing dealer with a notice, dependent upon the status of the transaction with the other buying dealer. When the "Purchase" button is clicked by the listing dealer for a work that is already reserved by another buying dealer 662, the system electronically issues a transaction in progress notice 664 and requests confirmation by the listing dealer and buying dealer that his new sale transaction should go forward 666. Similarly, when the "Purchase" button is clicked by the listing dealer for a work that has been purchased by another buying dealer 668, the system issues a sale in progress notice 670 and requests confirmation by the listing/buying dealer that the new transaction should go forward 672. A penalty may be levied against the listing dealer in these instances to discourage this practice except in limited circumstances.

If the listing dealer confirms his intention to proceed with his transaction or delists a work which is the subject of a reservation or prior sale 674, 676, a reservation delisting notice 678, unconfirmed sale delisting notice or confirmed sale delisting notice 680 is issued to the listing dealer by the system, depending upon the circumstances surrounding the delisting. Copies of such notices are electronically sent to the buying dealer to explain the cancellation of the transaction 682, 684.

As described in various places above, a series of communication trackings are undertaken by the system. They include: confirmation request tracking 560-562—where the listing dealer has not acknowledged confirmation request that the artwork sold is/was available for sale within a predetermined period of time; order acceptance tracking—where the buying dealer has not wire transferred funds within a predetermined period of time after having notified that an order was accepted by the listing dealer 530-540; shipment tracking—where the listing dealer has not indicated that he has shipped the artwork within a predetermined time after shipping instructions have been sent 686-694; artwork receipt tracking—where the buying dealer has not acknowledged receipt of artwork within a predetermined period of time after having been sent advice of shipment 586-592; return shipment tracking—where the buying dealer has not provided shipment information of rejected artwork to be returned to the listing dealer within a predetermined period of time after having advised the system of the rejection 634-640; return receipt tracking—where the listing dealer has not acknowledged receipt of returned artwork within a predetermined period of time after having been sent advice of shipment of the artwork by the listing dealer 696-710; and insurance information tracking—where either the buying dealer or the listing dealer has not responded to requests for specific insurance and/or inspection information on a shipment or return lost in transit or shipment or return damaged in transit 712-726. Tracking summary reports incorporating information regarding each of the above enumerated communication trackings are available and are preferably generated and printed automatically on a daily basis to permit the purveyor of the system to monitor the progress of transactions that might otherwise collapse.

While reference has been made to specific hardware, software and functional elements, these are meant as illustrative only and one of skill in the art may alter such elements without departing from the spirit and intent of the present invention.

The invention claimed is:

1. A method for electronically executing sale transactions across a plurality of networked terminals, comprising:
    storing a plurality of electronic images and corresponding data of property for sale by at least one seller;
    searching stored electronic images and corresponding data of property for sale according to search criteria to select at least one of said stored electronic images, the corresponding data being representative of a hierarchy of unique characteristics of the property;
    displaying at least a portion of said selected electronic images at at least one terminal of the plurality of networked terminals;
    reserving in a database at least one of said displayed electronic images according to a request of a first buyer received from said terminal;
    receiving an order of said first buyer to purchase property for sale by a first seller, said property corresponding to at least one of said displayed electronic images reserved according to said request of said first buyer, wherein a sale transaction of said property is initiated; and
    transmitting instructions to complete said sale transaction to said first buyer and said first seller.

2. The method of claim 1, wherein said searching step comprises:
    randomly selecting a plurality of said stored electronic images when said search criteria specify a random search request.

3. The method of claim 1, wherein said reserving step comprises:
    indicating the reserve status of said reserved electronic images when said reserved electronic images are displayed at any of the plurality of networked terminals.

4. The method of claim 1, further comprising:
    initiating a tracking inquiry when, in response to said instructions to complete said sale transaction, availability information is not received from said first seller within a predetermined period of time; and
    canceling said sale transaction when a response to said tracking inquiry is not received from said first seller within a predetermined period of time.

5. The method of claim 4, further comprising:
    transmitting a notice of cancellation of said sale transaction to said first buyer and said first seller.

6. The method of claim 1, further comprising:
    initiating a tracking inquiry when, in response to said instructions to complete said sale transaction, payment information is not received from said first buyer within a predetermined period of time; and
    canceling said sale transaction when a response to said tracking inquiry is not received from said first buyer within a predetermined period of time.

7. The method of claim 1, further comprising:
    initiating a tracking inquiry when, in response to said instructions to complete said sale transaction, shipment information is not received from said first seller within a predetermined period of time; and canceling said sale transaction when a response to said tracking inquiry is not received from said first seller within a predetermined period of time.

8. The method of claim 1, further comprising:
receiving from said first seller an indication that said property for sale by said first seller has been shipped;
initiating a tracking inquiry when an indication of the receipt of said property for sale by said first seller is not received from said first buyer within a predetermined period of time; and
transmitting an insurance information request to said first seller when a response to said tracking inquiry is not received from said first buyer within a predetermined period of time.

9. The method of claim 1, wherein said reserving step comprises:
preventing buyers other than said first buyer from completing a sale transaction of property corresponding to said reserved electronic images.

10. The method of claim 1, wherein the plurality of networked terminals include a plurality of locally, regionally, or nationally networked terminals.

11. A method for electronically executing sale transactions across a plurality of networked terminals, comprising:
storing a plurality of electronic images and corresponding data of property for sale by at least one seller, the corresponding data being representative of a hierarchy of unique characteristics of the property;
searching said stored electronic images and said corresponding data according to search criteria received from a first terminal of the plurality of networked terminals to select at least one of said stored electronic images;
transmitting said selected electronic images and said corresponding data to said first terminal, wherein at least a portion of said selected electronic images is displayed at said first terminal;
reserving in a database at least one of said displayed electronic images according to a request of a first buyer received from said first terminal;
receiving from said first terminal an order of said first buyer to purchase property for sale by a first seller, said property corresponding to at least one of said reserved electronic images, wherein a sale transaction of said property is initiated;
generating instructions to complete said sale transaction; and
transmitting said instructions to said first terminal of said first buyer and to a terminal of said first seller.

12. The method of claim 11, wherein said searching step comprises:
randomly selecting a plurality of said stored electronic images when said search criteria specify a random search request.

13. The method of claim 11, wherein said reserving step comprises:
indicating the reserve status of said reserved electronic images when said reserved electronic images are displayed at any of the plurality of networked terminals.

14. The method of claim 11, further comprising:
initiating a tracking inquiry when, in response to said instructions to complete said sale transaction, availability information is not received from said terminal of said first seller within a predetermined period of time; and
canceling said sale transaction when a response to said tracking inquiry is not received from said terminal of said first seller within a predetermined period of time.

15. The method of claim 14, further comprising:
transmitting a notice of cancellation of said sale transaction to said first terminal of said first buyer and said terminal of said first seller.

16. The method of claim 11, further comprising:
initiating a tracking inquiry when, in response to said instructions to complete said sale transaction, payment information is not received from said first terminal of said first buyer within a predetermined period of time; and
canceling said sale transaction when a response to said tracking inquiry is not received from said first terminal of said first buyer within a predetermined period of time.

17. The method of claim 11, further comprising:
initiating a tracking inquiry when, in response to said instructions to complete said sale transaction, shipment information is not received from said terminal of said first seller within a predetermined period of time; and
canceling said sale transaction when a response to said tracking inquiry is not received from said terminal of said first seller within a predetermined period of time.

18. The method of claim 11, further comprising:
receiving from said terminal of said first seller an indication that said property for sale by said first seller has been shipped;
initiating a tracking inquiry when an indication of the receipt of said property for sale by said first seller is not received from said first terminal of said first buyer within a predetermined period of time; and
transmitting an insurance information request to said terminal of said first seller when a response to said tracking inquiry is not received from said first terminal of said first buyer within a predetermined period of time.

19. The method of claim 11, wherein said reserving step comprises:
preventing buyers other than said first buyer from completing a sale transaction of property corresponding to said reserved electronic images.

20. The method of claim 11, wherein the plurality of networked terminals include a plurality of locally, regionally, or nationally networked terminals.

21. A method for a first terminal of a plurality of networked terminals to electronically execute sale transactions, comprising:
establishing communication with at least one server, wherein said at least one server stores a plurality of electronic images and corresponding data of property for sale by at least one seller, the corresponding data being representative of a hierarchy of unique characteristics of the property;
transmitting search criteria to said at least one server to initiate a search of said stored electronic images and corresponding data according to said search criteria, wherein said at least one server selects at least one of said stored electronic images;
displaying at least a portion of said selected electronic images received from said at least one server;
requesting with said first terminal to reserve at least one of said displayed electronic images to prevent buyers other than a first buyer from completing a sale transaction of property corresponding to said reserved electronic images; and placing an order to purchase property for sale by a first seller in response to initiation of a sale transaction, said property corresponding to at least one of said reserved electronic images.

22. The method of claim 21, wherein an indicator of the reserve status of said reserved electronic images is displayed when said reserved electronic images are displayed at any of the plurality of networked terminals.

23. The method of claim 21, further comprising:
   selecting a plurality of said displayed electronic images to create a portfolio for said first buyer; and
   storing said portfolio for subsequent access by said first buyer.

24. The method of claim 21, wherein said transmitting search criteria step comprises:
   transmitting a random search request, wherein said at least one server randomly selects a plurality of said stored electronic images.

25. The method of claim 21, further comprising:
   selecting one of said displayed electronic images; and
   transmitting a request to said at least one server for price information corresponding to said selected electronic image.

26. The method of claim 21, further comprising:
   transmitting payment information to said at least one server within a predetermined period of time, according to said instructions to complete said sale transaction.

27. The method of claim 21, further comprising:
   transmitting an indication of the receipt of said property for sale by said first seller to said at least one server within a predetermined period of time, according to said instructions to complete said sale transaction.

28. A system for electronically executing sale transactions across a plurality of networked terminals, comprising:
   means for storing a plurality of electronic images and corresponding data of property for sale by at least one seller, the corresponding data being representative of a hierarchy of unique characteristics of the property;
   means for searching said stored electronic images and said corresponding data according to search criteria received from a first terminal of the plurality of networked terminals to select at least one of said stored electronic images;
   means for transmitting said selected electronic images and said corresponding data to said first terminal, wherein at least a portion of said selected electronic images is displayed at said first terminal;
   means for reserving at least one of said displayed electronic images according to a request of a first buyer received from said first terminal;
   means for receiving from said first terminal an order of said first buyer to purchase property for sale by a first seller, said property corresponding to at least one of said reserved electronic images, wherein a sale transaction of said property is initiated; and
   means for generating instructions to complete said sale transaction and for transmitting said instructions to said first terminal of said first buyer and to a terminal of said first seller.

29. The system of claim 28, wherein said means for reserving comprises:
   means for indicating the reserve status of said reserved electronic images, when said reserved electronic images are displayed at any of the plurality of networked terminals.

30. The system of claim 29, wherein said means for reserving further comprises:
   queue means for maintaining a queue of buyers interested in reserving one of said reserved electronic images.

31. The system of claim 28, further comprising:
   means for determining the status of said sale transaction; and
   means for canceling said sale transaction when a response to a status inquiry initiated by said tracking means is inadequate.

32. The system of claim 28, further comprising:
   means for compiling and transmitting price information for a selected one of said displayed electronic images.

33. The system of claim 28, wherein said means for reserving comprises:
   means for preventing buyers other than said first buyer from completing a sale transaction of property corresponding to said reserved electronic images.

34. The system of claim 28, wherein the plurality of networked terminals include a plurality of locally, regionally, or nationally networked terminals.

* * * * *